(12) United States Patent
Cook et al.

(10) Patent No.: US 11,590,503 B2
(45) Date of Patent: Feb. 28, 2023

(54) MICROFLUIDIC ARRANGEMENTS

(71) Applicant: OXFORD UNIVERSITY INNOVATION LIMITED, Oxford (GB)

(72) Inventors: Peter Richard Cook, Oxford (GB); Alexander Feuerborn, Oxford (GB); Edmond Walsh, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 341 days.

(21) Appl. No.: 15/768,323

(22) PCT Filed: Oct. 14, 2016

(86) PCT No.: PCT/GB2016/053204
§ 371 (c)(1),
(2) Date: Apr. 13, 2018

(87) PCT Pub. No.: WO2017/064514
PCT Pub. Date: Apr. 20, 2017

(65) Prior Publication Data
US 2018/0311671 A1  Nov. 1, 2018

(30) Foreign Application Priority Data

Oct. 16, 2015 (GB) ..................... 1518392
Aug. 18, 2016 (GB) ..................... 1614146
(Continued)

(51) Int. Cl.
*B01L 3/00* (2006.01)

(52) U.S. Cl.
CPC ....... *B01L 3/502784* (2013.01); *B01L 3/5088* (2013.01); *B01L 3/502707* (2013.01);
(Continued)

(58) Field of Classification Search
CPC ............ B01L 3/502784; B01L 3/5088; B01L 3/502707; B01L 2300/089;
(Continued)

(56) References Cited

U.S. PATENT DOCUMENTS 6,664,044 B1  12/2003  Sato
7,189,580 B2   3/2007  Beebe et al.
(Continued)

FOREIGN PATENT DOCUMENTS

CN    1337580 A    2/2002
CN  101262948 A    9/2008
(Continued)

OTHER PUBLICATIONS

Barnes, et al., "Chapter 2: Capillarity and the mechanics of surfaces of Interfacial Science: An introduction," Interfacial Science, 2011, pp. 10-42.
(Continued)

*Primary Examiner* — Samuel P Siefke
(74) *Attorney, Agent, or Firm* — Foley & Lardner LLP

(57) ABSTRACT

A microfluidic arrangement for manipulating fluids is provided. The microfluidic arrangement comprises a substrate, a first fluid and a second fluid, which is immiscible with the first fluid. The first fluid is arranged to be at least partially covered by the second fluid. The first fluid is arranged in a desired shape on an unpatterned surface of the substrate. The first fluid is retained in said shape by a fluid interface between the first and second fluids. A microfluidic arrangement comprising an array of drops is also provided. The microfluidic arrangement comprises a substrate, a first fluid and a second fluid, which is immiscible with the first fluid. The first fluid is arranged to be at least partially covered by the second fluid. The first fluid is arranged to be covered at least partially by the second fluid. The first fluid is arranged
(Continued)

in a given array of drops on an unpatterned surface of the substrate. Each drop cross section area having a (height: width) aspect ratio of (1:2) or less. A method of fabricating a microfluidic arrangement for manipulating fluids is also provided. The method comprises arranging a first fluid on an unpatterned surface of a substrate in a desired shape. The method also comprises arranging a second fluid, which is immiscible with the first fluid, to cover the first fluid at least partially. The first fluid is retained in said shape by a fluid interface between the first and second fluids. The method also comprises drying the first fluid to form a residue in said shape on the substrate.

10 Claims, 34 Drawing Sheets

(30) Foreign Application Priority Data

| | | |
|---|---|---|
| Aug. 18, 2016 | (GB) | 1614150 |
| Aug. 18, 2016 | (GB) | 1614153 |
| Aug. 18, 2016 | (GB) | 1614157 |
| Oct. 18, 2016 | (GB) | 1614139 |

(52) U.S. Cl.
CPC ............ B01L 2200/0673 (2013.01); B01L 2200/0694 (2013.01); B01L 2200/12 (2013.01); B01L 2300/089 (2013.01); B01L 2300/0816 (2013.01); B01L 2300/161 (2013.01); B01L 2400/0457 (2013.01)

(58) Field of Classification Search
CPC ..... B01L 2300/0816; B01L 2200/0694; B01L 2200/12; B01L 2300/161; B01L 2200/0673; B01L 2400/0457
See application file for complete search history.

(56) References Cited

U.S. PATENT DOCUMENTS

| | | | |
|---|---|---|---|
| 8,053,249 B2 | 11/2011 | Beebe et al. | |
| 8,168,133 B2 | 5/2012 | Beebe et al. | |
| 8,298,833 B2 | 10/2012 | Davies et al. | |
| 8,361,782 B2 | 1/2013 | Pugia et al. | |
| 8,652,852 B2 | 2/2014 | Beebe et al. | |
| 8,985,547 B2 | 3/2015 | Weibel et al. | |
| 9,296,241 B1 | 3/2016 | Ihnen et al. | |
| 9,707,560 B2 | 7/2017 | Muelleder et al. | |
| 10,159,979 B2 * | 12/2018 | Foulds | B01F 3/2292 |
| 2002/0176072 A1 | 11/2002 | Beseki et al. | |
| 2003/0213905 A1 | 11/2003 | Lennon et al. | |
| 2003/0224528 A1 | 12/2003 | Chiou et al. | |
| 2005/0272159 A1 | 12/2005 | Ismagilov et al. | |
| 2006/0166233 A1 | 7/2006 | Wu et al. | |
| 2006/0245978 A1 | 11/2006 | Prins | |
| 2006/0263241 A1 | 11/2006 | Beebe et al. | |
| 2009/0264550 A1 | 10/2009 | Rayner | |
| 2010/0078077 A1 * | 4/2010 | Ismagilov | B01L 3/502784 |
| | | | 137/1 |
| 2010/0093109 A1 | 4/2010 | Pugia et al. | |
| 2010/0116343 A1 | 5/2010 | Weibel et al. | |
| 2010/0163109 A1 * | 7/2010 | Fraden | B01L 3/502715 |
| | | | 137/1 |
| 2012/0024708 A1 | 2/2012 | Chiou et al. | |
| 2013/0037115 A1 | 2/2013 | Beebe et al. | |
| 2014/0125718 A1 | 5/2014 | Morrision et al. | |
| 2015/0011438 A1 * | 1/2015 | Chien | B01F 13/0071 |
| | | | 506/39 |
| 2015/0132742 A1 | 5/2015 | Thuo et al. | |
| 2016/0059232 A1 | 3/2016 | Muelleder et al. | |
| 2016/0202101 A1 | 7/2016 | Sparks | |

FOREIGN PATENT DOCUMENTS

| | | |
|---|---|---|
| CN | 103765068 A | 4/2014 |
| CN | 103958050 A | 7/2014 |
| CN | 104004652 A | 8/2014 |
| CN | 104324769 A | 2/2015 |
| CN | 104941706 A | 9/2015 |
| CN | 105142790 A | 12/2015 |
| CN | 105142790 B | 10/2017 |
| DE | 19949735 A1 | 5/2001 |
| EP | 1 525 472 A2 | 4/2005 |
| EP | 1 527 888 A2 | 5/2005 |
| EP | 2 523 004 A1 | 11/2012 |
| EP | 2 937 217 A1 | 10/2015 |
| GB | 2 544 152 A | 5/2017 |
| JP | H07-245467 A | 9/1995 |
| JP | 2009-511083 A | 3/2009 |
| JP | 2009-118798 A | 6/2009 |
| JP | 2010-526293 A | 7/2010 |
| JP | 5296054 B2 | 7/2010 |
| JP | 2010-531971 A | 9/2010 |
| JP | 5236667 B2 | 9/2010 |
| WO | WO-2004/011938 A2 | 2/2004 |
| WO | WO-2005/122672 A2 | 12/2005 |
| WO | WO-2006/121667 A2 | 11/2006 |
| WO | WO-2007/136328 A1 | 11/2007 |
| WO | WO-2008/063135 A1 | 5/2008 |
| WO | WO-2008/127818 A2 | 10/2008 |
| WO | WO-2009/063135 A1 | 5/2009 |
| WO | WO-2011/097677 A1 | 8/2011 |
| WO | WO-2014/117088 A1 | 7/2014 |
| WO | WO-2014/172740 A1 | 10/2014 |

OTHER PUBLICATIONS

Berthier et al., "Flow rate analysis of a surface tension driven passive micropump," Lab on a Chip, 2007, pp. 1475-1478, vol. 7, Issue 11.
Bonn, et al., "Wetting and spreading," Reviews of Modern Physics, Apr.-Jun. 2009, pp. 739-805, vol. 81.
C.V. Boys, "Soap Bubbles, Their colours and the forces which mould them," 1890, 12th Thousand Enlarged Edition, 202 pages.
Cate, et al., "Recent Developments in Paper-Based Microfluidic Devices," Analytical Chemistry, 2015, pp. 19-41, vol. 87.
Fletcher, et al., "Theoretical considerations of chemical reactions in micro-reactors operating under electroosmotic and electrophoretic control," The Analyst, 1999, pp. 1273-1282, vol. 124.
Gau, et al., "Liquid Morphologies on Structured Surfaces: From Microchannels to Microchips," Science, Jan. 1, 1999, pp. 46-50, vol. 283.
Hancock, et al., "Surface-Tension-Driven Gradient Generation in a Fluid Stripe for Bench-Top and Microwell Applications," Small, 2011, pages Surface-Tension-Driven Gradient Generation in a Fluid Stripe for Bench-Top and Microwell Applications, 2011, pp. 892-901, vol. 7.
Hartmann, et al., "Non-contact protein microarray fabrication using a procedure based on liquid bridge formation," Analytical and Bioanalytical Chemistry, 2008, pp. 591-598, vol. 393, Issue 2.
International Search Report and Written Opinion in International Application No. PCT/GB2016/053204 dated Dec. 14, 2016 (12 pages).
Javadi, et al., "Effect of wetting on capillary pumping in microchannels," Scientific Reports, 2013, pp. 1-6, vol. 3.
Ju, et al., "Backward flow in a surface tension driven micropump," Journal of Micromechanics and Microengineering, 2008, pp. 1-5, vol. 18.
Kolesky, et al., "3D Bioprinting of Vascularized, Heterogeneous Cell-Laden Tissue Constructs," Advanced materials, 2014, pp. 3124-3130, vol. 26.
Kolesky, et al., "Three-dimensional bioprinting of thick vascularized tissues," PNAS, Mar. 22, 2016, pp. 3179-3184, vol. 113, No. 12.
Lam, et al., "Surface-Tension-Confined Microfluidics," Langmuir, 2002, pp. 948-951, vol. 18, No. 3.

(56) References Cited

OTHER PUBLICATIONS

Lee, et al., "Capillary Based Patterning of Cellular Communities in Laterally Open Channels," Analytical Chemistry, Apr. 1, 2010, pp. 2900-2096, vol. 82, No. 7.
Lee, et al., "Wall-less liquid pathways formed with three-dimensional microring arrays." Applied Physics Letters, 2012, pp. 114108-1-114108-4, vol. 101.
Lee, et al., "Wall-Less Microfluidic Channels Using 3-Dimensional Ring Arrays," 16th International Conference on Minaturized Systems for Chemistry and Life Sciences, Oct. 28-Nov. 1, 2012, p. 296.
Liberski, et al., "Inkjet fabrication of polymer microarrays and grids—solving the evaporation problem," ChemComm, 2009, pp. 334-336.
Liberski, et al., "'Once Cell—One Well': A New Approach to Inkjet Printing Single Cell Microarrays," ACS Combinatorial Science, 2011, pp. 190-195, vol. 13, Issue 190.
Liu, et al., "A generalized formula for inertial lift on a sphere in microchannels," Lab on a Chip, 2016, pp. 884-892, vol. 16.
Macleod, et al.,"A Growing-Drop Technique for Measuring Dynamic Interfacial Tension," Journal of Colloids and Interface Science, Oct. 1993, pp. 435-448, vol. 160.
Memic, et al., "Research Highlights," Lab on a Chip, 2013, pp. 4157-4159, vol. 13.
Oliveira, et al., "Two-Dimensional Open Microfluidic Devices by Tuning the Wettability on Patterned Superhydrophobic Polymeric Surface," Applied Physics Express, 2010, 4 pages, vol. 3.
Parekh, et al., "Miniaturisation for chemistry, physics, biology, materials science and bioengineering," Lab on a Chip, 2016, pp. 1812-1820, vol. 16.
Rahmanian, et al., "Pen microfluidics: rapid desktop manufacturing of sealed thermoplastic microchannels," Lab Chip, 2013, pp. 1102-1108, vol. 13.
Schutzius, et al., "Surface tension confined (STC) tracks for capillary-driven transport of low surface tension liquids," Lab on a Chip, 2012, pp. 5237-5242, vol. 12.
Setu, et al., "Superconfinement tailors fluid flow at microscales," Nature Communications, 2015, pp. 1-8, vol. 6.
Shemesh, et al., "Stationary nanoliter droplet array with a substrate of choice for single adherent/nonadherent cell incubation and analysis," PNAS, Aug. 5, 2014, pp. 11293-11298, vol. 111, No. 31.
Sousa, et al., "Patterned superhydrophobic paper for microfluidic devices obtained by writing and printing," Cellulose, 2013, pp. 2185-2190, vol. 20.
Speth, et al.. "Capillary instability on a hydrophilic stripe," New Journal of Physics, 2009, 15 pages, vol. 11.
Straub, "The Role of Surface Tension for Two-Phase Heat and Mass Transfer in the Absence of Gravity," Experimental Thermal and Fluid Science, 1994, pp. 253-273, vol. 9.
Sugden, "The Determination of Surface Tension from the Maximum Pressure in Bubbles," Journal of Chem. Soc. Trans., 1922, pp. 858-866.
Sun, et al., "A novel picoliter droplet array for parallel real-time polymerase chain reaction based on double-inkjet printing," Lab on a Chip, 2014, pp. 3603-3610, vol. 14.
Sun, et al., "Droplet-in-oil array for picoliter-scale analysis based on sequential inkjet printing," Lab on a Chip, 2015, pp. 2429-2436, vol. 15.
Tan, et al., "Microfluidic mixing in a Y-junction open channel," AIP Advances, 2012, pp. 032160-1-032160-11, vol. 2.
Tan, et al., "Stability of flowing open fluidic channels," AIP Advances, 2013, pp. 022121-1-022121-12, vol. 3.
Tseng, et al., "Research highlights: printing the future of microfabrication," Lab on a Chip, 2014, pp. 1491-1495, vol. 14.
Walker, et al., "A passive pumping method for microfluidic devices," Lab on a Chip, 2001, pp. 131-134, vol. 2.
Washizu, "Electrostatic Actuation of Liquid Droplets for Microreactor Applications," IEEE Transactions on Industry Applications, Jul./Aug. 1998, pp. 732-737, vol. 34, No. 4.
You, et al., "Surface-Tension-Confined Microfluidics and Their Applications," ChemPhysChem, 2013, pp. 471-481, vol. 14.
Zhu, et al., "Nanoliter-Scale Protein Crystallization and Screening with a Microfluidic Droplet Robot," Scientific Reports, 2014, pp. 1-9, vol. 4.
Zhu, et al., "Printing 2-Dimentional Droplet Array for Single-Cell Reverse Transcription Quantitative PCR Assay with a Microfluidic Robot," Scientific Reports, 2015, pp. 1-7, vol. 5.
International Search Report and Written Opinion in PCT/GB2017/051065 dated Jul. 27, 2017 (11 pages).
Non-Final Office Action dated Sep. 24, 2020, from U.S. Appl. No. 16/326,134.
Notice of Allowance dated Dec. 23, 2020, from U.S. Appl. No. 16/326,134.

\* cited by examiner (i)

(ii)

(iii)

(iv)

(v)

(i)          (ii)

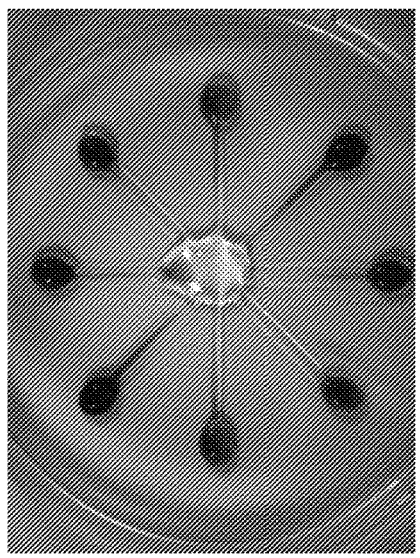
Figure 19(iii)

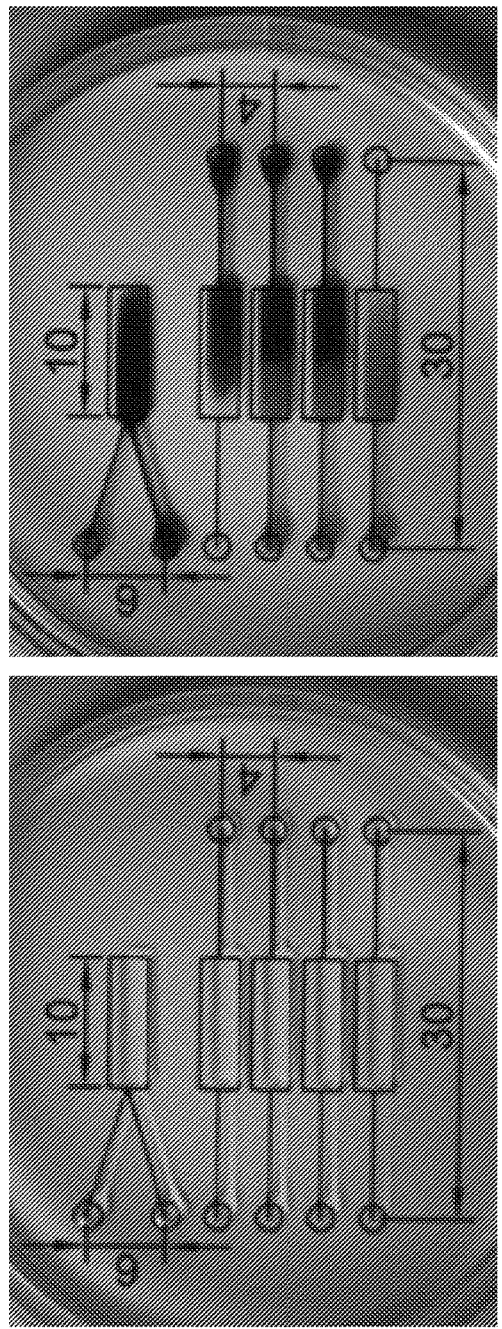
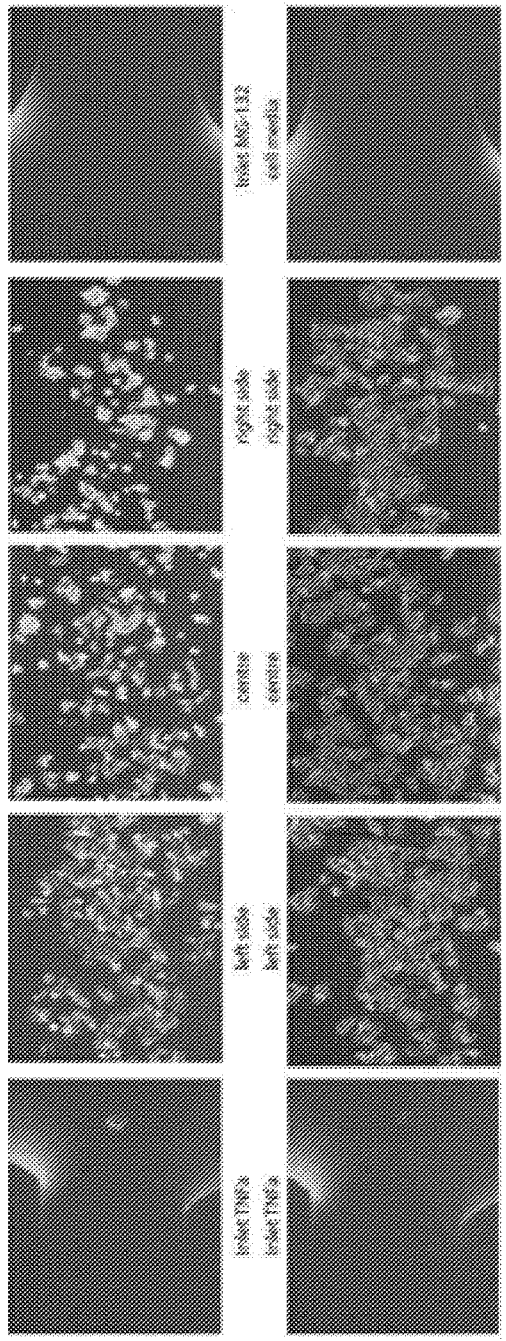
Figure 25A
Figure 25B
Figure 25C

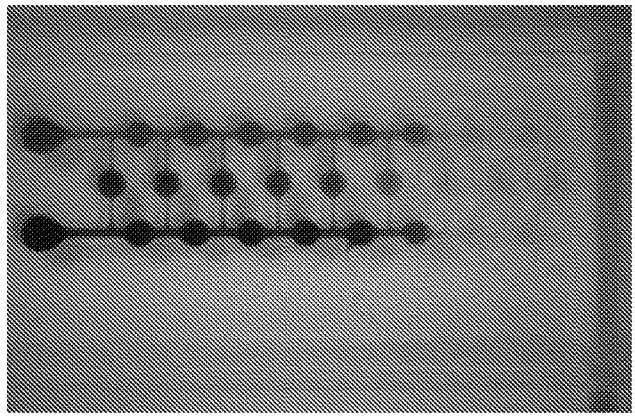 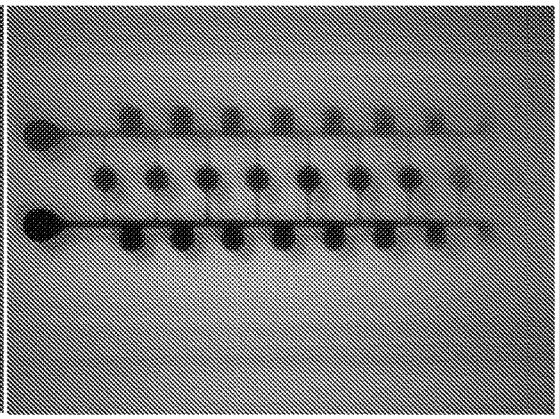
Figure 31  Figure 32
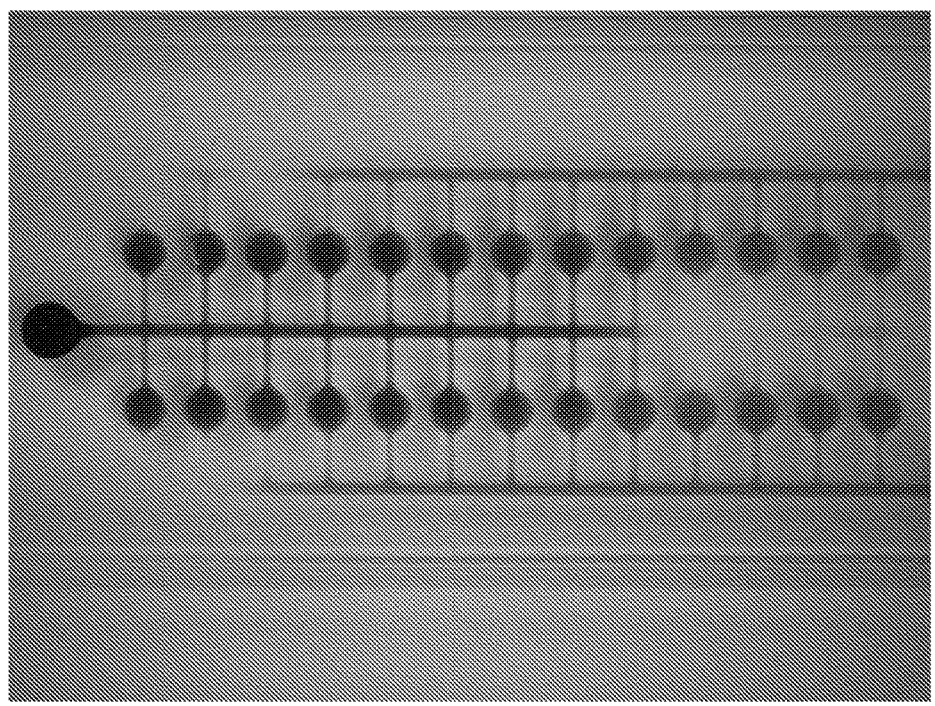
Figure 33

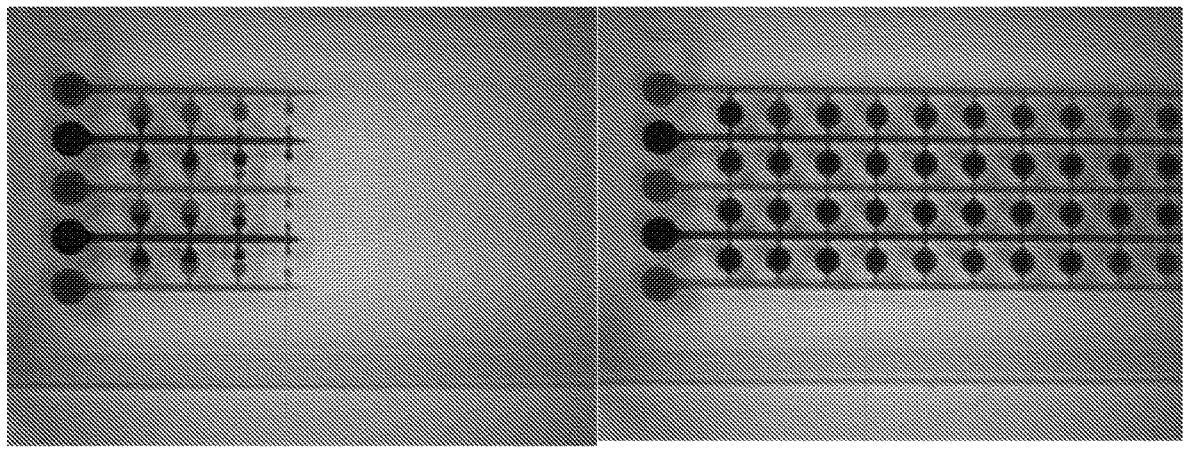
Figure 34         Figure 35
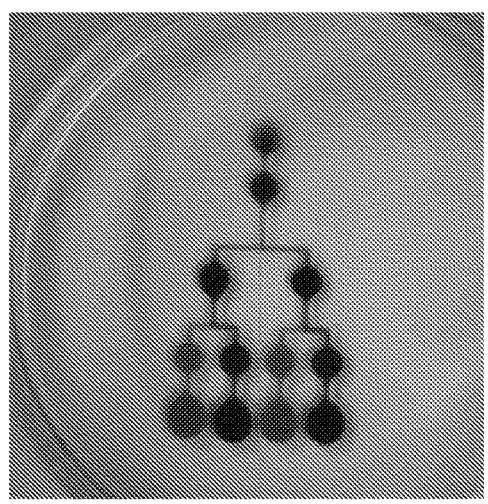     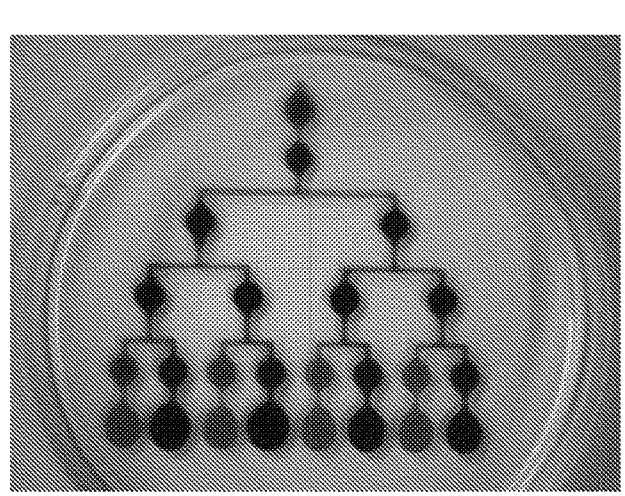
Figure 36         Figure 37

MICROFLUIDIC ARRANGEMENTS

CROSS REFERENCE TO RELATED APPLICATIONS

The present application is a U.S. National Stage filing under 37 U.S.C. § 371 of P.C.T. Application No. PCT/GB2016/053204, filed Oct. 14, 2016, which claims priority to GB Application No. 1518392.4, filed Oct. 16, 2015, GB Application No. 1614150.9, filed Aug. 18, 2016, GB Application No. 1614139.2, filed Aug. 18, 2016, GB Application No. 1614146.7, filed Aug. 18, 2016, GB Application No. 1614157.4, filed Aug. 18, 2016, and GB Application No. 1614153.3, filed Aug. 18, 2016. The foregoing applications are hereby incorporated by reference in their entirety.

The present invention relates to the field of microfluidics.

Microfluidics is a term commonly used to describe the study of fluid flow behaviour inside channels of sub-millimetre cross-section. A microfluidic arrangement (or "network") of chambers and interconnecting channels may be provided on a hydrophilic substrate, such as polydimethylsiloxane (PDMS), for convenient transport/manipulation of fluid or solutes from one chamber to another or within a channel. A substrate having a microfluidic arrangement like this may be called a microfluidic "chip" or "device".

Such a network of chambers and inter-connecting channels is usually defined by solid walls, which are typically etched into the surface of the substrate, or made using PDMS and soft lithography. However, microfluidic arrangements can be slow to create and their formation may require complicated apparatus. Moreover, the biocompatibility of such microfluidic devices remains questionable as the substrate may interact with cells/media in the fluid being transported. For example, in cell biology, cells are often grown on a polystyrene substrate, but polystyrene is used rarely in microfluidic devices.

The ability to add and remove small volumes of reagent(s) to and from small fluid chambers via fluid conduits has many applications in industry, including studies of biological processes like the immune response, cancer, and tissue development, for example. Methods of delivering reagents in microfluidics include using micropipettes, hydrogels, Zigmond chambers, and microfluidic devices, for example.

The invention aims to provide a microfluidic arrangement that is both simple to create and generic.

Basic Microfluidic Arrangement

According to the present invention there is provided a microfluidic arrangement, comprising: a substrate; a first fluid; and a second fluid, which is immiscible with the first fluid; wherein the first fluid is arranged to be covered by the second fluid; and wherein the first fluid is arranged in a given shape on a surface of the substrate, such shape being defined at least in part by the interfacial tension between the first and second fluids.

By utilising the interfacial tension between the first and second fluids to define a given shape (of first fluid) on the surface of the substrate, a very simple, quick to create and cheap microfluidic arrangement may be provided, without relying on the use of structural walls or additional surface patterns. Furthermore, the immiscible second fluid can act to preserve the microfluidic arrangement, from evaporation, for example.

Previously, etched microfluidic chips "hardwired" the fluid interactions, but the invention effectively allows a microfluidic arrangement to be designed, built, and rearranged by an end user as/when required and even during an experiment. Furthermore, revisions to the microfluidic arrangement can be simplified, thereby speeding up the development/discovery process.

A microfluidic arrangement may be for manipulating fluids, for example causing fluid flow, subjecting fluid to desired conditions (physical and/or chemical), observing fluid, separating fluid, mixing fluid, and/or storing fluid. Exampled of fluids include liquids, gases and combinations thereof; liquids or gases containing solids; and flowable solids such as powders.

The surface of the substrate may be unpatterned (other than by the arrangement of the first and second fluids). The surface of the substrate may be unpatterned by chemical surface patterning, physical functionalisation (e.g. with an embedded magnet or electrical field generator), and/or surface topography. The first fluid may be confined in the given shape by a fluid interface between the first and second fluids. The surface of the substrate may be uniform. The surface of the substrate may have a uniform surface chemistry, uniform physical properties and/or a uniform surface topography. A uniform surface topography may be flat and/or without elevated portions, pedestals, depressions, recesses or channels defined in the surface.

The first fluid may be retained in the given shape by a fluid interface between the first and second fluids. The first fluid may be confined in the given shape by a fluid interface between the first and second fluids. The confinement/retention may be at least partial. Interfacial tension may confine the first fluid in the given shape.

Because of the fluid nature of the interface, changes in fluid volume can be accommodated without altering the footprint of the first fluid on the substrate, by altering the contact angle between substrate and fluid. Because of the fluid nature of the interface, the interface can change shape. Change of shape can occur in dependence on a change of conditions, for example addition or removal of fluid, or a change in a fluid flow, or a pressure difference between different portions of the fluids. Because the interface is fluid, the area of the interface between the first and second fluids can change. As the fluid interface changes the area of the footprint of the first fluid on the substrate may increase, or decrease, or remain unchanged.

The first fluid may be arranged as a fluid drop on the surface, whereby to provide a fluid chamber. The fluid drop may be shaped as a truncated sphere or as a flattened truncated sphere.

The microfluidic arrangement may be an array of drops. The microfluidic arrangement may be a microfluidic circuit. The microfluidic circuit may comprise at least one drop and/or at least one conduit.

At least two fluid drops may be provided on the surface, preferably in a spaced arrangement. Preferably, each fluid drop has a volume of less than 1 millilitre; more preferably each fluid drop has a volume of between 10 microlitres and 10 nanolitres, at least initially. The at least two fluid drops may have different volumes.

The first fluid may be (further) arranged on the surface so as to provide at least one fluid conduit (in fluid communication with at least one fluid drop). The first fluid may be arranged on the surface in a line.

Preferably, the at least one fluid conduit has a width of less than 5 cm, preferably less than 10 mm, preferably less than 1 mm, and preferably between about 10 and 700 or 500 microns. Preferably, the at least one fluid conduit has a height of less than 1 mm, and preferably between about 10 and 100 microns. The at least one fluid conduit may be substantially straight. Many other configurations are of course possible, such as a substantially circular (or 'ring-shaped') channel, an arc-shaped channel or a 'dog-leg'-shaped channel, for example.

At least two fluid conduits may be provided on the surface, preferably wherein the at least two fluid conduits fluidly connect at least two fluid drops. The at least two fluid conduits may be, at least in part, substantially parallel.

The first fluid may be arranged as at least three fluid drops on the surface, wherein the at least two fluid conduits interconnect the at least three fluid drops in series.

The first fluid may be arranged as at least three fluid drops on the surface, wherein the at least two fluid conduits are arranged to fluidly connect a first and second fluid drop with a third fluid drop. Alternatively, the at least two fluid conduits may be arranged to fluidly connect the first and second fluid drop with the third fluid drop via at least one other fluid drop. The at least two fluid conduits may have different lengths. The at least two fluid conduits may have different widths.

Preferably, the surface is arranged such that the interfacial tension between the surface and the first fluid substantially maintains the arrangement of the first fluid on the surface. The surface may be hydrophilic or it may be hydrophobic. The substrate, first fluid and the second fluid may be selected for a large advancing contact angle between the first fluid and the substrate. This can provide good capacity to increase the volume of the first fluid within the given shape without altering the footprint of the first fluid on the substrate. The substrate may be hydrophilic, the first fluid may be a polar (hydrophilic) fluid and the second fluid may be a non-polar (hydrophobic) fluid. The first fluid may be an aqueous fluid and the second fluid may be one of: a gas; an oil; and a fluorocarbon. The fluorocarbon may include perfluorotri-n-butylamine and/or perfluoro-n-dibutylmethylamine. The fluorocarbon may be a (1:1) perfluorotri-n-butylamine mixture with perfluoro-n-dibutylmethylamine such as 3M Fluorinert™ FC-40, and/or a perfluoro compound C5-18 such as also referred to as 3M Fluorinert™ FC-40.

The first fluid may be arranged in the given shape such that a cross section area of a feature has a (height:width) aspect ratio of (1:1) or less. The aspect ratio may be (1:2) or less, (1:4) or less, (1:20) or less, (1:50) or less, (1:100) or less, or between (1:50) and (1:500). By providing relatively flat features good capacity to increase the volume of the first fluid within the given shape without altering the footprint of the first fluid on the substrate can be enabled. The feature may be a drop. The feature may be a reservoir.

The first fluid may be arranged in the given shape such that a contact angle is smaller than an advancing contact angle for the first fluid on the substrate and covered with the second fluid. By providing relatively flat features good capacity to increase the volume of the first fluid within the given footprint without altering the footprint of the first fluid on the substrate can be enabled. The contact angle may be less than 50% of the advancing contact angle, and may be less than 25% of the advancing contact angle, or less than 10% of the advancing contact angle. The contact angle may be between 1% and 100% of the advancing contact angle, or between 5% and 50% of the advancing contact angle.

Preferably, at least a region of the surface is substantially flat, wherein the first fluid is arranged in said region. The surface may be peripherally enclosed.

The first fluid may be arranged to be covered by the second fluid such that the surface area of the first fluid that is in contact with the second fluid is greater than the surface area of the first fluid that is in contact with the surface.

The microfluidic arrangement may be suitable for addition of further fluid that is miscible with the first fluid to any portion of the first fluid in the given shape. Addition may be directly by a dispensing tip or indirectly through conduits either from other reservoirs or dispensing tip elsewhere in the circuit that is fluidically connected. The microfluidic arrangement may be suitable for removal of fluid from any portion of the first fluid in the given shape. A footprint of the given shape may remain unchanged upon addition or removal of fluid to or from the first fluid in the given shape.

Because of the fluid nature of the interface between the first fluid and the second fluid changes in volume of the first fluid can be accommodated without altering the footprint of the first fluid on the substrate.

The volume of a drop may be increased by a factor of 100 or less, and optionally 1000 or less, without altering the footprint of the feature. The volume of a drop may be increased by a factor of 10 to 50 or 1 to 50 or 0.01 to 100 or 2 to 100 or 2 to 50 or 5 to 100. The volume of a drop may be decreased by a factor of 100 or less, and optionally 1000 or less, without altering the footprint of the feature. The volume of a drop may be increased or decreased without altering the footprint of the drop. The volume of a feature of the microfluidic arrangement may be increased by a factor of 1 to 50 without altering the footprint of the feature. Because the volume can be increased without altering the footprint the features can for example be used to create a pseudo "fluidic" well plate without solid walls between reservoirs/chambers/wells.

Preferably, the first and second fluids have different densities. For example, the first fluid may be an aqueous solution and the second fluid may be a fluorocarbon, such that the second fluid is denser than the first fluid. Alternatively, the first fluid may be an aqueous solution and the second fluid may be a gas, for example, such that the first fluid is denser than the second fluid. The second fluid may be denser than the first fluid.

If the immiscible second fluid is denser than the first fluid provided on the surface, the surface and first fluid should be arranged such that the interfacial tension between the surface and the first fluid provides a sufficiently strong attractive bond to withstand the buoyancy effects of the lighter first fluid in the denser second fluid.

The first fluid may contain a reagent, preferably, wherein the reagent is (at least initially) contained within the at least one fluid drop. The volume of reagent contained in the first fluid is preferably between 100 nanolitres and 100 microlitres, though other amounts of reagent are of course possible, depending on the size of the fluid drop and the interaction required.

A plurality of fluid drops may be arranged in an array on the surface. The plurality of fluid drops may contain different concentrations of reagent. The reagent may be transported between the at least two fluid drops via at least one fluid conduit.

The fluid drop and/or the feature may have a circular footprint, a square-shaped footprint, a hexagonal footprint, or any other regular or irregular shape of footprint. Selection of a particular footprint shape can enable dense packing of drops, large surface area coverage of drops, and favourable pinning behaviour for capacity to increase the volume of a drop.

The microfluidic arrangement may have a conduit with a height variation of 1-500% along the length of the conduit. The microfluidic arrangement may have a conduit with a height variation along the length of the conduit of 10-20% or more, and/or of 10 microns or more. Because of the fluid nature of the interface between the first fluid and the second fluid pressure differences along the length of the conduit can affect conduit height along the length of the conduit. This can enable a higher fluid flow velocity at a relatively low portion of the conduit compared to the flow velocity in a higher portion of the conduit. The microfluidic arrangement may have a conduit with a height variation along the length of the conduit between 1% and 50% of the conduit width. The microfluidic arrangement may have a conduit with a height variation at different times of 10-20% or more; and/or of 1 micron or more (and preferably of 10 microns or more).

The second fluid may be covered by a third fluid, which is immiscible with the second fluid.

If the fluid drops initially have substantially the same volumes and/or pressures, diffusion may occur between the at least two fluid drops via at least one interconnecting fluid conduit when the surface is maintained in a substantially horizontal orientation. In this arrangement conduits may have a uniform height.

If the surface is inclined to the horizontal, fluid may be transported from an elevated fluid drop to a lower fluid drop via at least one fluid conduit by way of gravity acting on the fluid. If the surface is inclined to the horizontal, fluid may be transported from a lower fluid drop to an elevated fluid drop via at least one fluid conduit by way of gravity acting on the fluid. The direction of transport may be selected by selecting the density of the second fluid compared to the density of the first fluid. The second fluid may be denser than the first fluid for transport toward the elevated drop. The first fluid may be denser than the second fluid for transport toward the lower drop.

If the fluid drops initially have substantially different volumes, differences in Laplace pressures between the fluid drops may cause fluid to be transported between the fluid drops via at least one interconnecting fluid conduit. If the fluid drops initially have substantially different interfacial tension, differences in Laplace pressures between the fluid drops may cause fluid to be transported between the fluid drops via at least one interconnecting fluid conduit. If the fluid drops initially have substantially different radius of curvature, differences in Laplace pressures between the fluid drops may cause fluid to be transported between the fluid drops via at least one interconnecting fluid conduit. Laplace pressure difference is proportional to interfacial tension divided by radius of curvature, so can arise between different shape drops with the same volume, or drops of different fluids with the same shape, for example.

If the fluid drops initially have substantially the same volumes but different footprints, differences in Laplace pressures between the fluid drops may cause fluid to be transported between the fluid drops via at least one interconnecting fluid conduit. Different drops may have different footprint shapes and/or different footprint areas.

A first fluid drop may comprise a first volume of fluid and a second fluid drop may comprise a second volume of fluid, where the first fluid drop and the second fluid drop have the same footprint.

The different volumes of fluid cause different radius' of curvature of the first and second drops, and consequently a difference in Laplace pressures between the two drops arises and a flow of fluid from one drop to the other can occur.

A first fluid drop and a second drop may have different footprints. The first drop and the second drop may have the same volume. For example the footprints may have different areas and/or different shapes. Drops with different footprints (but optionally the same volume) can form drops with different radius' of curvature. This can cause a difference in Laplace pressures between the two drops and consequently a flow of fluid from one drop to the other.

If the fluid drops initially have substantially different volumes, differences in Laplace pressures and/or hydrostatic pressures (for example caused by the difference in elevation level of the second fluid over the top of the drop) between two drops may cause fluid to flow between the fluid drops via at least one interconnecting fluid conduit against the direction of gravity, when the surface is inclined from the horizontal.

A further part of the first fluid may be arranged in a further given shape that is freestanding (that is, not supported directly by the surface of the support) from the surface of the substrate. The further part may be arranged in a given shape on the surface of a further substrate. The further substrate may be arranged in proximity to the substrate. The second fluid may be arranged between the substrate and the further substrate. Similarly fluid can be placed on either side of a planar substrate to create over-lapping conduits with through-holes in said substrate allowing exchange between the circuits on either side of the substrate. Also inverting a drop on one side of a substrate can enable pumping from drops of larger curvature (on the lower surface in the second fluid) to drops of smaller curvature due to hydrostatic pressure caused by the second fluid.

The microfluidic arrangement may further comprise a solid structure for retaining a portion of fluid and comprising an aperture for enabling connection of the fluid within the structure with the first fluid. The substrate may comprise an aperture for enabling connection of the first fluid through the substrate, for example to a further portion of fluid on another surface of the substrate.

Portions of the first fluid may be chemically distinct and may be miscible with one another. In an example one drop contains an aqueous saline solution, a second drop contains a solvent such as ethanol, and a third drop contains a further solvent such as acetone, and a fourth drop contains an aqueous solution containing biological samples.

The first fluid may be suitable for formation of a residue or deposit on the surface after evaporation of the liquid. The first fluid may be suitable for chemical alteration of the surface. The first fluid may be a shear thinning fluid or it may be a shear thickening fluid. The first fluid may be a gel precursor. The first fluid may be a gel. The second fluid may be an aqueous solution. The first fluid may be an aqueous solution. The second fluid may be a gel precursor or a gel. The first fluid may be a solution (aqueous or otherwise) that includes one or more of: trehalose; cell culture media; serum; phosphate buffered saline; and a sugar. The solution may be low concentration solution of 5% by weight of solute or less, preferably 1% or less, and more preferably 0.5% or less.

The first fluid may be frozen to form a solid in said shape on the substrate.

The surface may be, for example, a glass surface or a polystyrene surface. The substrate may be, for example, a glass slide or a polystyrene petri dish.

According to another aspect of the invention there is provided a microfluidic arrangement for manipulating fluids, comprising: a substrate; a first fluid; and a second fluid, which is immiscible with the first fluid; wherein the first fluid is arranged to be at least partially covered by the second fluid; and wherein the first fluid is arranged in a desired shape on an unpatterned surface of the substrate, the first fluid being retained in said shape by a fluid interface between the first and second fluids. The microfluidic arrangement may comprise one or more of the features as aforesaid and/or as follow.

Arrays

According to another aspect of the invention there is provided a microfluidic arrangement comprising an array of drops, comprising: a substrate; a first fluid; and a second fluid, which is immiscible with the first fluid; wherein the first fluid is arranged to be covered by the second fluid;

and wherein the first fluid is arranged in a given array of drops on a surface of the substrate, (the shape of) such drops being defined at least in part by the interfacial tension between the first and second fluids, optionally wherein the volume of a drop is increasable by a factor of up to hundred-fold or reducible by a factor down to one-hundredth without altering the footprint of the drop.

The surface of the substrate may be unpatterned (evidently other than from the arrangement of the first and second fluids). The surface of the substrate may be unpatterned by chemical surface patterning, physical functionalisation and/or surface topography. The first fluid may be confined in the drops by a fluid interface between the first and second fluids. The surface of the substrate may be uniform. The surface of the substrate may have a uniform surface chemistry, uniform physical properties and/or a uniform surface topography. At least a region of the surface may be substantially flat, wherein the first fluid is arranged in said region. The surface may be peripherally enclosed.

The first fluid may be retained in the drops by a fluid interface between the first and second fluids. Because of the fluid nature of the interface changes in fluid volume can be accommodated without altering the footprint of the first fluid on the substrate.

The surface may be arranged such that the interfacial tension between the surface and the first fluid substantially maintains the arrangement of the first fluid on the surface. The surface may be hydrophilic or it may be hydrophobic. The substrate, first fluid and the second fluid may be selected for a large contact angle (preferably advancing contact angle) between the first fluid and the substrate. The substrate may be hydrophilic, the first fluid may be a polar (hydrophilic) fluid and the second fluid may be a non-polar (hydrophobic) fluid. The first fluid may be an aqueous fluid and the second fluid may be one of: a gas; an oil; and a fluorocarbon. The fluorocarbon may include perfluorotri-n-butylamine mixture and/or perfluoro-n-dibutylmethylamine. The fluorocarbon may be a (1:1) perfluorotri-n-butylamine mixture with perfluoro-n-dibutylmethylamine such as 3M Fluorinert™ FC-40, and/or a perfluoro compound C5-18 such as also referred to as 3M Fluorinert™ FC-40. This can enable particularly high biocompatibility.

The first fluid may be arranged in the drops such that a drop cross section area has a (height:width) aspect ratio of (1:1) or less. The aspect ratio may be (1:2) or less, (1:4) or less, (1:20) or less, (1:50) or less, (1:100) or less, or between (1:50) and (1:500). By providing relatively flat drops good capacity to increase the volume of the first fluid within the drop without altering the drop footprint can be enabled.

The first fluid may be arranged in the drops such that a drop contact angle is smaller than an advancing contact angle for the first fluid on the substrate and covered with the second fluid. By providing relatively flat drops good capacity to increase the volume of the first fluid within a drop without altering the footprint of the first fluid on the substrate can be enabled. The contact angle may be between 1% and 100% of the advancing contact angle, or between 5% and 50% of the advancing contact angle.

The drops may be suitable for addition of further fluid that is miscible with the first fluid without altering the drop footprint. The drops may be suitable for removal of fluid from the drops without altering the drop footprint. Because of the fluid nature of the interface between the first fluid and the second fluid changes in volume of the first fluid can be accommodated without altering the footprint of the first fluid on the substrate. Pinning permits changes of the volume in a drop without altering the drop footprint.

The second fluid may be denser than the first fluid. For example the first fluid is an aqueous solution and the second fluid is a denser fluorocarbon. Use of a denser second fluid can promote pinning behaviour such that changes in volume of the drop can be accommodated without altering the footprint of the drop. Alternatively the second fluid may be less dense than the first fluid.

The drops may be arranged on the surface in a spaced arrangement. There may be 96, 384, 1536, 3456 or 9600 drops in the array. For integration with conventional microwell handling robots the drops are preferably arranged with spacings according to standard well plates. The drops may be arranged on the surface in a plurality of rows. Rows may be offset from one another.

Each fluid drop may have a volume of less than 1 millilitre; each fluid drop may have a volume of between 10 microlitres and 10 nanolitres, at least initially. The different drops may have different volumes. The volume of a drop may be between 10 nanolitres and 100 microlitres. The volume of a drop may be increased by a factor of 10 to 50 or 1 to 50 or 0.01 to 100. The volume of a drop may be decreased by a factor of 100 or less, and optionally 1000 or less. Other drop volumes and volume increases are possible, depending on factors including the size of the drop.

A drop may be shaped as a truncated sphere, or as a flattened truncated sphere. A fluid drop may have a circular footprint, a square-shaped footprint, a hexagonal footprint, or any other regular or irregular shape of footprint. Selection of a particular footprint shape can enable dense packing of drops, large surface area coverage of drops, and favourable pinning behaviour for capacity to increase the volume of a drop without changing drop footprint area.

Different drops in the array may have different footprint areas and/or different footprint shapes.

Each drop in the array may contain a different chemical composition. Each drop in the array may contain the same chemical composition. Some drops in the array may contain the same chemical composition, and others may contain different chemical compositions. Some of the drops in the array may be immiscible with other drops in the array.

The second fluid may only partially cover the drops. For example, the second fluid might be 0.5 mm deep, around a drop of first fluid that is 1 mm high, with the first fluid partially exposed. In another example the second fluid is less deep than a drop of first fluid, but a portion of the second fluid forms a thin film over the drop such that the second fluid covers the drop. Such a thin film of the second fluid may be adequate to prevent evaporation of the first fluid. The interfacial tension of the fluids may be selected to encourage or discourage formation of a thin film of the second fluid over the first fluid. A third fluid may partially cover the drops. A third fluid may cover the second fluid.

Portions of the first fluid may be chemically distinct. In an example one drop contains an aqueous saline solution, a second drop contains a solvent such as ethanol, and a third drop contains a further solvent such as acetone, and a fourth drop contains an aqueous solution containing biological samples.

According to another aspect of the invention there is provided a microfluidic arrangement comprising an array of drops, comprising: a substrate; a first fluid; and a second fluid, which is immiscible with the first fluid; wherein the first fluid is arranged to be covered at least partially by the second fluid; and wherein the first fluid is arranged in a given array of drops on an unpatterned surface of the substrate, with each drop cross section area having a (height:width) aspect ratio of (1:2) or less. The microfluidic arrangement may comprise one or more of the features as aforesaid and/or as follow.

Dried Pattern

According to another aspect of the invention there is provided a substrate for a microfluidic arrangement as aforesaid, the substrate having a surface on which a dried out pattern of a microfluidic arrangement is arranged, whereby the microfluidic arrangement may be rehydrated by the introduction of a first fluid to the pattern on the surface. The substrate is preferably a petri-dish. Rehydration may produce a new microfluidic arrangement with the same footprint on the surface as the original microfluidic arrangement prior to dehydration.

The dried out pattern may comprise a residue of an evaporated (dried out) solution. The dried out pattern may form a textured surface or a residue or a deposit on the substrate. Examples of solutions that can form a residue or a dried out pattern include solutions (aqueous or otherwise) that include one or more of: trehalose; cell culture media; serum; phosphate buffered saline; and sugars. The solution may be a low concentration solution of 5% by weight of solute or less, preferably 1% or less, and more preferably 0.5% or less. Solutions may comprise solvents other than water (in place of water or in addition to water), such as acetone or ethanol.

The dried out pattern may be formed by deposition of a solid (in the absence of a solvent) onto a surface, or by deposition of a solution and subsequent removal of the solvent (e.g. by drying). Matter (whether solid or liquid) may be deposited on a surface to form a pattern by a variety of means, including flow from an outlet, repositioning on the surface, ink-jet printing, piezo-electric drop dispensing, ejection from a nozzle, stamping, screen printing, laser printing, electrostatic printing, or xerographic printing, for example. The solid may be deposited in an arbitrary pattern and then the desired pattern may be formed by repositioning the solid into the desired shape.

A second fluid as aforesaid may be arranged to cover the dried out pattern. The second fluid is preferably not a solvent for the dried out pattern.

According to another aspect of the invention there is provided a method of rehydrating a dried out pattern of a microfluidic arrangement as aforesaid.

The rehydrating may include a step of depositing a portion of the first fluid in a region of the dried out pattern, with the first fluid spontaneously flowing into other regions of the dried out pattern. The spontaneous flowing may be by wicking. The rehydrating may include the residue of the evaporated (dried out) solution initiating wicking.

The rehydrating may include a step of exposing the dried out pattern to a gas comprising the first fluid (preferably in gas form and/or in form of dispersed liquid droplets), with the first fluid spontaneously condensing on the dried out pattern. The gas may comprise the first fluid in gas form at 50-95% saturation. The gas may comprise the first fluid in gas form at near saturation, for example at 90-95% saturation. The spontaneous condensation may occur by way of the first fluid dissolving in the second fluid. The dried surface residue may create an osmotic attraction for the first fluid dissolved in the second fluid.

According to another aspect of the invention there is provided a microfluidic arrangement for manipulating fluids, comprising a substrate with a surface and a residue on the surface, wherein the residue is from a dried out fluid arranged in a desired shape. The microfluidic arrangement may comprise one or more of the features as aforesaid and/or as follow.

According to another aspect of the invention there is provided a method of fabricating a microfluidic arrangement for manipulating fluids, comprising: arranging a first fluid on an unpatterned surface of a substrate in a desired shape; arranging a second fluid, which is immiscible with the first fluid, to cover the first fluid at least partially, wherein the first fluid is retained in said shape by a fluid interface between the first and second fluids; and drying the first fluid to form a residue in said shape on the substrate. The microfluidic arrangement may comprise one or more of the features as aforesaid and/or as follow. The method may comprise one or more of the steps as aforesaid and/or as follow.

According to another aspect of the invention there is provided a method of rehydrating a microfluidic arrangement as aforesaid.

According to another aspect of the invention there is provided a substrate for a microfluidic arrangement as aforesaid, the substrate having a surface on which a frozen pattern of a microfluidic arrangement is arranged, whereby the microfluidic arrangement may be reformed by thawing. Once thawed the microfluidic arrangement is functional again and ready for its intended use, whereas the frozen pattern is suitable for handling and transport.

According to another aspect of the invention there is provided a method of fabricating a microfluidic arrangement for manipulating fluids, comprising: arranging a first solid on an unpatterned surface of a substrate in a desired shape to form a residue in said shape on the substrate.

Method of Patterning

According to another aspect of the invention there is provided a method of creating a microfluidic arrangement, comprising: providing a substrate; providing a first fluid; and providing a second fluid, which is immiscible with the first fluid; arranging the first fluid such that it is covered by the second fluid; and arranging the first fluid in a given shape on a surface of the substrate, such shape being defined at least in part by the interfacial tension between the first and second fluids. The first fluid may be confined in the given shape by a fluid interface between the first and second fluids.

The surface of the substrate may be unpatterned (other than by the arrangement of the first and second fluids). The surface of the substrate may be otherwise unpatterned by chemical surface patterning, physical functionalisation (e.g. with an embedded magnet or electrical field generator), and/or surface topography. The first fluid may be confined in the given shape by a fluid interface between the first and second fluids. The surface of the substrate may be uniform. The surface of the substrate may have a uniform surface chemistry, uniform physical properties and/or a uniform surface topography.

Preferably, the first fluid is arranged directly onto the surface, such that interfacial tension between the surface and the first fluid maintains the arrangement of the first fluid on the surface. Arranging the first fluid may comprise depositing at least one drop of fluid onto the surface. Arranging the first fluid may (further) comprise depositing at least one continuous trail of first fluid onto the surface, whereby to provide a fluid conduit (to at least one fluid drop).

The first fluid may be first arranged onto the surface, and then the second fluid may be arranged to cover the first fluid. The second fluid may only partially cover the first fluid. A third fluid may partially cover the first fluid. The second fluid may be first arranged onto the surface, and then the first fluid may be arranged beneath the second fluid.

Depositing the first fluid may comprise drawing an object (such as a probe), preferably wetted by the first fluid, across the surface to provide at least one continuous trail of first fluid on the surface, whereby to provide a fluid conduit. A fluid conduit may be provided between at least two fluid drops arranged on the surface. The object may be in contact with the surface, or in proximity to the surface but not in contact, or at a distance from the surface. The contact angle between the first fluid and the object may be smaller than 90° and more preferably smaller than 80°. This can enable the first fluid to adhere to the object to a degree, and to be dragged along by the object.

Depositing the first fluid may comprise adding a portion of the first fluid to an arbitrary location in the given shape. Arranging the first fluid may comprise removing a portion of the first fluid from an arbitrary location in the given shape. Because a fluid interface confines the first fluid in the given shape the fluid interface confinement can easily adapt; this permits addition or removal of fluid at any desired location in the given shape, unlike in conventional microfluidic arrangement where fluid can only be added or removed at suitable ports.

Arranging the first fluid to provide a given shape on the surface may further comprise causing displacement of a portion of the first fluid to interrupt a connection between different portions of the first fluid. Displacement may comprise drawing an object across a portion of the first fluid. The object may be in contact with the surface, or in proximity to the surface but not in contact, or at a distance from the surface. The object may be a tip, or a needle. The object may be hydrophobic if the first fluid is aqueous. The object may have low wettability with the first fluid. The first fluid may have a high contact angle with the object.

Arranging the first fluid to provide a given shape on the surface may further comprise causing displacement of a portion of the first fluid to form a connection between different portions of the first fluid. Displacement may comprise drawing an object across a portion of the first fluid. The object may be in contact with the surface, or in proximity to the surface but not in contact, or at a distance from the surface. The object may be a tip, or a needle. The object may be hydrophilic if the first fluid is aqueous. The object may have high wettability with the first fluid. The first fluid may have a low contact angle with the object. Displacement of fluid by drawing an object across the surface can allow separating and joining conduits locally, and can enable to stop or start a flow in the conduits.

Arranging the first fluid to provide a given shape on the surface may further comprise: providing a tube into which a fluid can be drawn; filling the tube with the second fluid, whereby the second fluid wets the inner wall of the tube; drawing at least one drop of the first fluid into the tube, wherein the at least one drop is engulfed in the second fluid; and emptying the tube onto the surface to provide at least one fluid drop of first fluid in direct contact with the surface, wherein the first fluid is covered by the second fluid.

Multiple drops of the first fluid may be drawn into the (delivery) tube to create a succession of drops that are engulfed within and separated by the second fluid. The tube may be emptied onto the surface to provide a plurality of fluid drops.

A reagent may be introduced into the first fluid. Preferably, the reagent is introduced into at least one fluid drop. Reagent may be introduced into a plurality of fluid drops, preferably wherein the concentration of reagent is different in at least two fluid drops.

The second fluid may be covered with a third fluid, which is immiscible with the second fluid.

A portion of fluid may be heated and/or illuminated to solidify the fluid. A portion of the first fluid may be deposited over where previously a first portion of the first fluid was deposited. A second layer of the first fluid may be deposited over where previously a first layer of the first fluid was deposited. This can enable formation of complex topographies of the first fluid.

A pump may be used to fill and/or empty the tube onto the surface, preferably a syringe pump. The tube may be part of a fluid delivery device. Preferably, the tube is emptied onto the surface when the surface is substantially horizontal. Another active or passive fluid mover could be employed as a pump in place of a syringe pump.

The surface is preferably flat, at least locally, and, ideally, horizontal during creation of the microfluidic arrangement, or a part thereof. The surface is preferably solid and/or homogenous. The surface may be, for example, a glass surface or a polystyrene surface. The substrate may be, for example, a glass slide or a polystyrene petri dish. The substrate preferably comprises cell culture polystyrene for biocompatibility with cells. Preferably, the surface is peripherally enclosed.

As mentioned above, the first fluid may be deposited directly onto the surface, such that interfacial tension between the surface and the first fluid retains the first fluid on the surface. To deposit the first fluid, a delivery device ("pen") comprising a tube (as described above) may be brought into close proximity of the surface so that when the first fluid emerges from the pen it forms an immediate contact with the substrate.

A fluid delivery device ("pen") comprising a tube filled with the first fluid may be used to draw the continuous trail of first fluid across the surface to connect two fluid drops. Alternatively, the tip of a dry object ("probe") may be drawn (or pulled) across the surface from one fluid drop to one or more additional fluid drops to create continuous interconnecting trails of fluid, which act as fluid conduits, between fluid droplets without requiring additional fluid.

At least a region of the surface may be treated to provide an appropriate interfacial tension with the first fluid, in at least that region.

Preferably, fluid drops each have a volume of roughly between 10 or 100 nanolitres and 10 or 100 microlitres, but could be any volume, though preferably less than 1 millilitre.

The width of the fluid conduit on the surface may be approximately the diameter of the pen or probe used to create the fluid trail and the fluid conduit height may be determined by the interfacial contact angle and/or the fluids used; however, the width is preferably less than half the diameter of the fluid trail. The fluid conduit height is preferably less than half the diameter of the fluid trail, and/or less than half the width of the fluid conduit. The fluid drops may have different volumes. The further fluid conduit(s) on the surface may have different lengths. The further fluid conduit(s) may have different width(s). One or more fluid conduits might connect any two drops. A fluid conduit might divide at a node (or "junction") into one or more branches, and a fluid conduit connecting two fluid drops might contain one or more nodes.

The given shape arranged on the surface may be allowed to dry out to leave a patterned surface, whereby the microfluidic arrangement may be rehydrated later on by adding a volume of the first fluid to the pattern on the surface. The surface may be part of a petri dish, as mentioned above, for example, which could then be provided with pre-formed (and dried out) channels.

The given shape arranged on the surface may be frozen to leave a solid circuit on the surface, whereby the microfluidic arrangement may be thawed later on. The method may comprise freezing the first fluid in the given shape on the surface, and optionally subsequently thawing the frozen first fluid to reform the microfluidic arrangement. The surface may be part of a petri dish, as mentioned above, for example, which could then be provided with pre-formed and frozen circuits.

According to another aspect of the invention there is provided a method of fabricating a microfluidic arrangement for manipulating fluids, comprising: arranging a first fluid on an unpatterned surface of a substrate in a desired shape; arranging a second fluid, which is immiscible with the first fluid, to cover the first fluid at least partially, wherein the first fluid is retained in said shape by a fluid interface between the first and second fluids; and freezing the first fluid to form a solid in said shape on the substrate. The microfluidic arrangement may comprise one or more of the features as aforesaid and/or as follow. The method may comprise one or more of the steps as aforesaid and/or as follow.

Printing

According to another aspect of the invention there is provided a device such as a printer for producing a microfluidic arrangement (preferably as aforesaid) comprising: a liquid reservoir in communication with an outlet; a positioning arrangement adapted to move and position the outlet relative to a substrate; a pumping arrangement adapted to cause flow of liquid from the outlet; and a control arrangement adapted to convert information regarding a desired fluidic shape into motion commands for the positioning arrangement and activate the pumping arrangement so as to cause formation of a microfluidic arrangement and/or so as to cause deposition of a first fluid on the substrate in the desired shape, with the first fluid being retained in said shape by a fluid interface.

The microfluidic arrangement may comprise a fluid arranged in a given shape on a surface of a substrate. The microfluidic arrangement may be one or an array of drops. The microfluidic arrangement may be a microfluidic circuit. The microfluidic circuit may comprise at least one drop and/or at least one conduit. A fluid drop may have a volume of less than 1 millilitre. A fluid drop may have a volume of between 10 microlitres and 10 nanolitres. A fluid drop may be printed to cover different surface areas and/or shapes. A fluid conduit may have a width of less than 2 mm. A fluid conduit may have a width of less than 1 mm. A fluid conduit may have a width between about 10 and 800 microns. A fluid conduit may have a height of less than 1 mm. A fluid conduit may have a height between about 5 and 100 microns. The surface of the substrate may be unpatterned.

The control arrangement may be adapted to cause continuous flow of fluid out of the outlet.

The outlet may be hydrophilic. The outlet may be hydrophilic on the interior. The outlet may be hydrophobic on the exterior. The outlet may comprise a tubular formation. The tubular formation may be hydrophilic. The outlet may comprise a sheath covering a tubular formation. The sheath may be hydrophobic. These arrangements are particularly beneficial for depositing for example an aqueous solution or another polar (hydrophilic) fluid. For deposition of a non-polar (hydrophobic) fluid the outlet (and/or a tubular formation thereof) may be hydrophobic.

The control arrangement may be adapted to cause formation of a liquid bridge (or other form of liquid communication) between the outlet and the substrate.

The control arrangement may be adapted to calibrate a distance between a substrate and the outlet. The control arrangement may be adapted to cause the outlet to approach the surface until a signal is received indicating a known distance between the outlet and the surface. The signal may be user-provided. The signal may be based on camera data. The signal may be based on data from a proximity sensor. The signal may be based on data from a motion resistance detector. The signal may be based on electrical contact or LVT (linear voltage transducer).

The control arrangement may be adapted to cause the outlet to be positioned between 0.1 and 2 times the outlet diameter from the surface for formation of the microfluidic arrangement on the surface. The control arrangement may be adapted to cause the outlet to be positioned between 0.2 and 1 times the outlet diameter from the surface. The control arrangement may be adapted to cause the outlet to be positioned approximately 0.5 times the outlet diameter from the surface (and optionally less than approximately 0.5 times the outlet diameter). The control arrangement may be adapted to cause the outlet to be positioned at least 10 microns from the surface, preferably at least 20 microns from the surface. The control arrangement may be adapted to cause the outlet to be positioned approximately 10 to 200 microns from the surface. The control arrangement may be adapted to cause the outlet to be positioned approximately 20 to 150 microns from the surface. A large distance between the outlet and the surface can cause formation of a wider feature on the surface. Emitted liquid may move through a barrier such as an immiscible liquid layer before arriving at the surface of the substrate.

This may enable fusion of emitted liquid (after moving through a barrier) with a pre-existing portion of fluid on the surface of the substrate.

The pumping arrangement may be adapted to provide a hydrostatic pressure at the outlet to cause flow of liquid from the outlet. The pumping arrangement may be adapted to provide a hydrostatic pressure at the outlet that is less than or equal to the Laplace pressure in a drop formed at the outlet (preferably when a liquid bridge is not formed between the outlet and the substrate). This may enable activation of flow upon bringing the drop formed at the outlet into contact with the surface, and interruption of flow by withdrawing the outlet far enough from the surface to interrupt the liquid bridge between the outlet and the surface.

The control arrangement may be adapted to cause the outlet to be positioned between 3 and 10 times the outlet diameter from the surface for release of a drop of fluid under gravitational acceleration toward the surface. Gravitational acceleration of a drop may enable a drop to move through a barrier such as a liquid film before arriving at the surface of the substrate. This may enable fusion of emitted liquid (after moving through a barrier) with a pre-existing portion of fluid on the surface of the substrate. The outlet may be caused to be positioned at least the maximum drop height that can be supported by the dispensing outlet from the surface. The maximum drop height that can be supported by an outlet corresponds to the size of a drop that can be formed before it falls off under its own weight, and depends on the interfacial tension of the drop and the density of the fluid. Gravitational acceleration of a drop may enable a drop to move through a barrier such as a liquid film before arriving at the surface of the substrate. This may enable fusion (after moving through a barrier) with a pre-existing portion of fluid on the surface of the substrate. In an alternative the outlet is caused to be positioned above the surface and a drop of fluid is caused to be formed suspended from the outlet, and then the outlet is caused to be moved toward the surface until the drop contacts the surface or a fluid on the surface.

The liquid may be an aqueous solution. The liquid may be a shear thinning fluid or it may be a shear thickening fluid. The liquid may be a gel precursor. The liquid may be a gel.

The liquid may be suitable for formation of a deposit on the surface after evaporation of the liquid. The liquid may be suitable for chemical alteration of the surface.

The microfluidic arrangement may comprise portions that are freestanding from the surface of the substrate.

The device or printer may further comprise: one or more further liquid reservoirs in communication with respective one or more further outlets. One or more further positioning arrangements may be provided to move and position the one or more further outlets relative to the substrate. One or more further pumping arrangements may be provided to cause flow of liquid from the one or more further outlets. The control arrangement may be adapted to convert information regarding a desired deposition of further fluid(s) into motion commands for the (further) positioning arrangement(s) and activate the (further) pumping arrangement(s) so as to cause deposition of further fluid(s). This can enable for example formation of an array of drops with different compositions, or of a microfluidic arrangement to be covered by an immiscible further fluid.

The device may further comprise a heater arranged to heat a portion of fluid. Heating a portion of fluid can enable formation of a gel (or another solid) from a fluid, and/or melting of a solid for deposition of a fluid. This can permit use of a wider range of materials for forming a microfluidic arrangement and a more complex microfluidic arrangement. The device may further comprise a light source arranged to illuminate a portion of fluid. Illuminating a portion of fluid can enable formation of a gel (or another solid) from a fluid by initiating crosslinking. The light source may be an ultraviolet light source. By enabling formation of a gel (or another solid), layers can be formed, one on top of the other, to fabricate a more complex 3D-layered fluidic network.

The density of the second fluid may be substantially the same as the density of the first fluid. This can enable portions of the first fluid to remain supported or suspended within the second fluid for formation of a 3D fluidic network.

The device may further be adapted to deposit a portion of the first fluid (or a fluid that is miscible with the first fluid) over where previously a first portion of the first fluid was deposited. This can enable formation of a 3D fluidic network with a complex topography. This can also enable formation of a chamber with a relatively large volume (for a given chamber footprint) as the chamber volume is not limited by the contact angle between the first fluid and the substrate. The device may be adapted to deposit a portion of the first fluid at a greater distance from the substrate than previously deposited portions of the first fluid. The device may be adapted to deposit a second layer of the first fluid (or a fluid that is miscible with the first fluid) over where previously a first layer of the first fluid was deposited. This can enable formation of a layered 3D fluidic network.

According to another aspect of the invention there is provided a method of producing a microfluidic arrangement (preferably as aforesaid) comprising using a device as aforesaid.

According to another aspect of the invention there is provided a method of producing a microfluidic arrangement (preferably as aforesaid) comprising converting information regarding a desired fluidic shape into motion commands for positioning a fluidic outlet and activating a pumping arrangement so as to cause flow of a fluid from the outlet onto a substrate.

The microfluidic arrangement may comprise a fluid arranged in a given shape on a surface of a substrate. The microfluidic arrangement may be an array of drops. The microfluidic arrangement may be a microfluidic circuit. The microfluidic circuit may comprise at least one drop and/or at least one conduit. A fluid drop may have a volume of less than 1 millilitre. A fluid drop may have a volume of between 10 microlitres and 10 nanolitres. A fluid conduit may have a width of less than 1 mm. A fluid conduit may have a width between about 10 and 500 microns. A fluid conduit may have a height of less than 1 mm. A fluid conduit may have a height between about 10 and 100 microns. The surface of the substrate may be unpatterned.

The flow of fluid out of the outlet may be continuous. The flow of fluid out of the outlet may be continuous for a period. The flow of fluid out of the outlet may be continuous during the formation of a plurality of features of the microfluidic arrangement. The flow of fluid out of the outlet may be continuous during the formation of a plurality of drops in an array of drops.

A liquid bridge (or other form of liquid communication) may be formed between the outlet and the substrate. A distance between the substrate and the outlet may be calibrated. A distance between the substrate and the outlet may be calibrated by approaching the outlet to the surface until contact between the outlet and the surface occurs. The outlet may be positioned at least 10 microns (optionally at least 20 microns) from the surface from the surface for formation of a microfluidic arrangement on the surface. The outlet may be positioned approximately half the outlet diameter from the surface for formation of a microfluidic arrangement on the surface (and optionally less than approximately half the outlet diameter). The outlet may be positioned approximately one outlet diameter from the surface for formation of a microfluidic arrangement on the surface (and optionally less than approximately one outlet diameter).

By suitable arrangement of the outlet, substrate and fluid a hydrostatic pressure may be provided at the outlet to cause flow of liquid from the outlet. The hydrostatic pressure at the outlet may be less than or equal to the Laplace pressure in a drop formed at the outlet (preferably when a liquid bridge is not formed between the outlet and the substrate). This may enable activation of flow upon bringing the drop formed at the outlet into contact with the surface, and interruption of flow by withdrawing the outlet far enough from the surface to interrupt the liquid bridge between the outlet and the surface. This arrangement can provide a passive on/off pumping mechanism to cause flow of liquid from the outlet only when the outlet is located in close proximity to the surface.

The formation of the microfluidic arrangement may occur in a gas environment. A further immiscible fluid may be arranged to cover the microfluidic arrangement. The formation of the microfluidic arrangement may occur in the environment of an immiscible further liquid.

The outlet may be positioned between 3 and 10 times the outlet diameter from the surface for release of a drop of fluid under gravitational acceleration toward the surface. The outlet may be positioned at least the maximum drop height that can be supported by the dispensing outlet from the surface. The maximum drop height that can be supported by an outlet corresponds to the size of a drop that can be formed before it falls off under its own weight, and depends on the interfacial tension of the drop and the density of the fluid. Gravitational acceleration of a drop may enable a drop to move through a barrier such as a liquid film before arriving at the surface of the substrate. This may enable fusion (after moving through a barrier) with a pre-existing portion of fluid on the surface of the substrate. In an alternative the outlet is positioned above the surface and a drop of fluid is caused to form suspended from the outlet, and then the outlet is caused to move toward the surface until the drop contacts the surface or a fluid on the surface.

The liquid may be an aqueous solution. The liquid may be a shear thinning fluid or it may be a shear thickening fluid. The liquid may be a gel precursor. The liquid may be a gel.

The liquid may be suitable for formation of a deposit on the surface after evaporation of the liquid. The liquid may be suitable for chemical alteration of the surface.

The microfluidic arrangement may comprise portions that are freestanding from the surface of the substrate.

Reverse Printing

According to another aspect of the invention there is provided a method of fabricating a microfluidic arrangement for manipulating fluids, comprising: arranging a first fluid on an unpatterned surface of a substrate in a desired shape; and arranging a second fluid, which is immiscible with the first fluid, to cover the first fluid at least partially, wherein the first fluid is retained in said shape by a fluid interface between the first and second fluids.

Arranging the first fluid in the desired shape may comprise arranging the first fluid in an arbitrary shape on the surface, and repositioning the first fluid into the desired shape. The first fluid may be arranged in a thin film. The first fluid may wet the surface. The first fluid may form a film that is 1 mm thick or less, or 100 microns or less, or 10 microns or less, or 1 micron or less, for example. The repositioning may be akin to the technique of sgraffitto in conventional patterning.

Repositioning the first fluid may comprise drawing an object across the surface to displace a portion of the first fluid. Drawing can enable particularly effective displacement of the first fluid. The object may be in contact with the surface, or in proximity to the surface but not in contact, or at a distance from the surface. The object may be a tip, a needle, or a tube. The object may be in contact with the surface, or in proximity to the surface but not in contact, or at a distance from the surface to reposition the fluid.

The contact angle between the first fluid and the object is preferably greater than 90°. This can assist in particularly efficient displacement of the first fluid. The contact angle between the second fluid and the object is preferably smaller than 90° and more preferably smaller than 80°. This can assist in the second fluid being drawn in to take the place of the first fluid as the object moves, and thus assist in stabilising the repositioning.

If the first fluid is aqueous then the object is preferably hydrophobic, for particularly effective displacement. If the second fluid is a fluorocarbon then the object is preferably fluorophilic. This can enable the second fluid to take the place of the first fluid and so encourage the displacement. The object may comprise polytetrafluoroethylene (also referred to as Teflon or PTFE) for hydrophobic and fluorophilic properties.

The drawing may comprise drawing a number of approximately parallel lines to form one or more conduits of the first fluid. This can enable particularly efficient formation of conduits. The drawing may comprise drawing a number of approximately parallel lines in a first direction, and drawing a number of approximately parallel lines in a second direction (preferably approximately orthogonal to the first direction) to form one or more chambers (preferably rectangular or square chambers). This can enable particularly efficient formation of an array of chambers.

The drawing may comprise drawing a number of approximately parallel lines in a first direction to form one or more strips of the first fluid; then adding one or more portions of fluid to the one or more strips; and then drawing a number of approximately parallel lines in a second direction to form one or more chambers. This can enable efficient addition of fluid to the microfluidic arrangement.

For regularity the drawing may comprise forming two fluid portions that both have the same footprint perimeter length. The drawing may comprise halving a fluid portion along a symmetry line of that fluid portion's footprint.

Repositioning the first fluid may comprise stamping the surface with an object to displace a portion of the first fluid. Stamping can enable particularly quick formation of complex patterns. For stamping the object may comprise a face that is formed in a pattern corresponding to the desired shape. If the first fluid is aqueous the object is preferably hydrophobic, and/or if the second fluid is a fluorocarbon the object is preferably fluorophilic; preferably the object comprises polytetrafluoroethylene.

The method may comprise: first arranging the first fluid in an arbitrary shape on the surface; then arranging the second fluid to cover the first fluid at least partially; and then repositioning the first fluid into the desired shape. Due to the presence of the second fluid prior to repositioning the first fluid, the second fluid can take the place of the first fluid and so encourage the first fluid to remain in the repositioned arrangement.

Further fluid can be added to the first fluid at any time during the formation process. In an example, a first step of repositioning is followed by a second step of addition of further fluid, and then a third step of repositioning follows. This can enable for example addition of further fluid to a large formation rather than to multiple smaller formations.

Printer Zeroing

According to another aspect of the invention there is provided a method of zeroing a device (such as a printer) for producing a microfluidic arrangement, the method comprising: moving a holder part toward a substrate, the holder part holding an outlet part and the outlet part having a tip facing the substrate, such that first the tip is brought into contact with the substrate, and then the outlet part moves relative to the holder part as the holder part continues to move toward the substrate; stopping the holder part; and moving the holder part a desired distance from the substrate, without the outlet part moving relative to the holder part.

Because the outlet part can move relative to the holder the outlet part can be made to approach the substrate without risk of damage on impact. This permits the tip to approach the substrate without great precision, enabling simplicity and cost efficiency, but with the outcome that the tip is in contact with the surface, enabling high precision of the zeroing. The can enable accurately positioning the outlet part at a desired distance away from the substrate.

For simplicity the outlet part may slide relative to the holder part. Sliding can provide stability while permitting motion. Friction associated with sliding can provide a mechanism for permitting the parts to move relative to one another when a force is applied, but also for the parts to remain joined with no relative movement when no force is applied.

For simplicity the holder part may be stopped after it has moved a predetermined distance toward the substrate. This can enable avoiding complex detection arrangements.

For reliability the holder part may be stopped after contact between the tip and the substrate is detected. This can help ensure that the tip and substrate do indeed come into contact, and also help avoid the outlet part travelling far enough relative to the holder part to cause problems. The contact between the tip and the substrate may be detected by optical detection, user input, and/or electrical detection.

The method may further comprise a step of fixing the outlet part relative to the holder part before moving the holder part a desired distance from the substrate. This can ensure the parts to remain robustly joined with no relative movement.

According to another aspect of the invention there is provided an outlet assembly for a printer for producing a microfluidic arrangement, the outlet assembly comprising a holder part holding an outlet part having a tip, such that when a force is applied to the tip the outlet part moves relative to the holder part, and such that when no force is applied to the tip the outlet part remains in a given configuration relative to the holder part.

Because the outlet part can move relative to the holder the outlet part can be made subject to a force without risk of damage to the outlet assembly or a printer to which the outlet is attached. This permits a method of zeroing a device as aforesaid with simplicity, cost efficiency, and precision. The zeroing can enable accurately positioning the outlet part at a desired distance away from the substrate.

The holder part may comprise a low friction surface for bearing the outlet part. This can permit the parts to move relative to one another when only a relatively small force is applied, such that resilient deformation of the outlet assembly is minimal and on retraction of the holding part the outlet part does not lag. The static frictional coefficient between the holder part and the outlet part may be between 0.01 and 0.5, preferably between 0.01 and 0.1, and more preferably between 0.04 and 0.08.

The holder part may comprise a polytetrafluoroethylene sleeve. A polytetrafluoro-ethylene sleeve can provide a particularly convenient low friction surface for bearing the outlet part.

The outlet part may comprise a metallic tube, preferably a steel tube. A metallic tube can provide a particularly stiff outlet part with little resilient deformation such that on retraction of the holding part the outlet part does not lag. A steel tube can be particular cheap and compatible.

The holder part may comprise a rubber sleeve, preferably a silicone rubber. A rubber sleeve can enable particularly robust gripping of the outlet assembly by the printer.

The outlet assembly may comprise a rubber sleeve as holder part for attachment to a device such as a printer, a metallic tube as outlet part arranged within the rubber sleeve, and a polytetrafluoroethylene sleeve arranged between the rubber sleeve and the metallic tube. This arrangement can provide particularly favourable combination of stiffness, ease of sliding and gripability. The polytetrafluoroethylene sleeve may move relative to the rubber sleeve and/or the metallic tube as the rubber sleeve and the metallic tube move relative to one another. The sleeve arrangement can enable good support of the different components in a range of relative configurations.

Transporting—Laplace Pressure and Hydrostatic Pressure

According to another aspect of the invention there is provided a method of transporting fluid through a microfluidic arrangement as described above, comprising: arranging a first fluid drop to have a greater volume than a fluidly connected second fluid drop, whereby differences in Laplace pressures and/or hydrostatic pressures between the two drops causes fluid to flow between the two fluid drops.

Active pumping can also be utilised, where the volume of a fluid drop may be increased/decreased to create differences in Laplace pressures and/or hydrostatic pressures between the fluid drops and thereby alter flow rates in both direction and magnitude. In other words, it is possible, either continuously or intermittently, to add/remove fluid from any fluid drop, which will in turn alter the flow rates between interconnected fluid drops.

The method of transporting may comprise adding a first volume of fluid to the first fluid drop and adding a second volume of fluid to the second drop, where the first fluid drop and the second fluid drop have the same footprint, preferably the same footprint area and shape. Where pressures in the first fluid drop and the second fluid drop are in equilibrium prior to addition of the fluid, and the first fluid drop and the second fluid drop receive different volumes of fluid, the addition of the fluid causes a difference in Laplace pressures between the two drops and consequently a flow of fluid from one drop to the other.

The method of transporting may comprise adding a first volume of fluid to both the first fluid drop and the second drop, where the first fluid drop and the second fluid drop have different footprints. For example the footprints may have different areas and/or different shapes. Where the first fluid drop and the second fluid drop are in equilibrium prior to addition of the fluid, and the first fluid drop and the second fluid drop each receive the same volume of fluid, the addition of the fluid causes a difference in Laplace pressures between the two drops and consequently a flow of fluid from one drop to the other.

Transporting—Gravity

According to another aspect of the invention there is provided a method of transporting fluid through a microfluidic arrangement as described above, comprising: elevating a first fluid drop above a fluidly connected second fluid drop to utilise gravity to cause fluid to flow from the elevated drop to the lower drop. The second fluid may be less dense than the first fluid. The second fluid may be air or gas.

Transporting—Gravity (Overlay)

According to another aspect of the invention there is provided a method of transporting fluid through a microfluidic arrangement as described above, comprising: elevating a first fluid drop above a fluidly connected second fluid drop such that the height of the second fluid above the second fluid drop is substantially greater than the height of the second fluid above the first fluid drop, whereby to cause fluid to flow from the second fluid drop to the first fluid drop, wherein the second fluid is a liquid. This method utilises the effect of different hydrostatic pressures on the fluid drops created by the respective amounts (height) of the second fluid (liquid) above them. If the surface is inclined to the horizontal, fluid may be transported from a lower fluid drop to an elevated fluid drop via at least one fluid conduit by way of gravity acting on the fluid. For transport toward the elevated drop the second fluid may be denser than the first fluid. For transport toward the lower drop the first fluid may be denser than the second fluid. If the second fluid is less dense than the first fluid, then flow between drops may be from high to low elevation; if the second fluid is denser than the first fluid then flow may be from low to high elevation.

If the first and second fluids are of substantially the same density, flow may be driven by differences in Laplace pressures between the drops and elevation may become relatively unimportant.

By tilting the surface away from a flat, horizontal orientation, an elevation difference created between the at least two fluid drops of the first fluid can cause fluid to flow between the two fluid drops due to the differing heights of the second fluid over the respective drops. In other words, different hydrostatic pressures are exerted by the second fluid on the at least two fluid drops such that fluid may flow "uphill" through the microfluidic arrangement, against gravity, due to the greater hydrostatic pressure that is being exerted on the lower fluid drop by the second fluid than that on the elevated fluid drop.

Causing fluid to flow using the methods described above may be referred to as "passive pumping". The rate of passive pumping may be controlled by adjusting the elevation difference between the first and second fluid drops. The first fluid drop may be elevated above the second fluid drop by tilting the surface away from the horizontal. Passive pumping may also be achieved if the first fluid drop is higher than the second fluid drop, even on an otherwise level substrate. One of the fluid drops may be arranged to have a greater volume (and so greater height) than the other fluid drop, whereby differences in hydrostatic pressures between the drops can cause fluid to flow when the microfluidic arrangement is substantially horizontal.

One of the fluid drops may be arranged to have a greater volume (and so larger radius of curvature) than the other fluid drop, whereby differences in Laplace pressures between the drops can cause fluid to flow when the microfluidic arrangement is substantially horizontal. This flow will stop when the pressure within each drop is the same. The radius of curvature of the drop is related to both contact angle, volume of drop, wetted area, and density differences between fluids; it is also dependent on the interfacial tension. The first and second fluid drops may have equal interfacial tension. A hydrostatic pressure difference can counter a Laplace pressure difference between two drops.

Thus, the invention also provides a method for the controlled transfer of fluid or solutes from one fluid drop to another through interconnecting fluid conduits, which method could be implemented in high-throughput applications, e.g. drug screening.

If the second fluid is less dense than the first fluid, then flow between drops may be from high to low elevation; if the second fluid is denser than the first fluid then flow may be from low to high elevation. If the first and second fluids are of substantially the same density, flow may be driven by differences in Laplace pressures between the drops and elevation may become relatively unimportant.

Studying Interfacial Tension Change

According to another aspect there is provided a method of determining an interfacial tension between a first fluid and a second fluid, comprising exposing a microfluidic arrangement (optionally as aforesaid) to a chemical (such as a surfactant) and evaluating the resulting change in shape of a feature of the microfluidic arrangement to determine an indication of change in interfacial tension. The feature may be a drop.

Because a microfluidic arrangement is used dynamic exposure to chemicals is enabled, and so dynamic changes to the interfacial tensions can be observed and studied. Because a microfluidic arrangement is used only small quantities of chemical are required.

An immiscible further fluid may be arranged to cover the drop (or the microfluidic arrangement).

The drop shape prior to exposure may be an equilibrium drop shape with an equilibrium contact angle. The drop shape following exposure may be a bell shape. The drop shape may morph in shape over time if the interfacial tension reduces, commonly (but not exclusively) providing a bell shaped drop. Further reduction in interfacial tension may cause the drop shape to alter further and part of the drop to break away from the upper section of the drop. The evaluation of interfacial tension may comprise determining an inflection point on the flank of the drop shape. The evaluation of interfacial tension may comprise determining a radius of curvature at the inflection point. The evaluation of interfacial tension may comprise determining a vertical distance between a top of the drop and the inflection point. The evaluation of interfacial tension may comprise calculating a hydrostatic pressure difference based on a vertical distance. Drop size may be varied to suit/improve the accuracy of the interfacial tension measurement range.

For further information on the interfacial tension distribution along the surface of the drop the evaluation may comprise determining angle/curvature and hydrostatic pressure everywhere along the surface of the drop. The evaluation may comprise comparing an equilibrium contact angle with the angle at the inflection point.

The exposure may comprise adding a surfactant to the immiscible further fluid arranged to cover the microfluidic drop. The fluid may be immersed in a denser fluid. The fluid may be an aqueous solution immersed in a fluorocarbon.

According to another aspect there is provided a method of detaching a portion of fluid from a microfluidic arrangement (optionally as aforesaid), comprising exposing the microfluidic arrangement to a chemical (such as a surfactant) to cause a change in interfacial tension between a first fluid and a second fluid. The feature may be a drop. Reduction in interfacial tension at a drop or other microfluidic feature may cause the drop shape to alter and part of the drop may break away, typically from an upper section of the drop. The exposure may comprise adding a surfactant to the immiscible further fluid arranged to cover the microfluidic drop. The fluid may be immersed in a denser fluid. The fluid may be an aqueous solution immersed in a fluorocarbon.

General Features

According to another aspect there is provided a microfluidic arrangement and/or a method of producing a microfluidic arrangement, the microfluidic arrangement comprising: a substrate; a first fluid; and a second fluid, which is immiscible with the first fluid; wherein the first fluid is arranged to be at least partially covered by the second fluid; and wherein the first fluid is arranged in a given shape on a surface of the substrate. The following features may be provided independently or in combination:

- the shape may be defined at least in part by interfacial tension;
- the first fluid may be retained in the given shape by a fluid interface;
- the surface of the substrate may be unpatterned (for example by chemical surface patterning, physical functionalisation and/or surface topography); the surface of the substrate may be uniform (e.g. having a uniform surface chemistry, uniform physical properties and/or a uniform surface topography);
- walls/interfaces/boundaries may be fluid (not solid); walls/interfaces/boundaries forming the microfluidic arrangement may be fluid; walls/interfaces/boundaries forming the given shape on the surface may be fluid;

the area of the interface between the first fluid and the surface may be smaller than the area of the interface between the first fluid and the second fluid;

the surface area of the first fluid that is in contact with the second fluid may be greater than the surface area of the first fluid that is in contact with the surface;

addition or removal of first fluid from the arrangement may change the area of the interface between the first fluid and the second fluid;

second fluid may be denser than the first fluid; or the first fluid may be denser than the second fluid; or the density of the second fluid may be substantially the same as the density of the first fluid;

the substrate, the first fluid and the second fluid may be selected for a large contact angle (preferably advancing contact angle) between the first fluid and the substrate;

the substrate may be hydrophilic, the first fluid may be a polar (hydrophilic) fluid, and the second fluid may be a non-polar (hydrophobic) fluid;

the first fluid may be aqueous and the second fluid may be one of: oil; fluorocarbon; air; FC40;

a cross section area of a microfluidic feature of the arrangement may have a (height:width) aspect ratio of (1:1) or less; or (1:2) or less; or (1:4) or less; or (1:20) or less; or (1:50) or less; or (1:100) or less; or between (1:50) and (1:500); the feature may be a drop (or reservoir);

a contact angle of the first fluid with the substrate may be smaller than an advancing contact angle; the contact angle may be less than 50%, less than 25%, or less than 10% of the advancing contact angle; the contact angle may be between 1% and 100% of the advancing contact angle.

the microfluidic arrangement may be suitable for addition of further (miscible) fluid to and/or removal of fluid from an arbitrary portion of the first fluid;

the microfluidic arrangement may be suitable for addition of further (miscible) fluid to and/or removal of fluid from the first fluid without altering a footprint of the first fluid on the substrate;

the arrangement may comprise an array of drops and/or a circuit; the circuit may comprise at least one reservoir and at least one conduit;

a drop (chamber) footprint may be non-circular (for example square or hexagonal or irregular);

a conduit height may vary significantly along a conduit; the height may vary in dependence on a pressure;

different drops may have the same volumes but different footprints;

different drops may have the same footprints but different volumes;

a conduit may be freestanding from the surface of the substrate;

a solid structure may be provided for retaining a portion of fluid and comprising an aperture for enabling connection of fluid within the structure with microfluidic arrangements as aforesaid;

a fluidic feature of the microfluidic arrangement (such as a conduit) may be interrupted by displacing a portion of fluid from the feature;

a microfluidic arrangement may be dried; a dried microfluidic arrangement may be reconstituted;

a microfluidic arrangement may be frozen; a frozen microfluidic arrangement may be thawed; and the volume of a feature of the microfluidic arrangement (such as a drop or reservoir) may vary over time.

According to another aspect there is provided a microfluidic arrangement and/or a method of producing a microfluidic arrangement, the microfluidic arrangement comprising: an un-patterned substrate; a first fluid; and a second fluid, which is immiscible with the first fluid; and one or more of the following features, independently or in combination:

the substrate is planar;

the area of the interface between the first fluid and the substrate is less than that of the fluidic wall interface between the first fluid and the second fluid;

the first fluid is arranged to provide at least two liquid reservoirs connected by at least one first fluid conduit on the un-patterned substrate;

the first fluid is arranged to provide at least one liquid reservoir on the substrate;

the first fluid is retained in a fixed footprint shape by a fluid-fluid-solid interface between the first and second fluids and the substrate;

a further fluid that is miscible with the first fluid is added to/removed from the first fluid to change the shapes or volumes of features of the microfluidic arrangement and thereby induce a flow (passive pumping) through the microfluidic arrangement;

when fluid is flowing in the conduit the fluidic wall morphs in shape, leading to a variation of vertical height and cross section area in the flow direction of the conduit with the contact area of the first fluid on the substrate remaining constant;

there is a change in the mean velocity along the conduit length;

if there is no fluid flow in the microfluidic arrangement due to equalisation of pressure in the fluidic arrangement the cross sectional area of the conduit is largely equal along the length of the channel;

a further fluid that is miscible with the first fluid is added to/removed from the first fluid in the same plane as the microfluidic arrangement;

a further fluid that is miscible with the first fluid is added to/removed from the first fluid at any location within the fluid arrangement a further fluid that is miscible with the first fluid is added to/removed from the first fluid causes the conduit cross sectional area and/or height and/or shape to morph (due to the resulting flow);

a further fluid that is miscible with the first fluid is added to/removed from the first fluid with the contact area of the first fluid on the substrate remaining constant;

a further fluid that is miscible with the first fluid is added to/removed from the first fluid in a volume less than that required to exceed the advancing contact angle or down to zero contact angle;

any number of conduits and reservoirs make up the fluidic arrangement;

there is no reservoir in the microfluidic arrangement and it consists only of at least one conduit;

there is no conduit in the microfluidic arrangement and it consists only of at least one reservoir;

there is an arrangement of at least one or more conduits connected to a single reservoir in the microfluidic arrangement;

there is an arrangement of at least one reservoir and at least one conduit;

the substrate is a treated or untreated cell culture dish or glass;

the first fluid is aqueous and the second fluid is a fluorocarbon, preferably FC40;

a second fluid is added over a first fluid after the microfluidic arrangement is created to prevent evaporation of the first fluid;

the first fluid is allowed to evaporate;

the first fluid is allowed to evaporate (dry) providing a textured patterned surface resulting from the residue of the first fluid (dependent on the choice of composition of the first fluid and/or and the molecules dissolved therein);

the evaporated (dried) fluid reservoir or plurality of dried fluid reservoirs are overlaid with the second fluid (which is preferably a liquid, preferably a fluorocarbon);

the microfluidic arrangement is rehydrated by the addition of a fluid to a dried microfluidic arrangement;

the microfluidic arrangement is rehydrated in a humid environment, such as a humid cell incubation chamber, and preferably due to the transfer of fluid through the second fluid onto the dried surface;

there is no communication between a plurality of reservoirs;

the second fluid is a liquid;

the second fluid is arranged to cover the substrate surface before the first fluid is arranged on the surface;

wherein the process of arranging the first fluid on the surface occurs between the second fluid and the substrate to minimize evaporation of the first fluid;

an active pumping mechanism consisting of a liquid reservoir in communication with any part of the microfluidic arrangement through a liquid bridge (or other form of liquid communication) at the outlet of the fluid reservoir;

arranging an active pump (such as a syringe pump) to supply fluid to the microfluidic arrangement for greater control with passive pumping;

using a fluorophilic device to cut the microfluidic arrangement (or a feature thereof off) at any location within the microfluidic arrangement and thereby stop flow and create smaller features of the first fluid on the surface;

using a hydrophilic device to join features of the microfluidic arrangement by bringing the tip into contact with two features of the microfluidic arrangement initially not in communication, or by drawing a hydrophilic tip between two features of the microfluidic arrangement initially not in communication, to create a communication path between features of the microfluidic arrangement;

a plurality of cuts and joins events at a plurality of locations over time;

the second fluid is added over the first fluid to prevent evaporation of the wetted surface;

a fluid miscible with the first fluid is added, preferably with less volume than required to exceed the advancing contact angle of the reservoir, preferably through the second fluid, preferably in the same plane as the evaporated fluidic reservoirs to at least one of the dried out first fluid reservoirs for reconstitution of the fluid reservoir while maintaining the same footprint as the original reservoir of the first fluid (and preferably maintaining the same footprint as the original reservoir);

adding and/or removing additional fluid aliquots to/from the now fluid reservoir while maintaining the contact area between reservoir and substrate but morphing the fluidic walls shapes;

the area of the interface between reservoir and substrate is less than that of the fluidic interface between fluids reservoir and the second fluid;

a second fluid, which is immiscible with the first fluid added before complete evaporation of the reservoir of the first fluid;

fluid is added to a reservoir by creating a drop on the tip of a tube and then bringing the drop into contact with the reservoir on the surface; one or more drops may be added as long as the position of the pinning line of the reservoir on the surface does not advance;

fluid is added or removed by bringing a tip into the first fluid reservoir and using a pumping device to deliver/extract a continuous flow up to the advancing contact angle and down to zero volume;

the first fluid (optionally that is used to create a plurality of reservoirs on the substrate) is a low concentration (for example <0.5%) of trehalose or phosphate buffered saline (PBS) or cell media alone or a combination thereof which is then allowed to evaporate and leave a patterned structure on the surface;

the patterned array is allowed to evaporate and may be rehydrated by the addition of the first fluid at a later date by the addition of a fluid miscible with the first fluid to the dried reservoirs;

a miscible fluid is added or removed to form reservoirs (drops) of different shapes or volumes and thereby induce a flow (passive pumping) in the microfluidic arrangement;

the fluidic arrangement is frozen by bringing at least one of the fluids below its freezing point;

the frozen microfluidic arrangement is thawed and retains its shape on the surface and becomes a functional microfluidic arrangement (and optionally the microfluidic arrangement is capable of receiving a miscible fluid at any location to the microfluidic arrangement and optionally the microfluidic arrangement is capable of morphing of the fluid/fluid interface while maintaining the wetted area and shape between the first fluid and the substrate);

a fluorophilic tip is lowered through the second and first fluid until it contacts the substrate and is moved along the substrate surface and thereby passes through the aqueous fluid on the surface which is displaced from the surface at the front and replaced by fluorocarbon at the back of the tip resulting in an altered fluidic arrangement of the first fluid on the surface;

multiple patterns of the first fluid are cut out on the surface;

multiple fluorophilic or hydrophilic tips in parallel create an array of similar shaped patterns;

the tip first cuts the first fluid into conduits of any thickness, and then cuts orthogonally to create an array of discrete fluidic reservoirs;

the spacing of the cuts equals that in standard well plates to provide a fluidic well plate on a planar surface;

the first fluid is cell media containing cells and the resultant fluidic arrangements on the surface contain approximately equally distributed cell numbers;

after the first cut different cell types or fluids are added to each conduit prior to the orthogonal cut with the fluorophilic tip to produce an array where adjacent reservoirs on the fluidic well plate contain different cell types;

a hydrophilic tip has a diameter of at least half the distance between the first fluid reservoirs to creating a communication path between such reservoirs;

a fluorophilic tip displaces the first fluid resulting in a pattern in the first fluid on the surface thereby providing a microfluidic arrangement with smaller features; and the aqueous layer is not overlaid with an immiscible fluid, but the tip is wet by an immiscible fluid, preferably FC40.

According to another aspect there is provided a device such as a printer for producing a microfluidic arrangement (optionally as aforesaid), and/or a method of producing a microfluidic arrangement (optionally as aforesaid) with a device such as a printer, optionally with one or more of the following features, independently or in combination:

- a liquid reservoir in communication with a substrate through a liquid bridge (or other form of liquid communication), preferably formed between the fluid exit from liquid reservoir and the fluid/substrate;
- a positioning arrangement adapted to move and position the outlet relative to a substrate;
- a pumping arrangement adapted to cause flow of liquid from the outlet resulting in the deposition of a trail of fluid on the surface forming a liquid microfluidic arrangement;
- a control arrangement adapted to convert information regarding a desired fluidic shape into motion commands for the positioning arrangement and activate the pumping arrangement so as to cause formation of a microfluidic arrangement;
- the printer is a standard printer device as used for printing a liquid on paper; and
- the printing surface is a non-absorbing surface, and optionally a surface of a fluid.

According to another aspect there is provided a stamping device for producing a microfluidic arrangement (optionally as aforesaid), and/or a method of producing a microfluidic arrangement (optionally as aforesaid) with a stamping device, optionally with one or more of the following features, independently or in combination:

- the stamping device is of a hydrophilic material, and/or has a hydrophilic surface or surface portion;
- the stamping device is an absorbing material (such as a sponge), and/or has an absorbent surface or surface portion;
- the desired shape of the microfluidic arrangement forms the outline of the stamping device that comes into contact with the substrate where said device and is wetted with fluid; and
- the stamp is suitable for bringing into contact with a substrate to leave a pattern on the substrate (optionally wherein the substrate is initially un-patterned), In all of the embodiments described herein, either the surface and first fluid may both be hydrophilic or the surface and first fluid may both be hydrophobic, so that appropriate interfacial tensions between the surface and the first fluid retain the shape defined by the first fluid on the surface.

Importantly, the first and second fluids must be immiscible such that interfacial tension between them defines the given shape on the surface, for example one or more fluid drops(s) and/or fluid conduit(s).

The fluid conduit may be of microscale height (e.g., between around 1-100 or 5-100 or 10-100 microns), and may preferably have a width approximately to the width of the object used to create it. Wider channels can be created by forming two channels in close proximity and allowing them to join and form one larger channel.

The above-described immiscible "second fluid" may be gas/air or a liquid, and may be described as having a different "phase" to the "first fluid" due to the immiscibility of the two fluids. In a preferred embodiment, ambient air provides the second fluid, wherein the first fluid is preferably a liquid. A skilled person will recognise that a given shape of first phase (e.g., an aqueous solution), arranged to define a given shape on a surface, will be covered by ambient air (i.e., a gas), which is an immiscible fluid, without having to 'actively' cover the first fluid. This arrangement may be preferred for short term experiments, such as those of less than 12 hours duration, for example.

As referred to herein, the term "Laplace pressure" preferably connotes the pressure difference between the inside and the outside of a curved surface, and the difference in Laplace pressure between a pair of curved surfaces. The pressure difference is caused by the radius of curvature of the drop and/or interfacial tension of the interface between two different fluids.

As referred to herein, the term "fluid conduit" preferably connotes a fluid pathway (or channel), for conveying fluids. The term 'channel' may be used synonymously to the term 'conduit' (and in either case preferably refers to a fluid pathway on a flat surface portion and not contained in a depression). As referred to herein, the term "fluid circuit" preferably connotes a number of features that are in fluidic communication with to one another, for example a reservoir and a conduit. The term 'network' may be used synonymously to the term 'circuit'. The term 'drop' may be used synonymously to the term 'chamber' or the term 'reservoir'.

As referred to herein, the term "tube" preferably connotes a hollow cylinder or hollow structure having an arbitrary cross-sectional shape (e.g., of metal, plastic, glass, etc.) suitable for holding or transporting a fluid and includes (but is not limited to) a pipe or a fluid chamber. As referred to herein, the term "needle" preferably connotes a hollow needle (e.g. a hypodermic needle or an otherwise), and may be used synonymously to a tube.

Any apparatus feature as described herein may also be provided as a method feature, and vice versa. Furthermore, any feature in a particular aspect of the invention may be provided independently and/or applied to other aspects of the invention, in any appropriate combination.

One or more examples of the present invention will now be described with reference to the accompanying figures, in which.

Figure 6A:
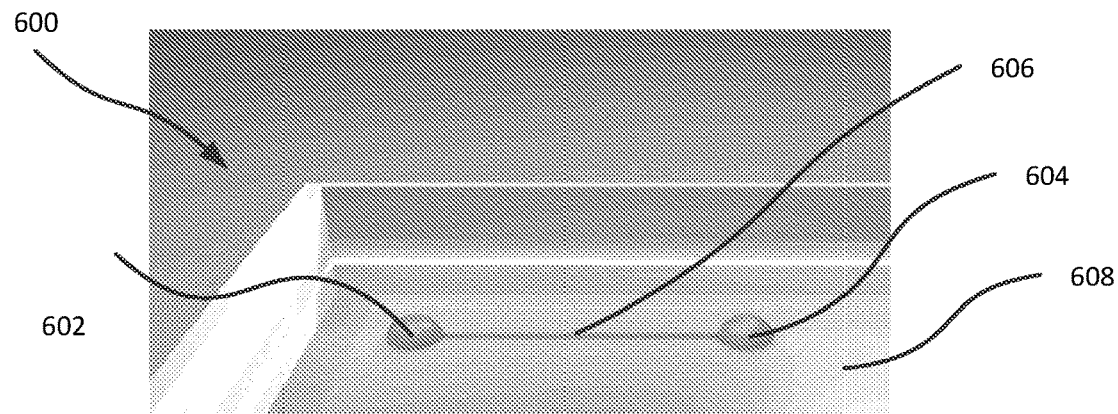
Figure 6B:
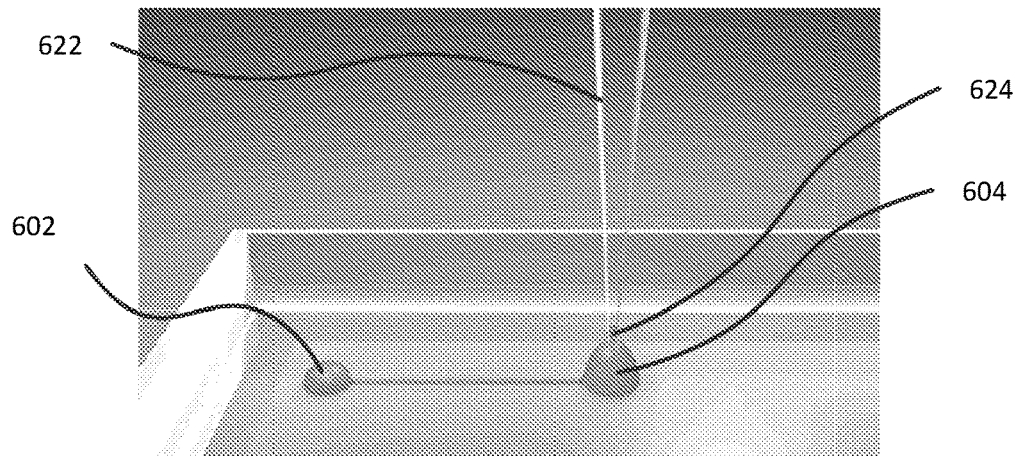
Figure 6C:
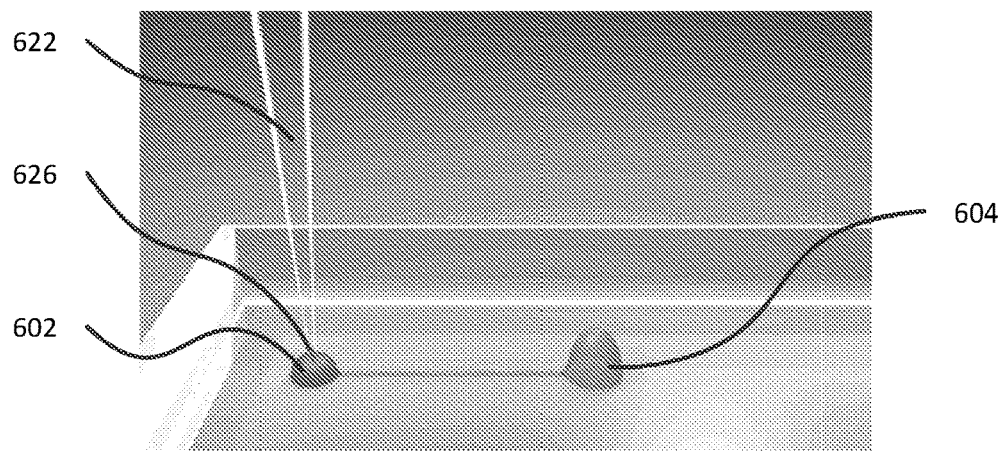
Figure 9:
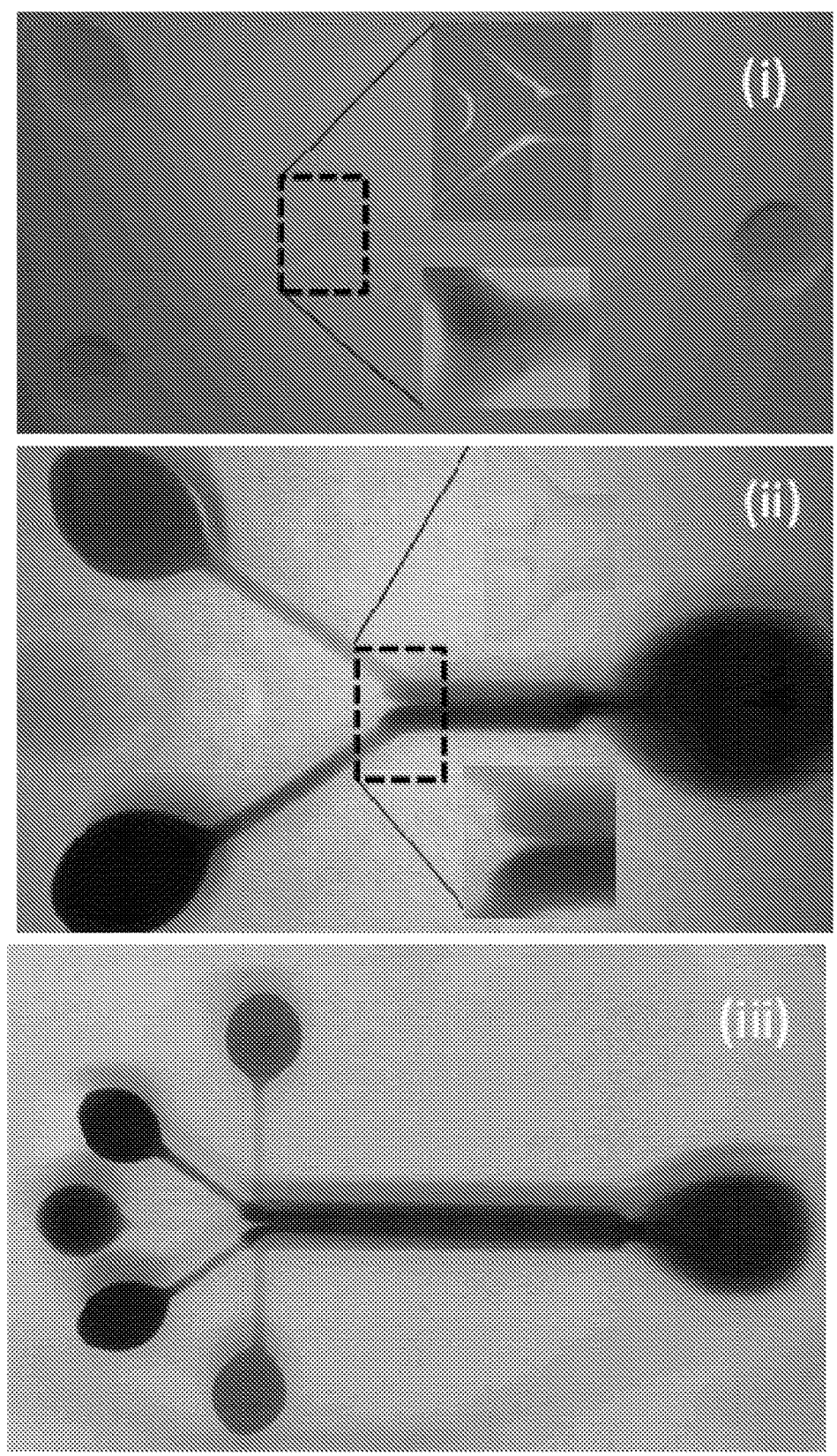
Figure 10:
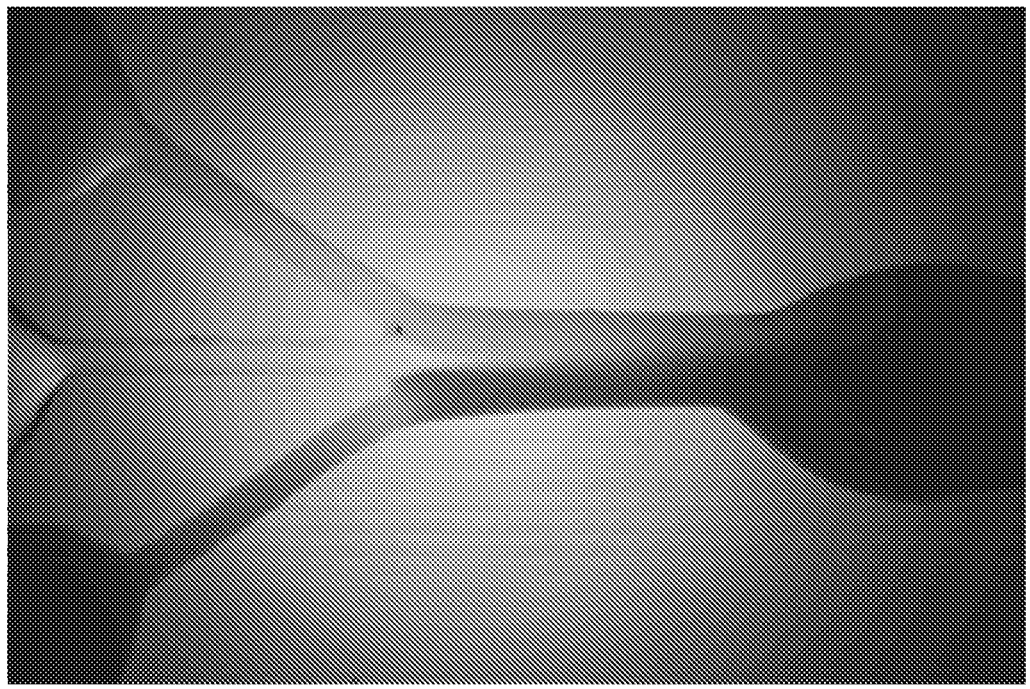
Figure 11:
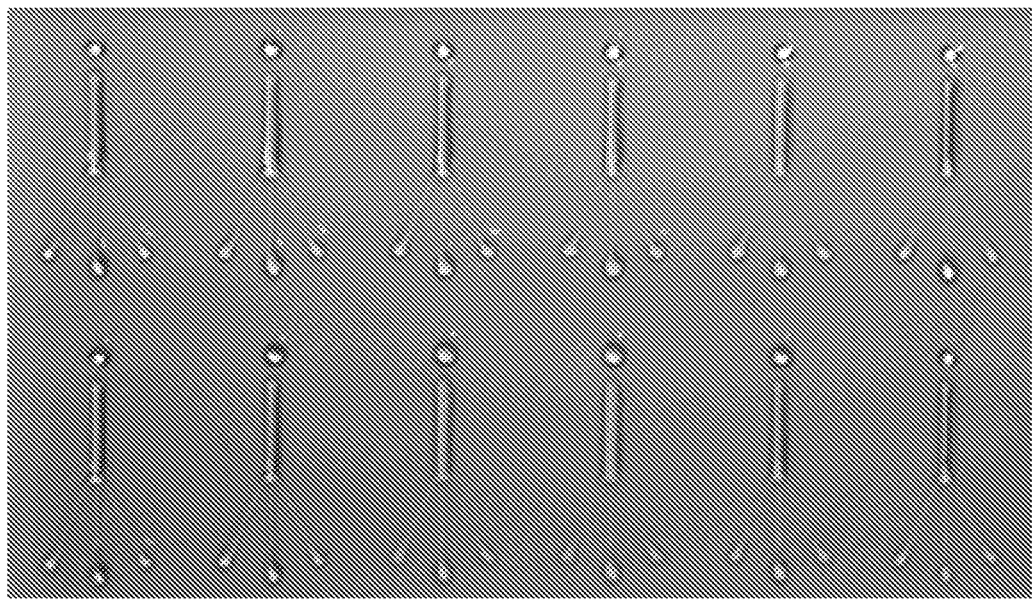
Figure 12:
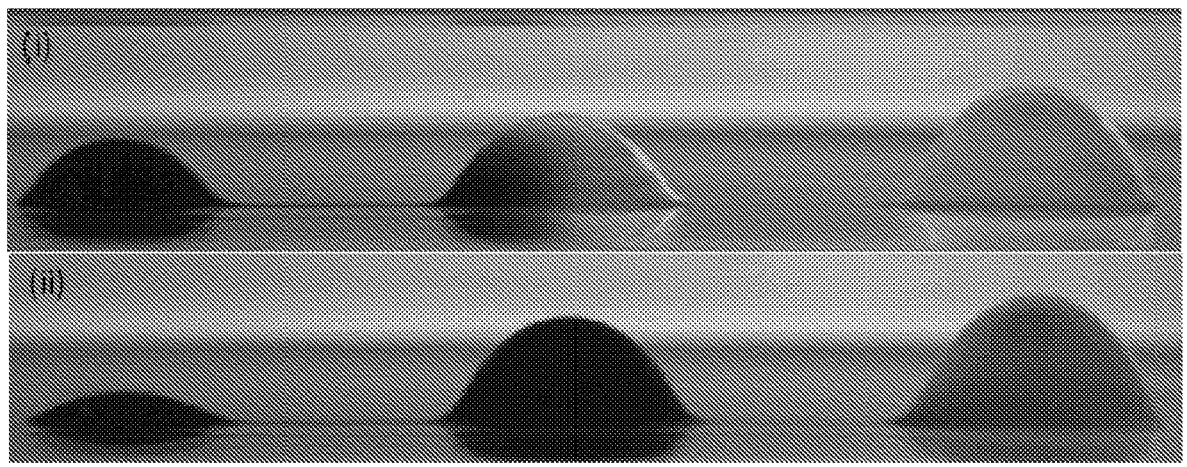
Figure 13:
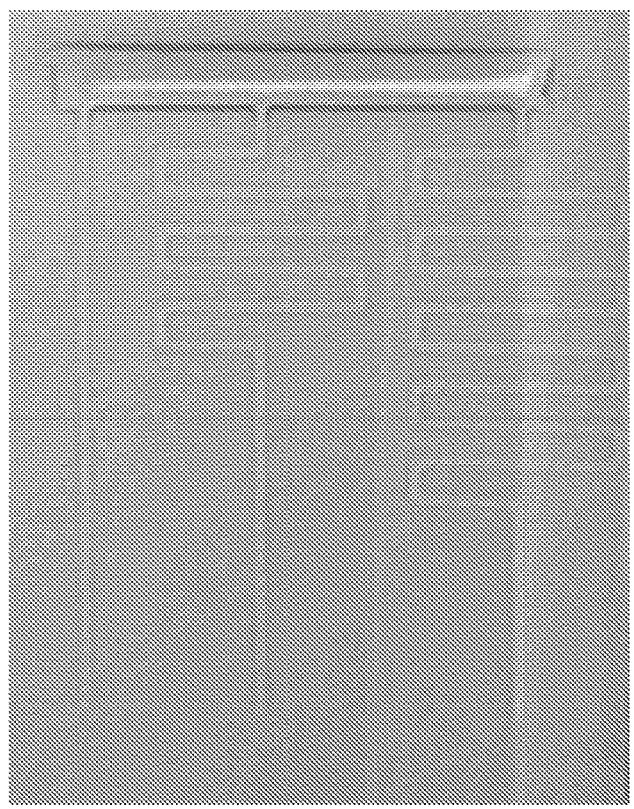
Figure 14:
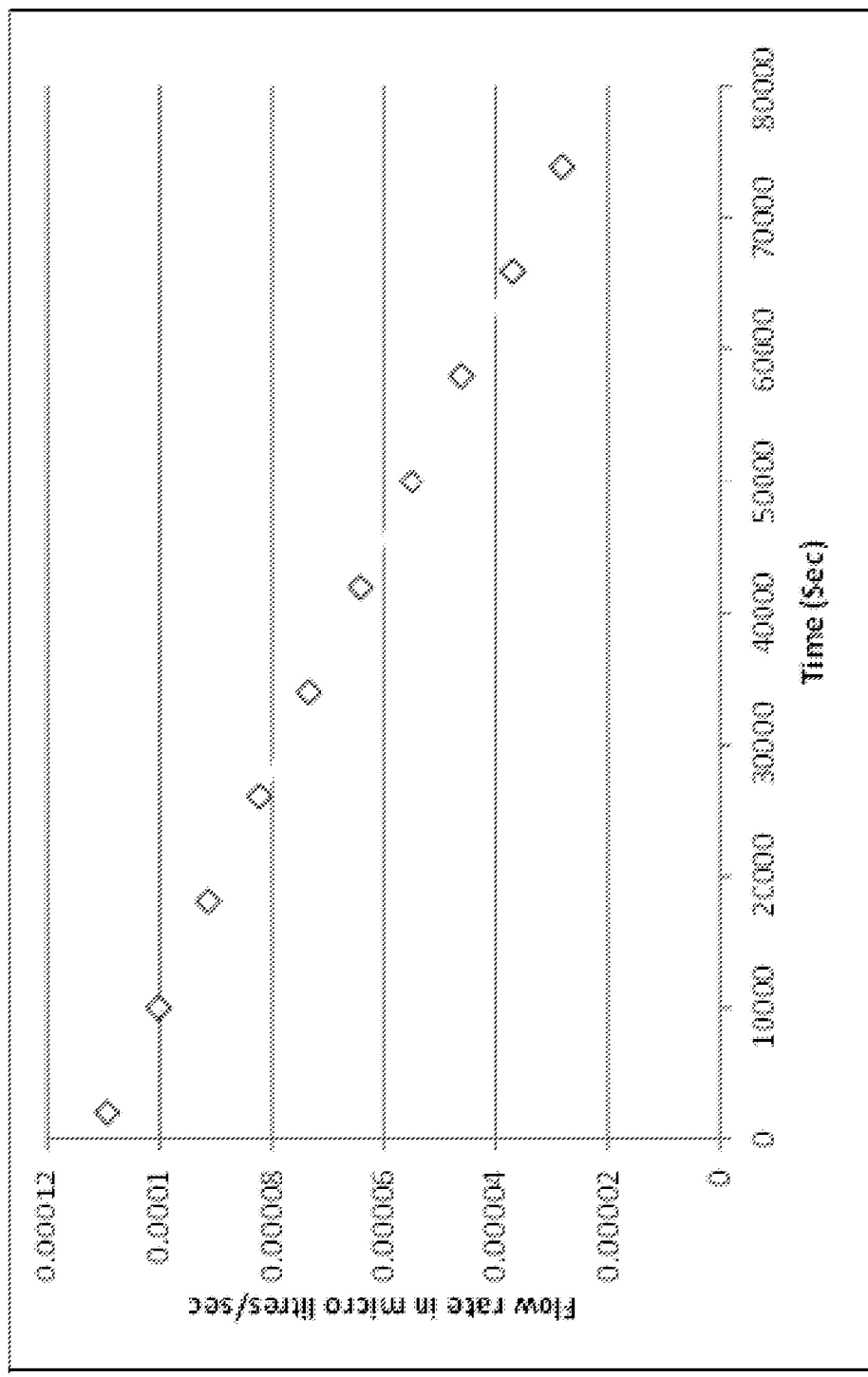
Figure 15A:
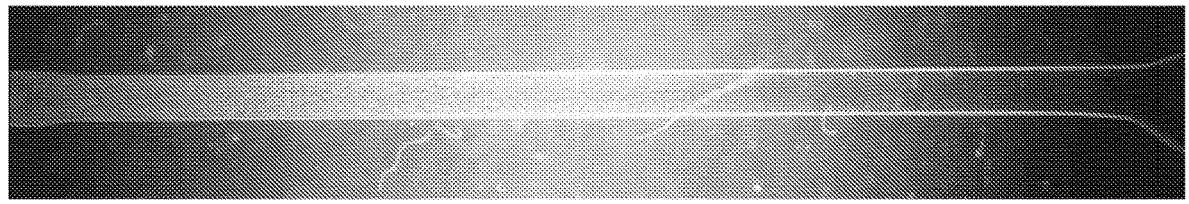
Figure 15B:
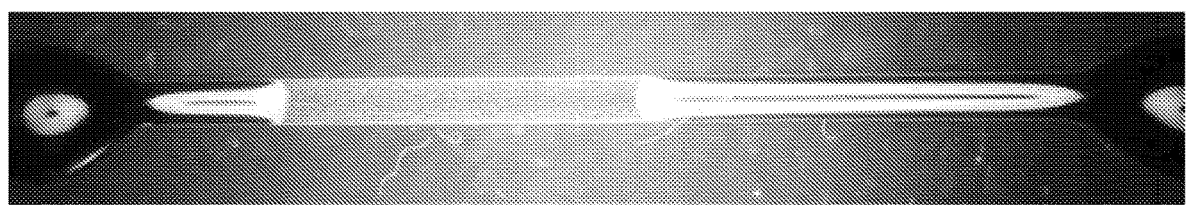
Figure 15C:
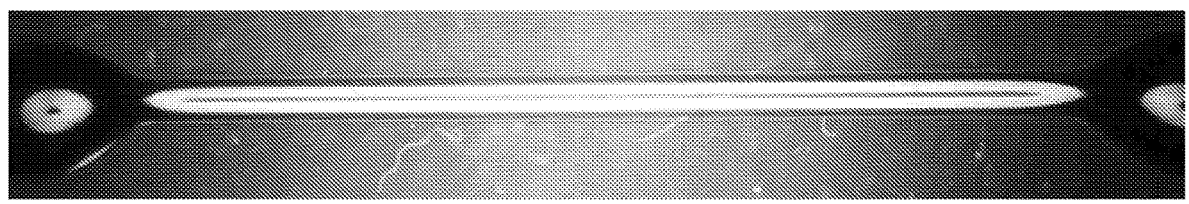
Figure 16A:
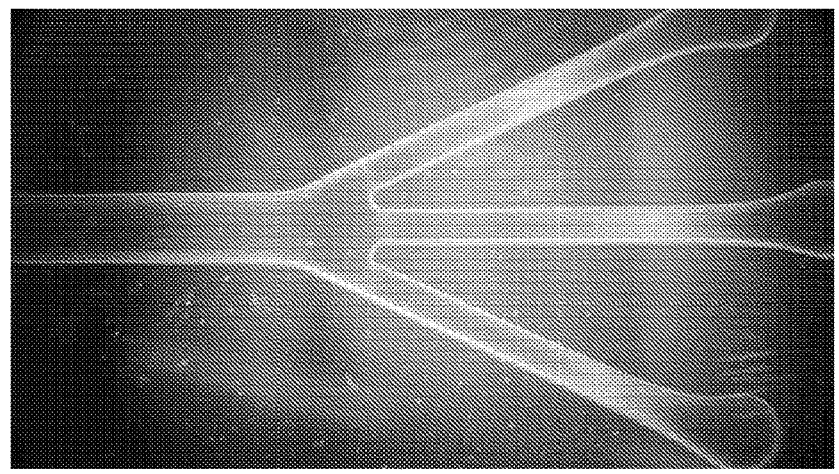
Figure 16B:
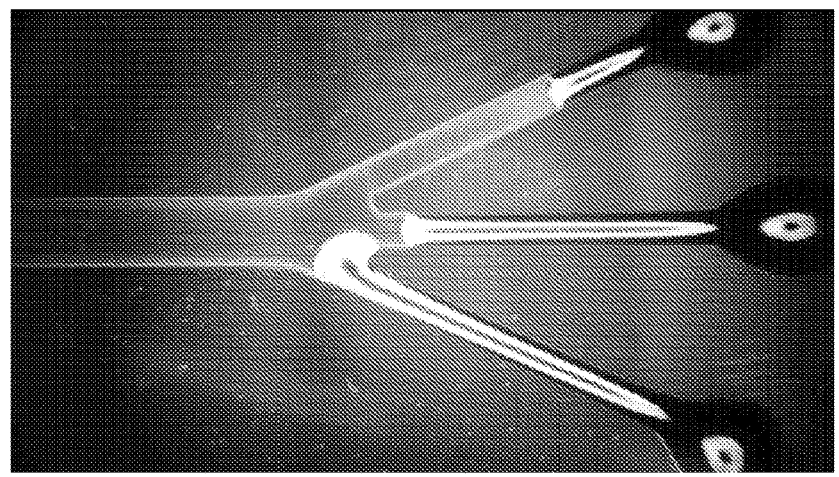
Figure 16C:
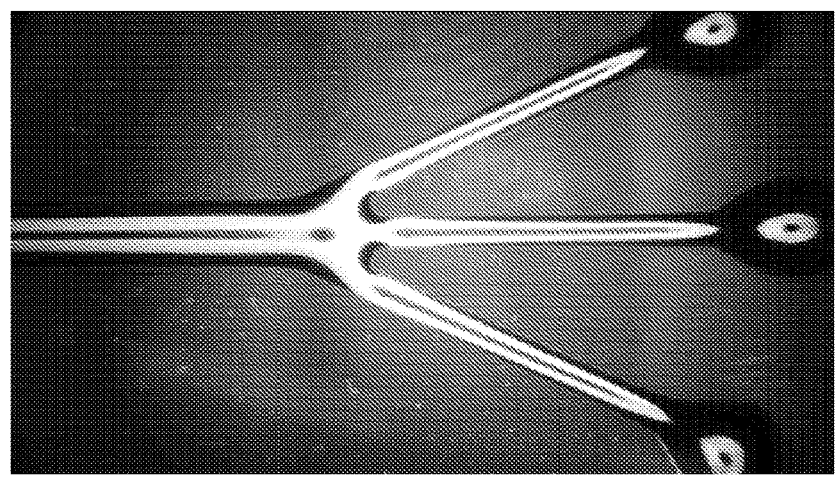
Figure 18:
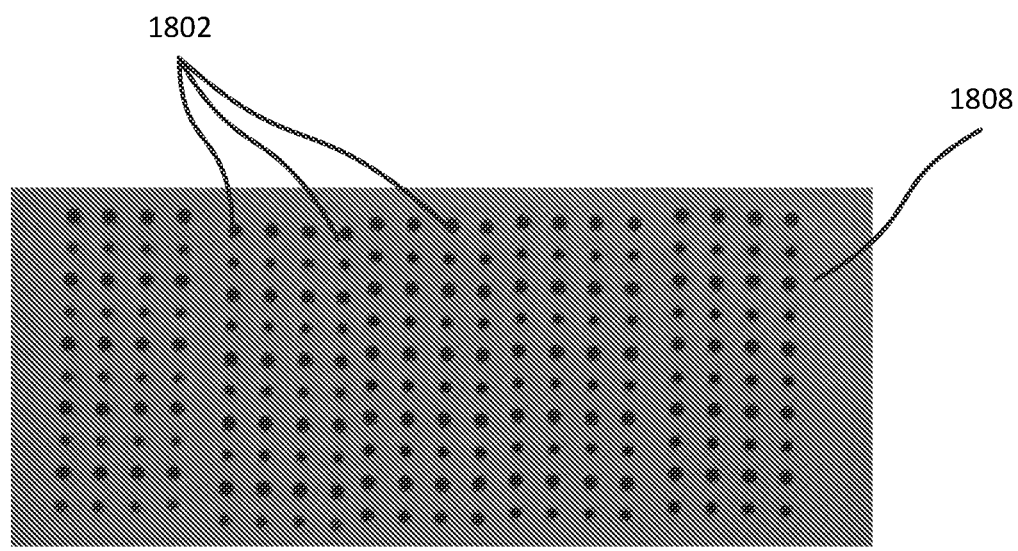
Figure 19I:
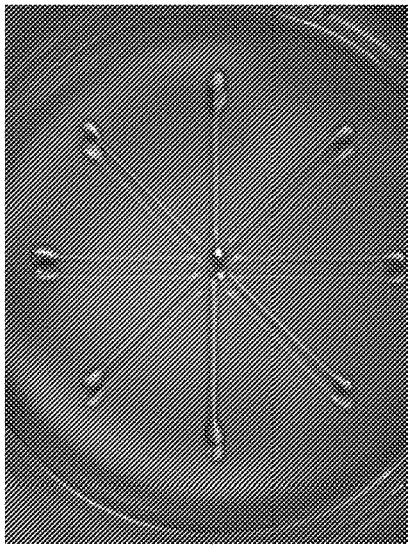
Figure 19:
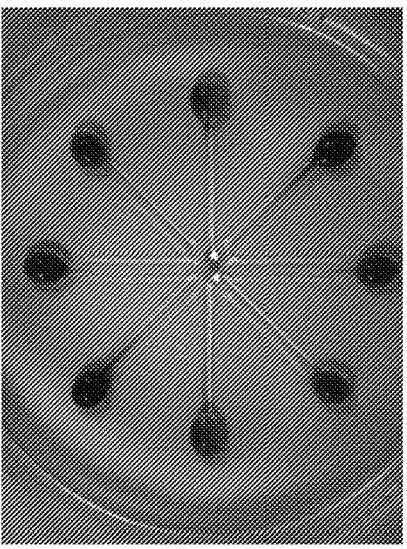
Figure 19:
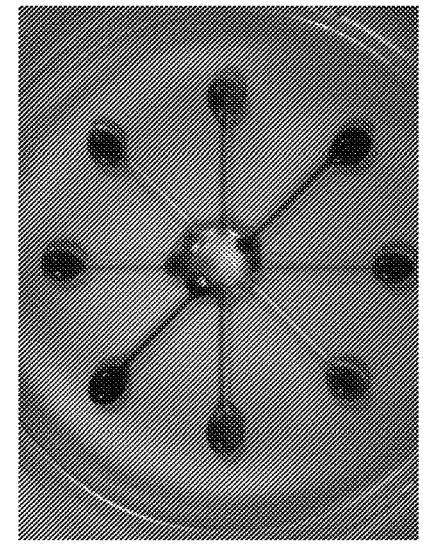
Figure 19V:
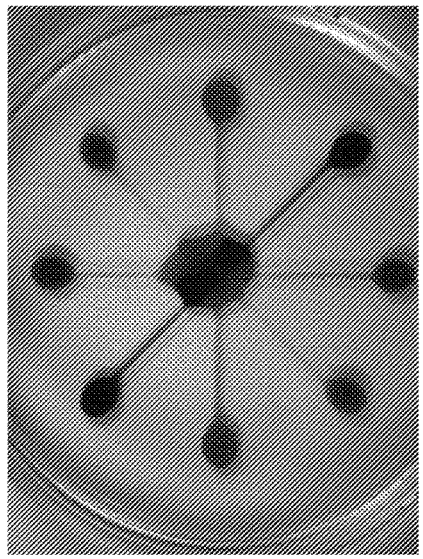
Figure 24A:
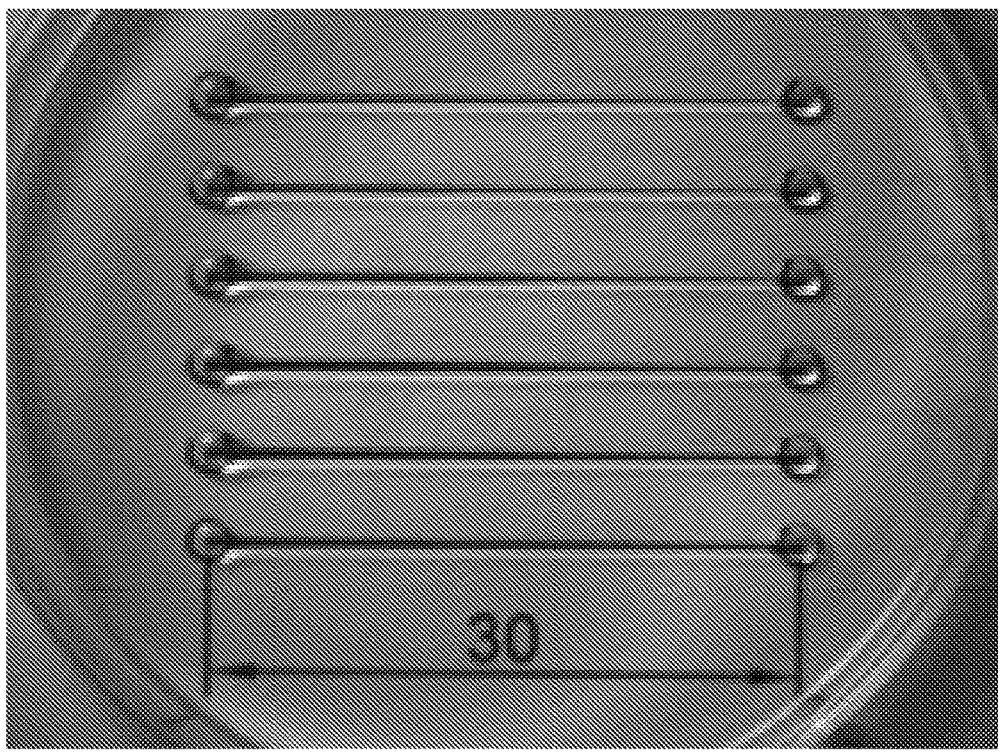
Figure 24B:
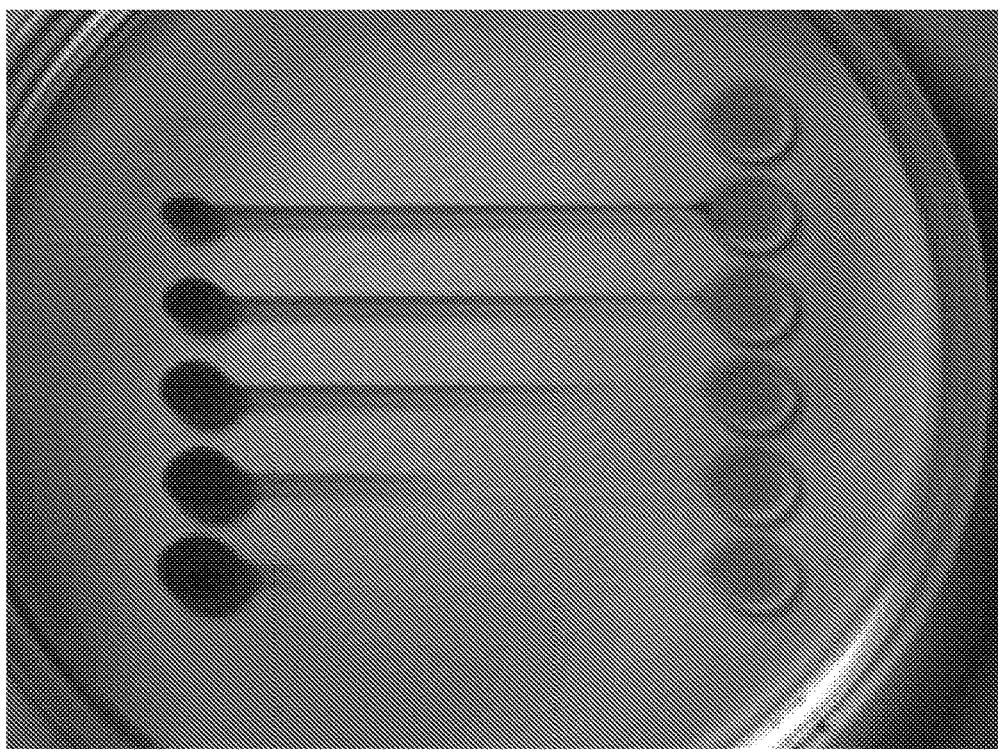
Figure 38:
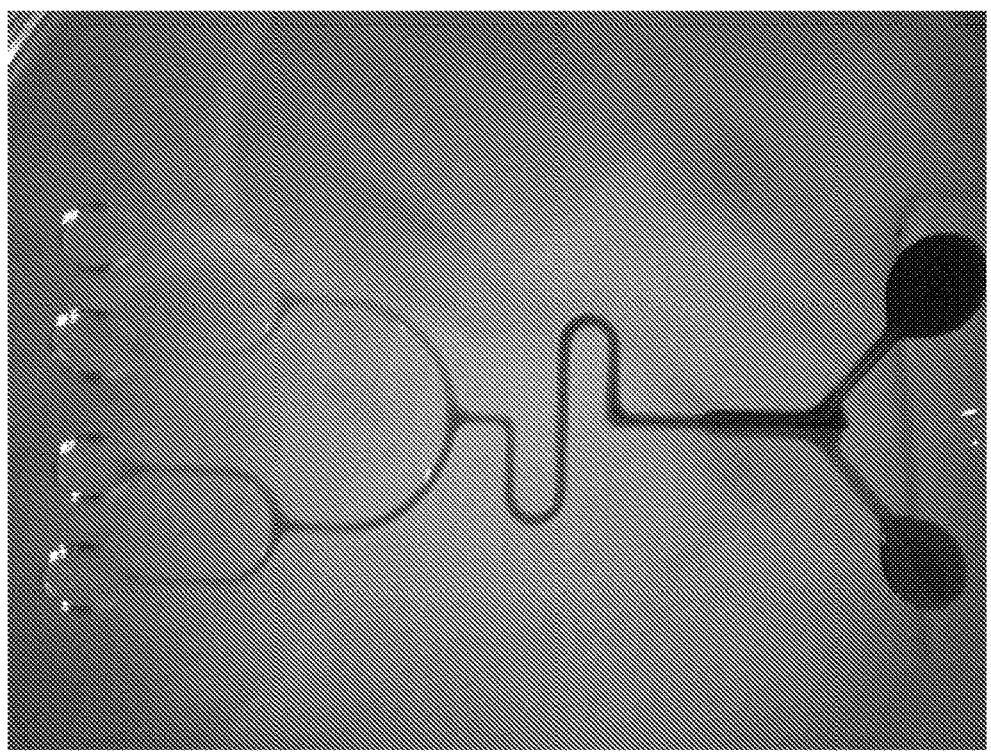
Figure 39:
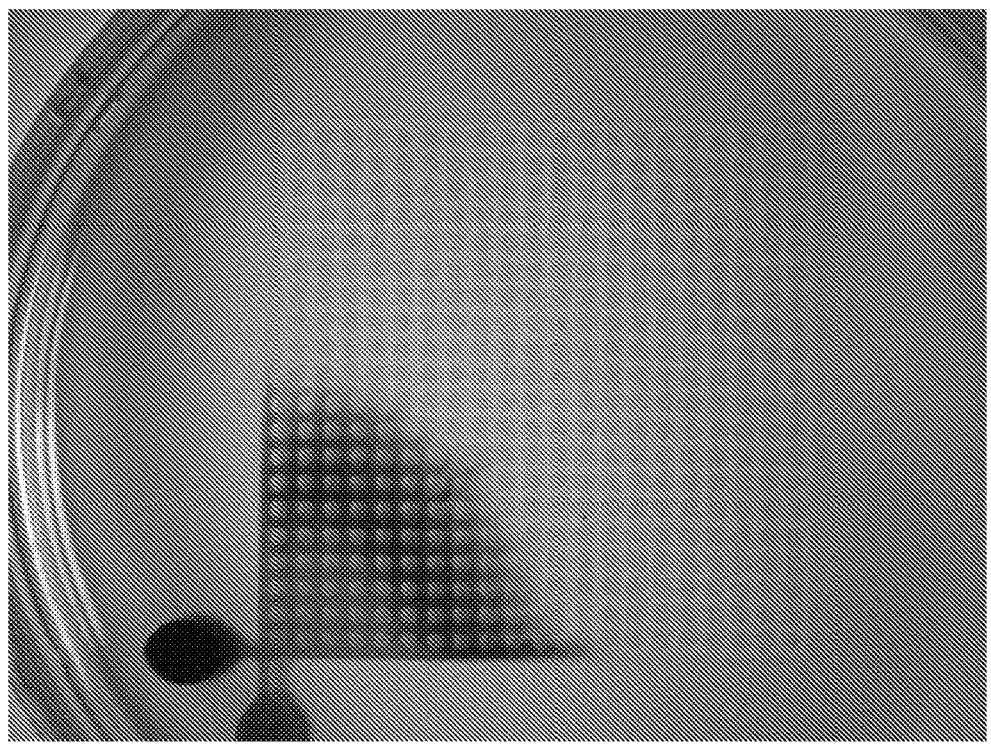
Figure 40:
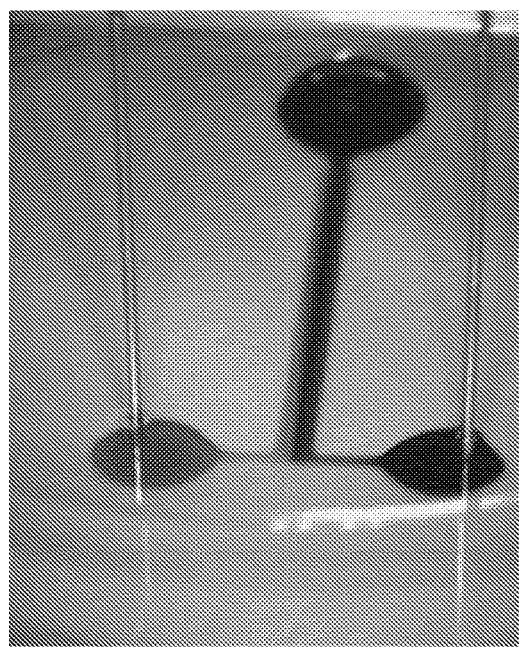
Figure 41:
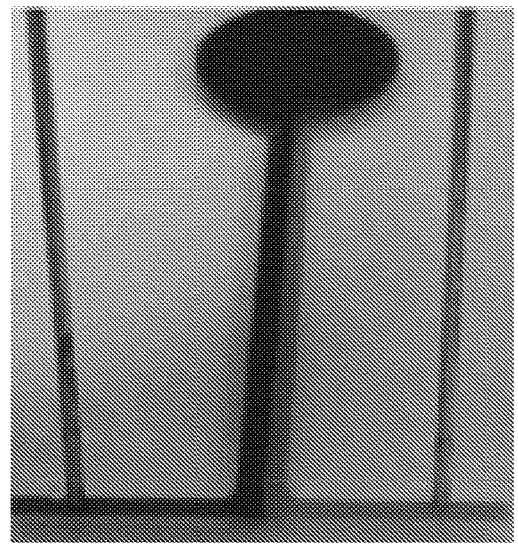
Figure 46:
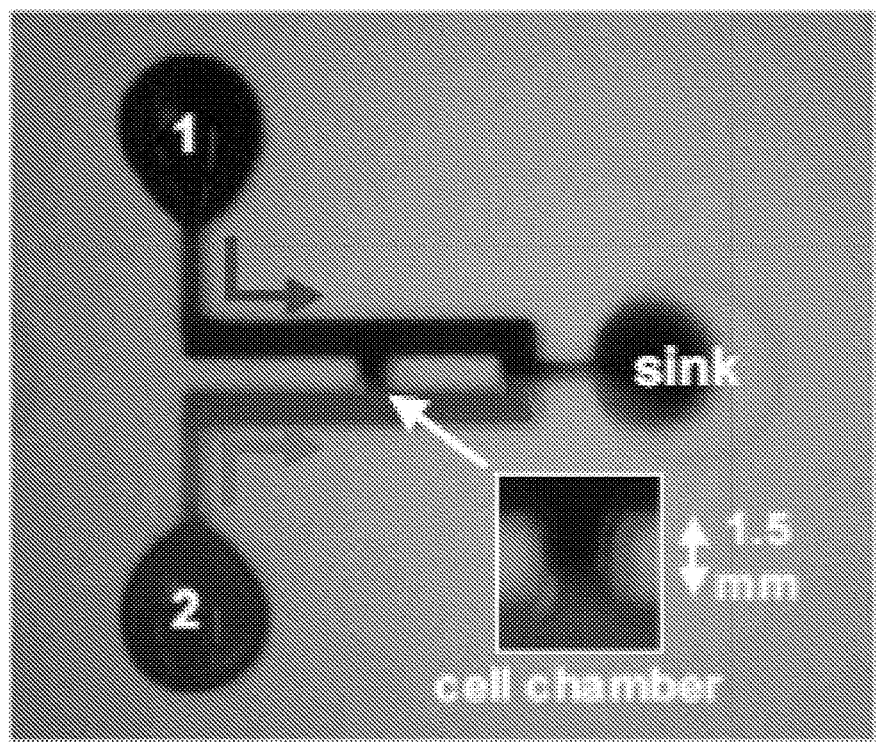
Figure 47:
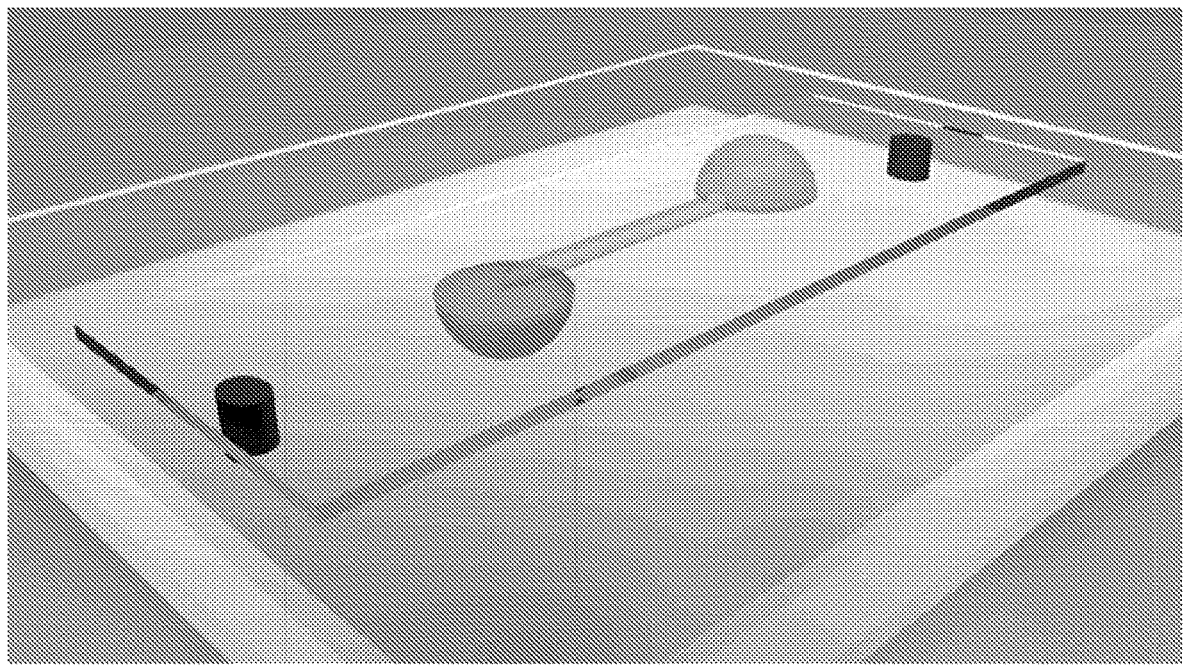
Figure 48:
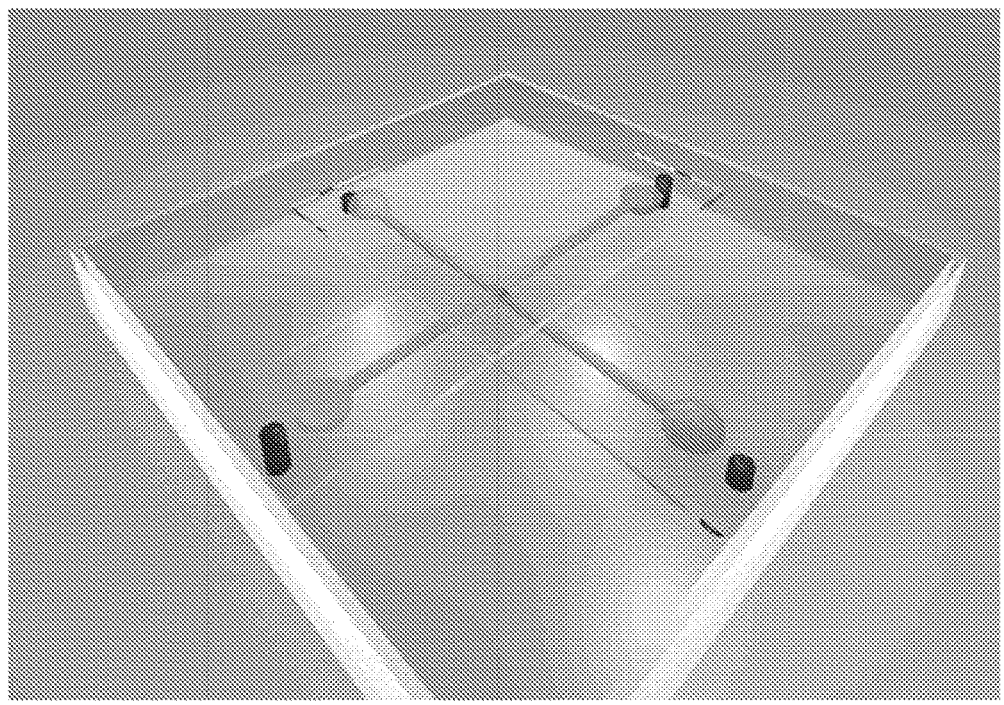
Figure 49:
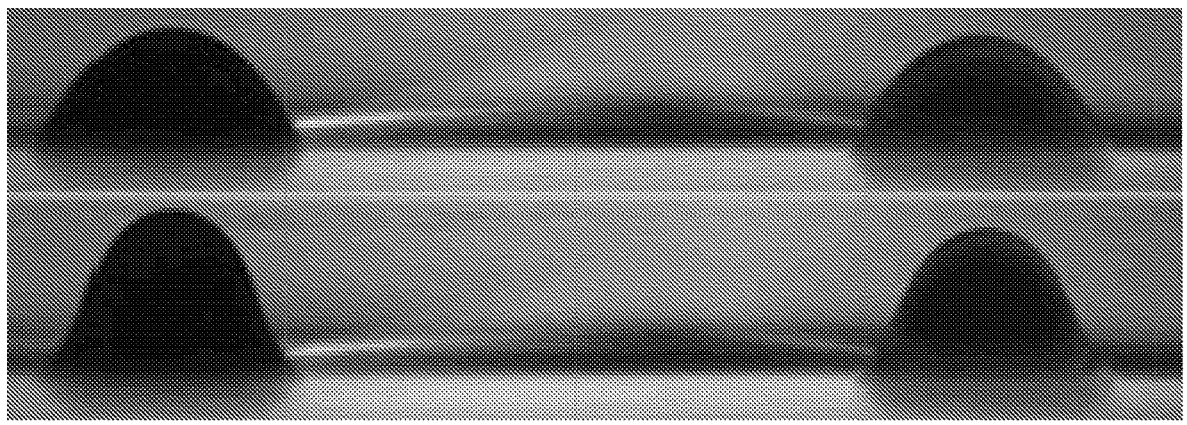
Figure 50:
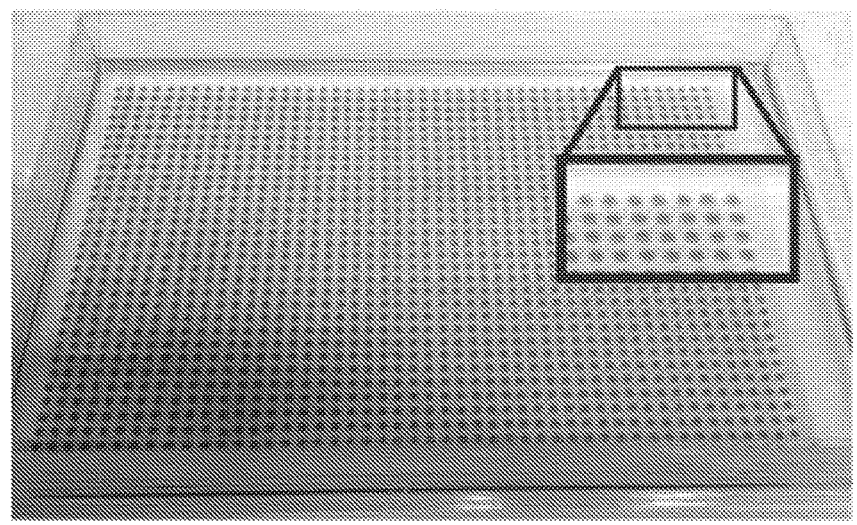
Figure 51:
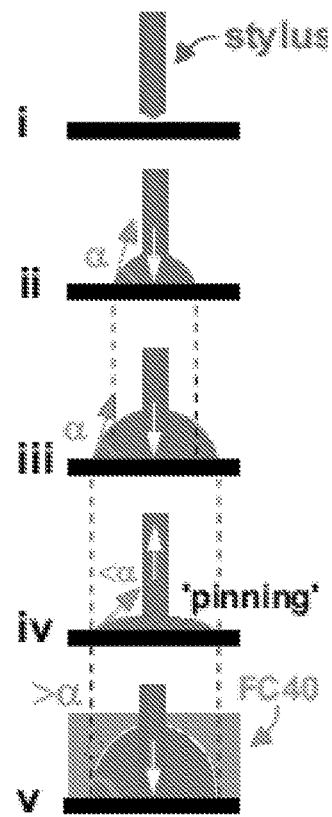
Figure 52:
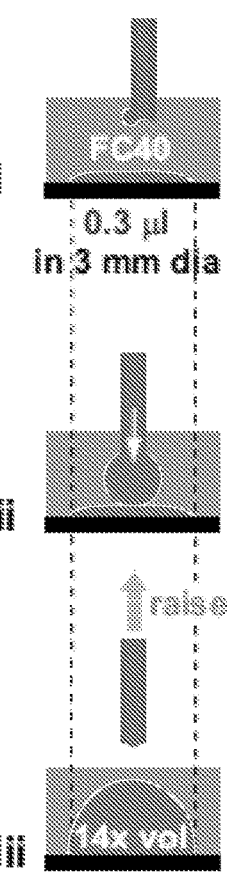
Figure 53:
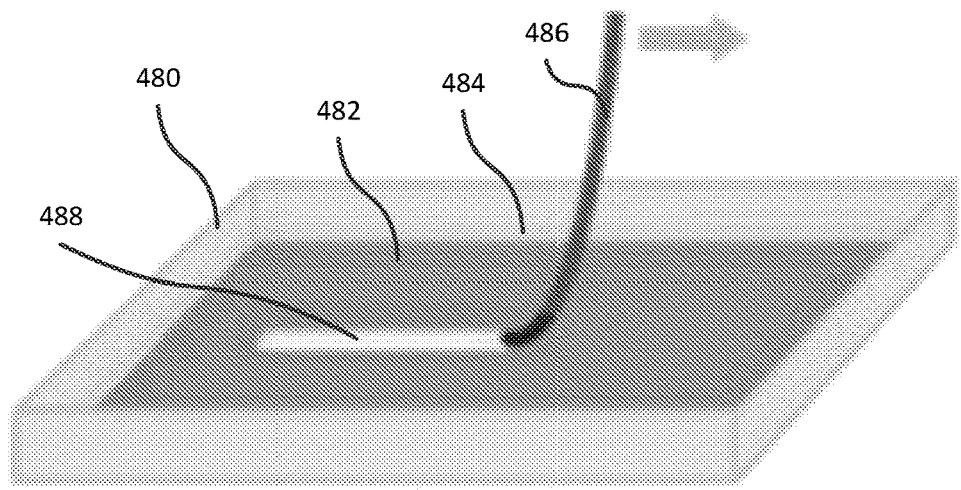
Figure 55:
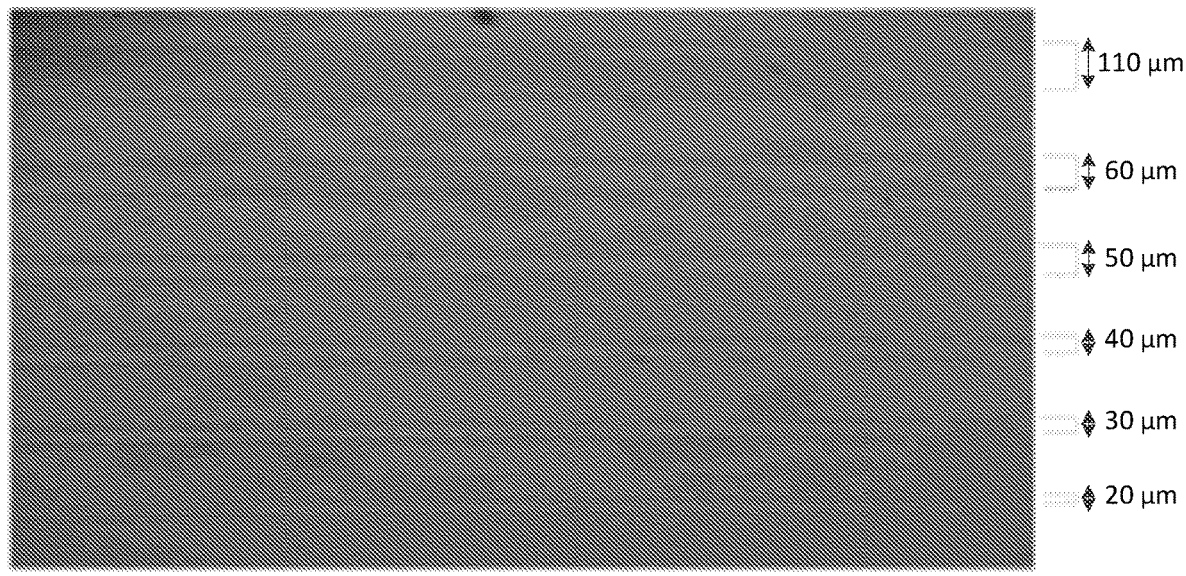
Figure 57:
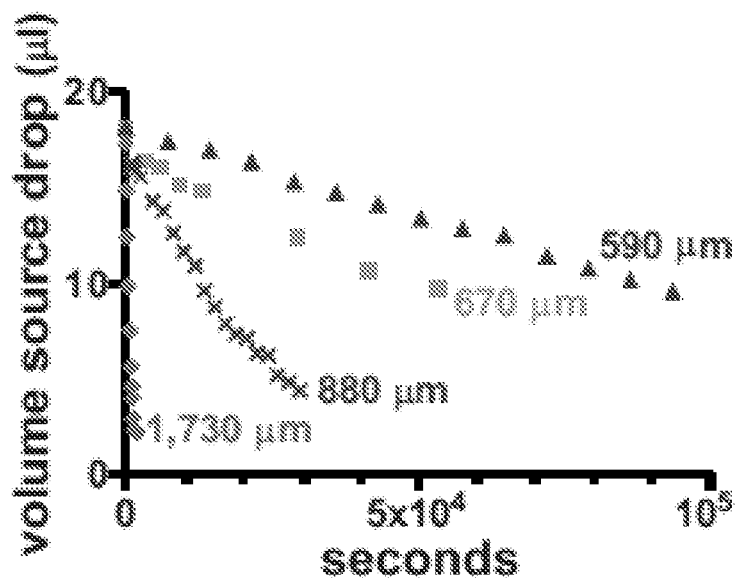
Figure 58:
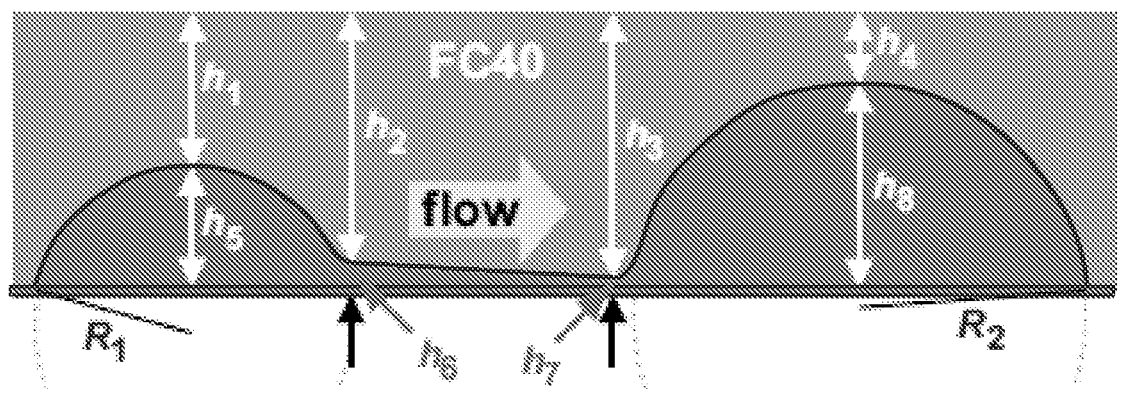

FIGS. 5(i) to (v) show a temporal sequence of stages of fluid flow through an exemplary microfluidic arrangement;

FIGS. 6A to 6C show how aliquots of fluid may be added to fluid drops in a microfluidic arrangement;

FIGS. 7(i) to (v) show an example of the formation of, and transport of fluid between interconnected fluid drops;

FIGS. 8(i) to (iv) show more examples of microfluidic arrangements;

FIG. 9 shows yet more examples of microfluidic arrangements;

FIG. 10 shows an example of a microfluidic arrangement covered by air as the immiscible fluid;

FIG. 11 shows an exemplary array of microfluidic arrangements on a surface;

FIG. 12 illustrates fluid transfer between three drops in a chain arrangement;

FIG. 13 is an example of a more complex microfluidic arrangement;

FIG. 14 is a chart showing flow rates between chambers;

FIGS. 15A to 15C show a dried microfluidic arrangement being reconstituted;

FIGS. 16A to 16C show another dried microfluidic arrangement being reconstituted;

FIGS. 17(i) and (ii) show two fluid conduits having different widths;

FIG. 18 shows an exemplary array of fluid drops arranged on a surface;

FIGS. 19(i)-(v) show an exemplary multi-conduit "radial mixer" microfluidic arrangement;

FIGS. 20 to 23 show various different microfluidic arrangements that can be created using the invention;

FIGS. 24A and 24B shows simple microfluidic circuits illustrating how varying drop size (and so differences in Laplace pressure) can control flow rates;

FIGS. 25A, 25B and 25C show chemical gradients used for a drug screen;

FIGS. 26, 27, 28, 29, and 30 show microfluidic circuits for creating concentration gradients;

FIGS. 31, 32, and 33 show further microfluidic circuits for creating concentration gradients;

FIGS. 34 and 35 show microfluidic circuits for adding fluid to an array of chambers;

FIGS. 36 and 37 show microfluidic circuits for investigating combinations of reagents;

FIG. 38 shows a microfluidic circuit with a joining junction and a splitting junction;

FIG. 39 shows a microfluidic arrangement with a grid of conduits;

FIG. 40 shows a microfluidic arrangement with external pumps to drive the flow;

FIG. 41 shows a microfluidic arrangement with fluid pumped directly into a conduit;

FIGS. 42(i) to (iv), 43(i) and (ii) and 44(i) and (ii) show further microfluidic arrangements with fluid pumped directly into a conduit;

FIGS. 45A, 45B, 45C and 45D show a further microfluidic arrangement with fluid pumped directly into a conduit;

FIG. 46 shows a microfluidic arrangement on a glass surface;

FIG. 47 shows a circuit with a fluidic overpass/underpass;

FIG. 48 shows a further circuit with a fluidic overpass/underpass;

FIG. 49 shows how changes in interfacial tension affect drop shape;

FIG. 50 shows an array of drops;

FIG. 51 shows a schematic of a process for producing a drop in an array;

FIG. 52 shows a schematic of a process for adding fluid to a drop in an array;

FIG. 53 shows a schematic of producing a microfluidic arrangement by repositioning fluid;

FIGS. 54(i) to (iii) show microfluidic arrangements produced by repositioning fluid;

FIG. 55 shows a further microfluidic circuit produced by repositioning fluid;

FIGS. 56A to 56D show arrays of square-shaped chambers produced by repositioning fluid;

FIG. 57 shows a graph of chamber volume decrease over time in a microfluidic arrangement;

FIG. 58 shows a schematic of a microfluidic arrangement; and

Figure 59:
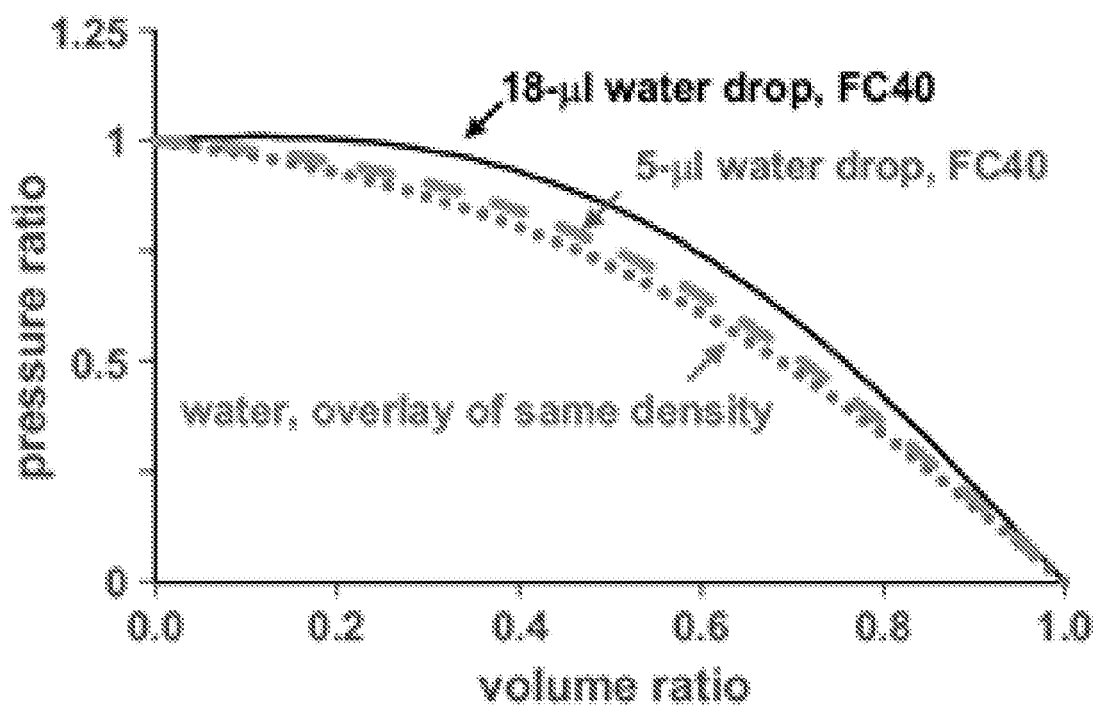

FIG. 59 shows a graph of pressure ratio over volume ratio in a drop.

Figure 1:
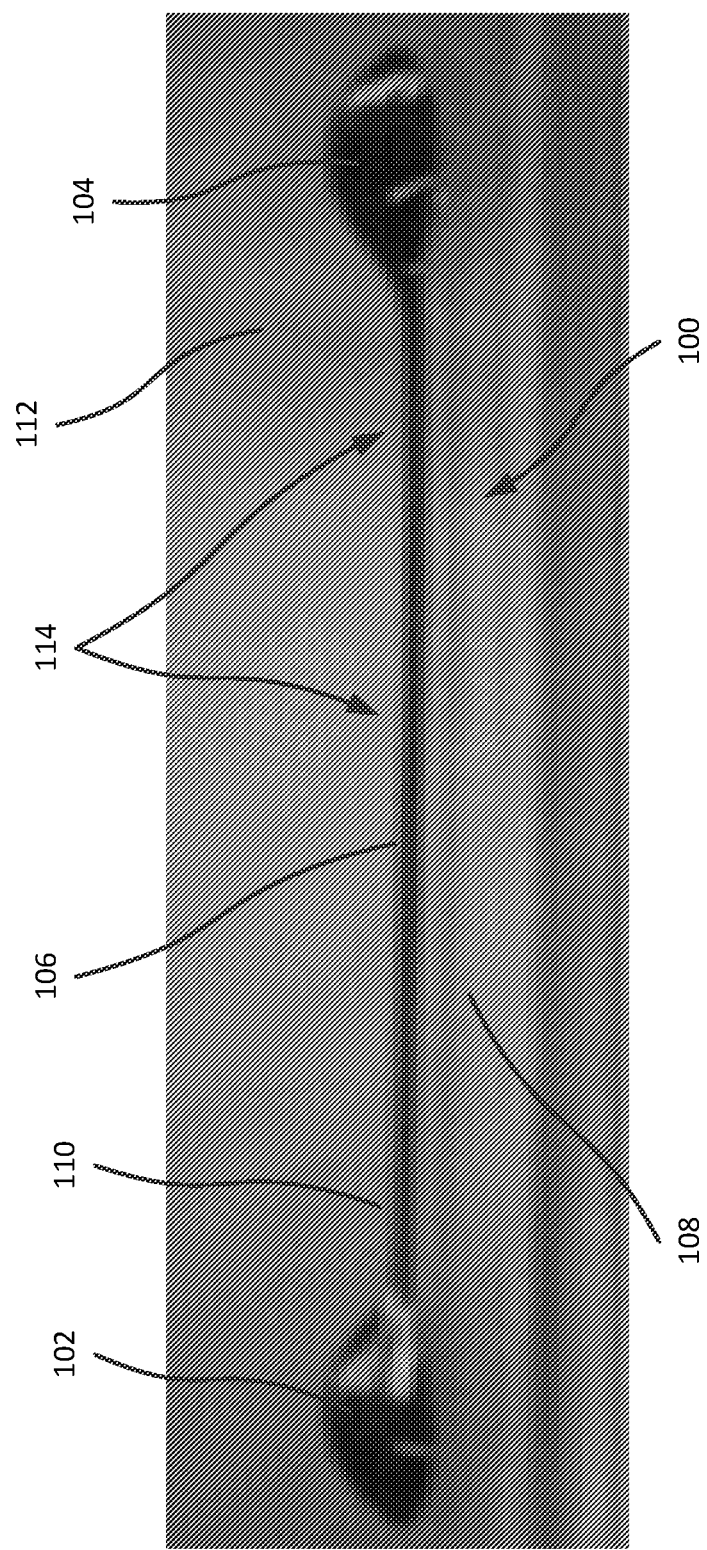
FIG. 1 shows an exemplary microfluidic arrangement.

FIG. 1 shows a simple microfluidic arrangement 100, wherein two fluid drops 102, 104 are fluidly connected by a fluid conduit 106, all of which are formed of a first fluid 110 arranged in that given shape on a surface 108, such as a plastic petri-dish. An immiscible second fluid 112, which in this example is ambient air, covers the first fluid 110. A fluid interface 114 between the two immiscible fluids 110, 112, created by interfacial tension, defines the shape in which the fluid 110 is arranged on the surface 108.

The surface 108 and fluid 110 are, preferably, selected to ensure that sufficient interfacial tension exists between them to maintain a given shape of the fluid 110 on the surface 108. This can be achieved by both the fluid 110 and the surface 108 being hydrophilic. Alternatively, both the fluid and the surface could be hydrophobic.

Figure 2A:
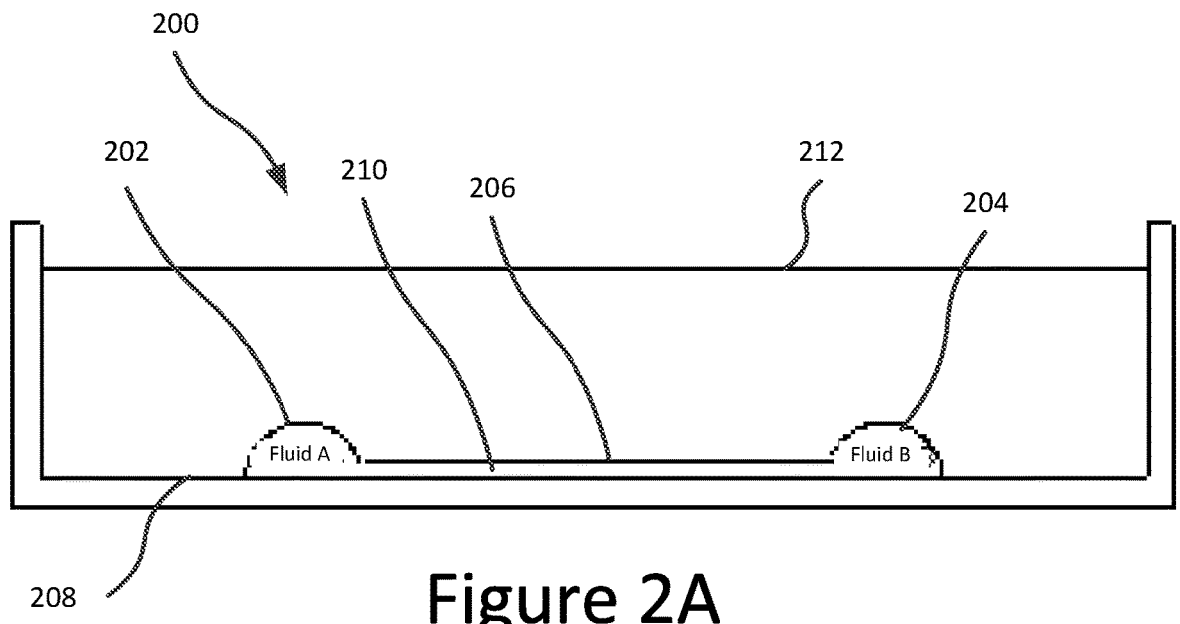
FIGS. 2A and 2B show a microfluidic arrangement covered by an immiscible fluid, which is a liquid.
Figure 2B:
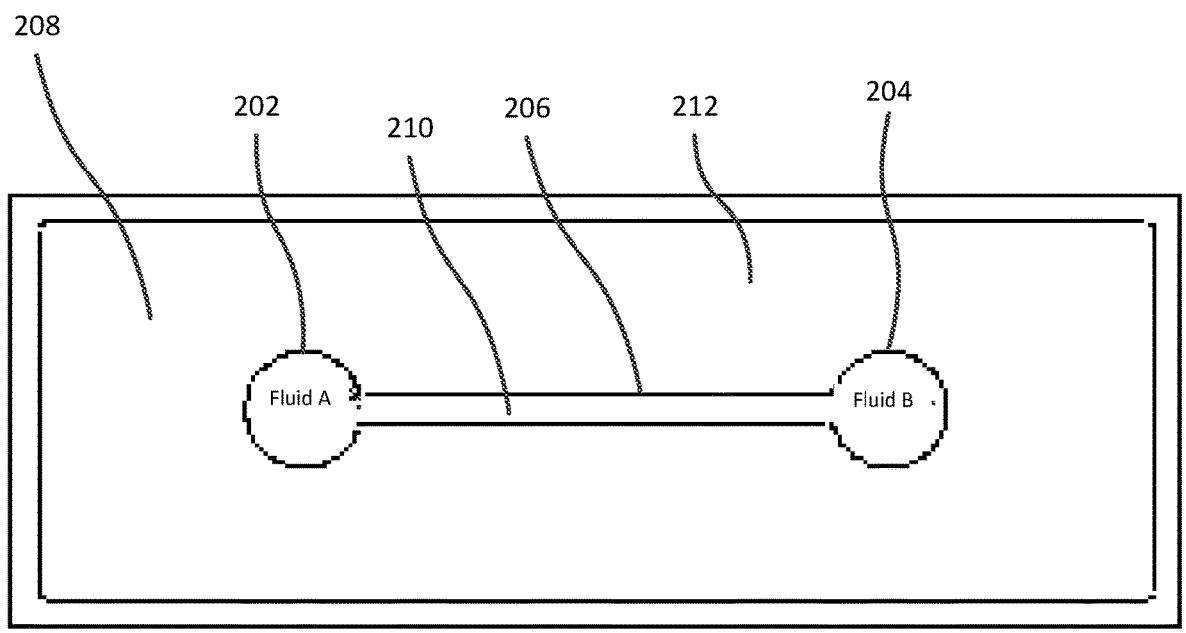

FIGS. 2A and 2B show a microfluidic arrangement 200, wherein two fluid drops 202, 204 are connected by a fluid conduit 206, similar to what has been described previously, but where the first fluid 210 arranged on the surface 208 is covered with an immiscible fluid 212, which in this example is a liquid. The first fluid 210 may be an aqueous solution and the second, immiscible fluid 212 may be a fluorocarbon (e.g., a single compound perfluorotri-n-butylamine, such as 3M Fluorinert™ FC-40, and/or a perfluorotri-n-butylamine mixture such as 3M Fluorinert™ FC-40, with perfluoro-n-dibutylmethylamine; 1,1,2,2,3,3,4,4,4-nonafluoro-N,N-bis (nonafluorobutyl) butan-1-amine-1,1,2,2,3,3,4,4,4-nonafluoro-N-(nonafluorobutyl)-N-(trifluoromethyl) butan-1-amine (1:1), $C_{21}F_{48}N_2$, CAS Registry Number 51142-49-5, and/or 3M Fluorinert™ FC-77, a perfluorotri-n-butylamine, CAS number 86508-42-1, and/or 3M Fluorinert™ FC-40, a perfluorotri-n-butylamine, CAS number 86508-42-1, jointly referred to hereinafter as FC40), for example. The overlay of fluid 212 is maintained by the solid wall around the edge of the rectangular petri dish.

Fluid is ideally transported through the microfluidic arrangements described herein using "passive" pumping methods (e.g., by hydrostatic pressure differences and/or Laplace pressure differences), rather than "active" pumping methods (e.g., using a syringe pump). In the microfluidic arrangement 200 shown in FIG. 2A, the two drops 202, 204 are of substantially equal height and the surface 208 is substantially horizontal, where gravity is acting in the vertical direction. Due to a common interfacial tension and curvature the drops 202, 204 have the same Laplace pressure, and therefore fluid communication between the drops 202, 204 via the interconnecting fluid channel 206 will only occur passively by diffusion.

For substantially horizontal surfaces, passive pumping can be initiated by creating a difference in the Laplace pressures found in the drops 202, 204. This can be achieved by varying the volume of the drops 202, 204, and hence their radius of curvature. When there is a difference in Laplace pressures between the drops 202, 204, flow will be initiated from the higher pressure drop to the lower pressure drop. For example, for two drops of the same aqueous solution that are disposed on the same, substantially horizontal, surface, but with different volumes connected by a fluidic channel, flow will be from the smaller drop to the larger drop. A difference in the Laplace pressures between the drops 202, 204 may also be achieved by varying the interfacial tension of the drops.

Figure 3A:
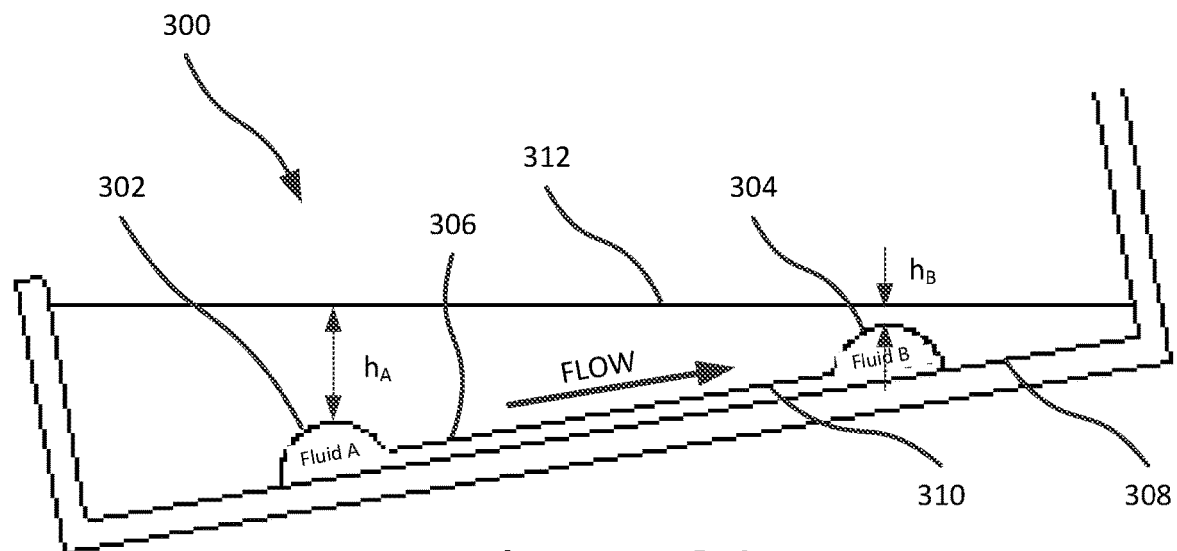
FIGS. 3A and 3B show examples of how passive pumping between two fluid drops may be initiated.
Figure 3B:
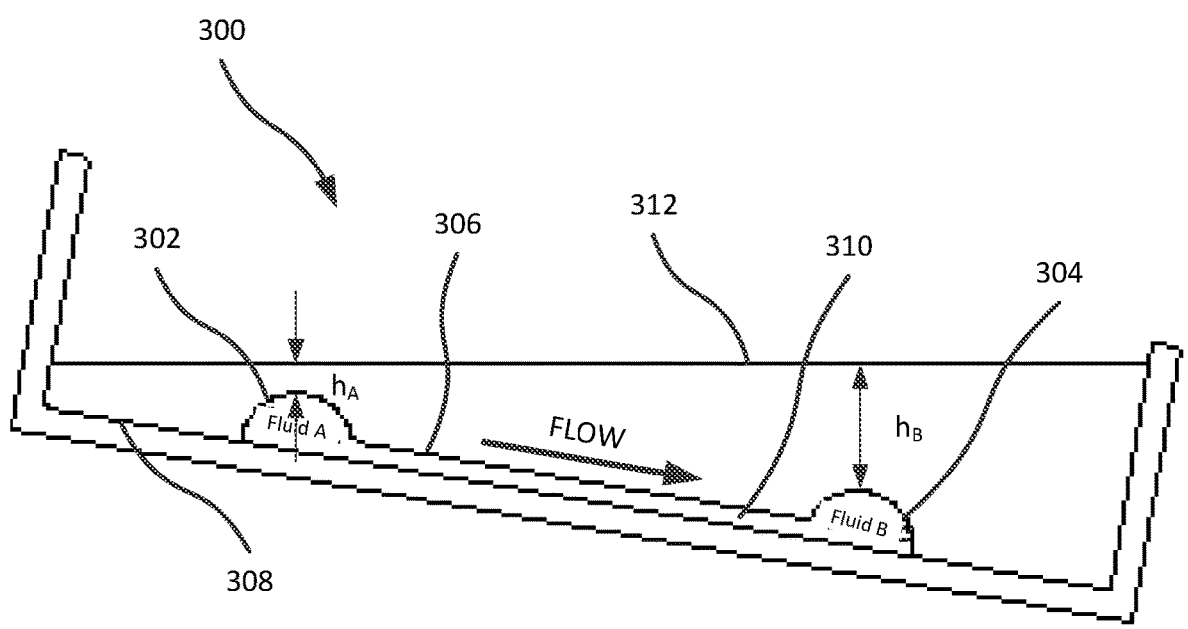

Another way to initiate passive pumping is to incline the surface on which the microfluidic arrangement is arranged away from the horizontal. FIGS. 3A and 3B illustrate a microfluidic arrangement 300 that is substantially identical (with similarly numbered features) to that of FIG. 2A. In FIG. 3A, however, the microfluidic arrangement 300 is orientated such that drop 304 is elevated above drop 302, where both drops 302, 304 remain covered by the immiscible fluid 312. The amount of immiscible fluid 312 above each of the drops 302, 304 now differs, and thus if the immiscible fluid 312 is denser than the fluid 310 arranged on the surface 308, the hydrostatic pressure ($P_A$ or $P_B$ exerted by the second fluid 312 onto each fluid drop 302 or 304, respectively) is different.

In FIG. 3A, the tilting of the surface causes a hydrostatic pressure difference of $P_A > P_B$, which causes fluid 310 to flow "uphill" through the microfluidic arrangement 300 from the lower drop 302 to the elevated drop 304, against gravity, due to the greater hydrostatic pressure that is being exerted on the lower fluid drop 302 by the second fluid 312 than that on the elevated fluid drop 304. It will be appreciated that flow can be reversed by tilting the surface 308 the other way so that the fluid drop 302 is elevated above the fluid drop 304, and thus the hydrostatic pressure of the immiscible fluid 312 above the lower fluid drop 304 is greater, causing flow to the elevated fluid drop 302.

In contrast, as shown in FIG. 3B, if the immiscible fluid 312 has a lower density than the fluid drops 302, 304 (for example, a hydrocarbon or gas if the drops are aqueous), then flow occurs "downhill", from the elevated drop 302 to the lower drop 304, due to the gravitation effect on the fluid in the elevated drop 302. Similar to as described above, it will be appreciated that flow can be reversed by tilting the surface the other way.

The rate of flow can be controlled via the relative density of the immiscible fluid 312 (to the fluid 310), and/or the relative height difference $h_A$, $h_B$ of the fluid drops 302, 304 (respectively) relative to the horizontal, and/or the length of the interconnecting fluid conduit 306, and/or the cross-sectional area of the interconnecting fluid conduit 306. Thus, the flow direction between fluid drops 302, 304 through the interconnecting fluid conduit 306 can be controlled irrespective of the content of the fluid drops 302, 304.

For different size fluid drops, the height difference $h_A$, $h_B$ between fluidly connected fluid drops must be sufficient to overcome the differences in Laplace pressures, should these differences oppose the desired direction of flow between the fluid drops. Flow can be interrupted at any time either by returning the surface 308 to a horizontal position.

An object, such as a hydrophilic probe (if the fluid 210, 310 is hydrophilic), can be used to interrupt or resume flow through the fluid conduit. For example, flow can be interrupted between fluid drops 202, 204; 302, 304 by drawing the probe across the continuous trail of fluid that provides the interconnecting fluid conduit 206, 306, thereby to "cut" the fluid conduit 206, 306. Flow between fluid drops 202, 204; 302, 304 may be re-established by drawing a hydrophilic probe along the interrupted trail of fluid (i.e., across the gap between the cut points of the fluid conduit 206, 306) to provide a continuous trail of fluid once more, in a fashion similar to soldering between points on an electronic circuit board.

In a proof-of-principle experiment (not shown), two aqueous drops (2-10 micro-litres) were deposited (through air) onto a hydrophilic surface of a petri dish, arranged horizontally. One of the aqueous drops contained dye; the other drop was dye-free. A dry hydrophilic probe was pulled from the dye-free drop to the drop containing dye to create an interconnecting fluid channel, with a height of roughly 5-100 microns. Next, an immiscible fluid in the form of a fluorocarbon, FC40, was poured into the dish to form an isolating barrier over the two inter-connected drops and to prevent evaporation of the aqueous solution, without changing the microfluidic arrangement. Over a period of time, the dye was able to diffuse (or be pumped) from one drop to the other through the interconnecting fluid conduit.

In another experiment, bio-compatibility was demonstrated; again, using two aqueous drops provided on a hydrophilic surface of a petri dish and connected by a fluid conduit, with the microfluidic arrangement covered by an immiscible fluid in the form of a fluorocarbon, FC40. In this experiment, similar to the fluid transport method described above with reference to FIGS. 3A and 3B, gravity was used to transfer a drug (which in one example is the cytokine, tumour necrosis factor alpha) from one drop to the other drop, from a fluid drop containing the drug in growth medium to a fluid drop containing cells growing on the surface of the petri dish in growth medium. In this example, the cells contain a gene encoding the (green) fluorescent protein that is expressed after treatment with the cytokine, and thus the fluid transport was clearly evidenced.

During the experiment, the petri dish was raised to increase the vertical height of FC40 over the fluid drop containing the drug, as in FIG. 3A. This led to an "uphill" flow of medium plus drug from that fluid drop to the elevated fluid drop containing cells. Next, the petri dish was placed in a conventional incubator to allow the cells to respond to cytokine and express (green fluorescent) protein. As described above, the direction of flow can be reversed by raising the other side of the dish, and the rate of flow can be controlled via the relative density of the immiscible fluid and/or the height difference between the drops relative to the horizontal and/or the distance between the drops and/or the length or width of the connecting fluid channel.

Figures 4A, 4B:
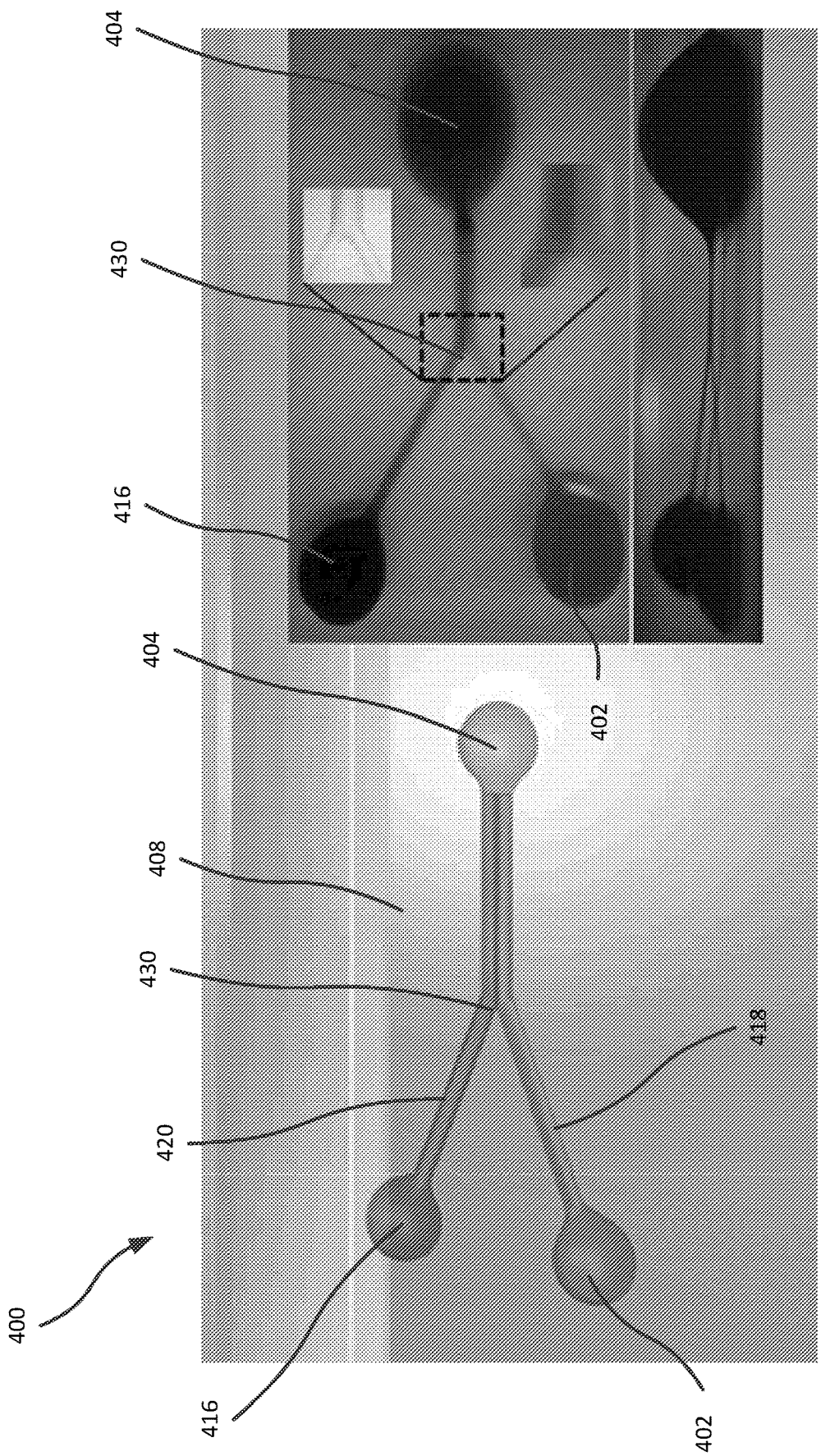
FIGS. 4A and 4B show a more complex microfluidic arrangement.

FIGS. 4A and 4B demonstrate the use of a microfluidic arrangement 400 for a basic function of mixing two fluid drops 402, 416 containing different reagents (represented using red and green dyes, respectively, which appear as a light drop 402 and a dark drop 416 in the photograph in FIG. 4B) and then delivering them to a third drop 404, thus replicating a common microfluidic arrangement that is commonly fabricated in Polydimethylsiloxane (PDMS). Here, the laminar flow is driven by Laplace and hydrostatic pressure difference between the drops.

FIG. 4A shows a top view of this slightly more complex microfluidic arrangement 400, which is overlaid with FC40 in the experiment illustrated in FIG. 4B. In the plan and side views of the microfluidic arrangement 400 (taken after three hours of operation) shown in FIG. 4B in views from above (top) and the side (bottom), it can clearly be seen how the dyes from the light drop 402 and dark drop 416 flow separately from their branch fluid conduits 418, 420 before meeting at a junction (or "intersection") 430 and flowing together to the third fluid drop 404 in a temporally controlled way. The enlarged views in FIG. 4B illustrate the junction 430 of fluid conduits 418 and 420. Reflections from the bottom surface of the plastic substrate give rise to the double images of the conduits seen in the view from the side in FIG. 4B.

Arranging the length of the branch portion of the fluid conduit 418 for the light drop 402 to be about half the length of that of the branch portion of the fluid conduit 420 for the dark drop 416 (before they meet at the junction 430) results in about twice the flow rate of dye from the light drop 402 compared to the dye from the dark drop 416, assuming the fluid conduits 418, 420 are of similar cross-section, due to the flow through the fluid conduits 418, 420 being laminar. Thus, flow rate of the different reagents and hence relative concentration in the resulting third drop 404 can be controlled by changing the lengths of the fluid conduits 418, 420 before the junction 430.

Figure 5:
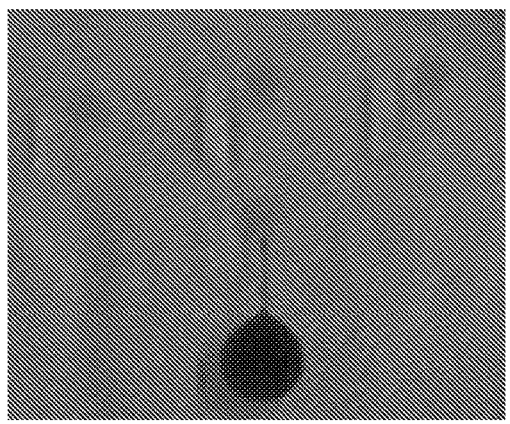
Figure 5:
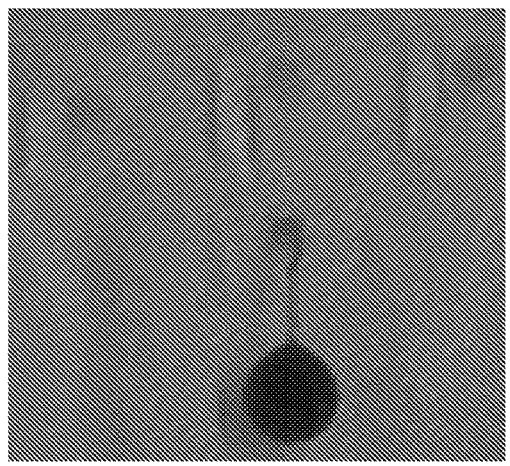
Figure 5:
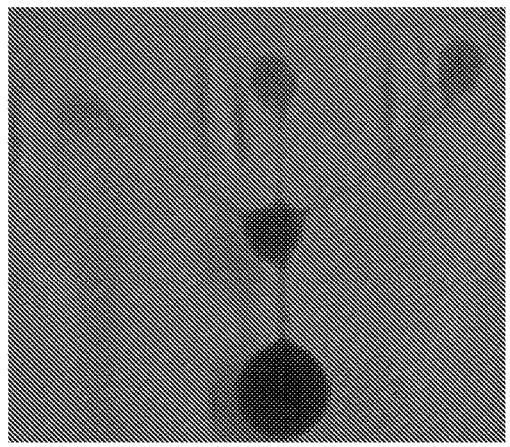
Figure 5:
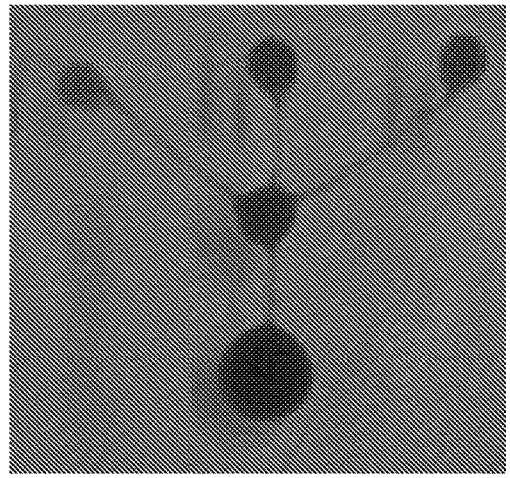
Figure 5:
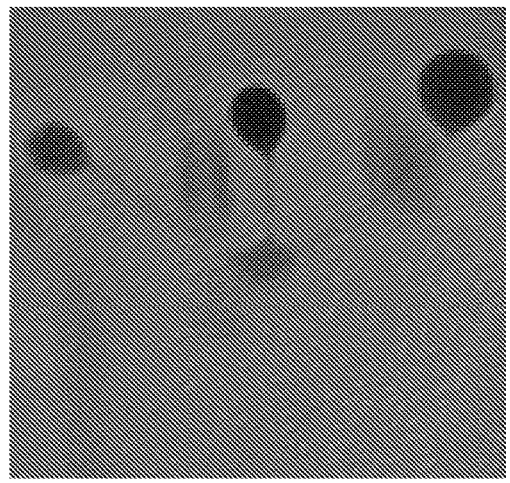

FIGS. 5(*i*) to (*v*) illustrate hydrostatically (gravity)-driven transfer of dye-coloured aqueous solution through a more complex microfluidic arrangement (from one large drop to a second single drop ("node"), and then splitting into three drops) provided on a petri dish and covered with an immiscible fluid (fluorocarbon, FC40). The microfluidic arrangement is shown in a sequence of views (i) to (v) taken from above over a period of time, wherein the three drops were elevated and fluid was thereby transferred from the large drop to the three drops (via the second drop) over a 14 hour period due to the greater hydrostatic pressure on the larger drop caused by the greater height of the fluorocarbon above it. The microfluidic circuit shown in FIGS. 5(*i*) to (*v*) was produced by depositing a number of drops on the surface as reservoirs, and then manually drawing a tip across the surface in order to form conduits connecting the drops. Again, reflections from the bottom surface of the plastic substrate give the double images of the circuit.

In the above-described embodiments, a fluid conduit may be arranged on the surface using a suitable fluid delivery device ("pen") filled with a first fluid. As the pen is drawn across the surface it deposits a trail of fluid, and thereby provides a fluid conduit on the surface when covered with an immiscible second fluid.

Fluid can be added to, or extracted from, any of the fluid drops at any time during the process, using a pipette for example (or other suitable fluid delivery means), to change the Laplace pressure in the fluid drop, and hence induce flow, for example. This is demonstrated in the example shown in FIGS. 6A to 6C. In FIG. 6A, a microfluidic arrangement 600 is provided comprising two fluid drops 602, 604 interconnected by a fluid conduit 606. In FIG. 6B, a pipette 622 loaded with fluid (e.g., RPMI cell media) 624 is used to add fluid to the (second) drop 604 on the right-hand side of the microfluidic arrangement 600. In FIG. 6C, another fluid (e.g., a coloured dye) 626 is added to the other (first) drop 602 on the left-hand side of the microfluidic arrangement 600, again using a pipette 622.

As described above, controlled flow of fluid from the first drop 602 containing coloured dye 626 will occur when the microfluidic arrangement 600 is substantially horizontal, as a result of the different Laplace and hydrostatic pressures of the two fluid drops 602, 604. Variable flow rate can be achieved by tilting the microfluidic arrangement 600 such that it is inclined, so as to use a difference in hydrostatic pressures between the drops. For example, if the (second) drop 604 containing the greater amount of fluid is elevated above the other (first) drop 602, the greater height of the immiscible fluid over the first drop 602 will cause fluid to flow "uphill" (i.e., against gravity) to the second drop 604.

Flow rate can be altered by changing the angle of inclination. Using a liquid (rather than a gas) as the immiscible fluid covering the fluid that provides the fluid chambers 602, 604 and fluid conduit 606 may provide the best flow rate control.

In another embodiment, a drop of first fluid is deposited onto the surface, and fluid is then drawn out from the drop across the surface using the tip of a probe (or "pen"), which has been wetted with the same fluid, to create a trail of fluid. This process was used to create the conduits in FIG. 5. The trail of fluid preferably provides a fluid conduit that connects the drop of fluid to another drop of fluid deposited on the surface. This method benefits from not requiring any additional fluid to create the fluid conduit.

In yet another embodiment, a first fluid can be deposited onto the surface through an immiscible second fluid that already covers the surface. Ideally, the fluid is introduced through the immiscible liquid such that it comes into direct contact with the surface, which inevitably occurs if the fluid is denser than the immiscible fluid, because the fluid will sink down through the immiscible fluid to the surface. Of course, the second fluid may be ambient air.

However, if the immiscible fluid is denser than the fluid, as may be the case if the fluid is an aqueous solution and the immiscible fluid is a fluorocarbon (FC40, for example), the fluid must be deposited through the immiscible fluid directly onto the hydrophilic (in this example) surface. This is so that the interfacial tension between the aqueous solution and the surface can counteract the effects of the differences in buoyancy between the two fluids to keep the aqueous solution at the bottom of the immiscible fluid and attached to the surface.

In another embodiment (not shown), one or more fluid conduits may be provided on a surface, without fluid drops. Fluid drops can then be added at a later stage using a pipette, or a similar fluid delivery device, to deposit drops of the fluid on the surface at either end of the fluid conduit.

In another embodiment one or more fluid drops (or other features) with very low contact angle are provided on a surface. Due to the low contact angle the drops can receive additional fluid without affecting the drop footprint. This can enable easier placement of fluids with defined pinning lines and hence well-defined Laplace pressure and heights.

In a yet further embodiment, a microfluidic arrangement may be created by pre-filling a Teflon® (also referred to herein as polytetrafluoroethylene or PTFE) tube (or a similar arrangement) with a succession of fluid drops engulfed within an immiscible fluid. One or more drops can then be deposited on a surface almost simultaneously with the immiscible fluid that covers it. This can be achieved by attaching the tube to a syringe pump, for example, and using the tip of the tube to draw out the desired shape of first fluid on the surface in the same way that one might use a pen to draw.

For example, if the drops are to be an aqueous solution, the tube is first filled with an immiscible fluid, such as a fluorocarbon (FC40, for example). The pump is then cycled through "withdraw" and "stop" modes as the end of the tube is successively dipped into (during "withdraw" mode) and out of (during "stop" mode) aqueous solution contained in different wells in a 96-well plate, for example.

The alternating dipping process loads the tube with a succession of drops of aqueous solution engulfed within the immiscible liquid, which "wets" the walls of the tube such that the aqueous solution drops (and any water-soluble reagents in them) never touch the tube wall. The tube can therefore be loaded with a series of different drops (if dipped during loading into different wells that contain different aqueous solutions); each drop of aqueous solution is separated from the next drop by the immiscible liquid.

Once loaded in this way, the pump attached to the tube can be used to eject the drops of aqueous solution engulfed in immiscible liquid onto the surface, where the interfacial tension between the fluid and the surface maintains the pattern of the microfluidic arrangement in the form that it was deposited on the surface.

In a yet further embodiment, a microfluidic arrangement may be created by using a hydrophobic tip to reposition fluid in order to clear it from unwanted areas, such that the remaining fluid forms the desired microfluidic arrangement. In an example a layer of an aqueous fluid is deposited on a substrate. The aqueous fluid is unpatterned at this stage, and merely forms a thin film on the surface.

Then a tip is pulled along the surface which displaces the aqueous fluid in certain areas and leaves it in others to form a desired shape. For example, for formation of an array of square chambers a grid of lines is drawn. More complex shapes are equally possible. The displacement is particularly effective where the aqueous fluid is repositioned and replaced with another fluid that is relatively dense (compared e.g. to gas) such as a fluorocarbon. The fluorocarbon is conveniently overlaid over the aqueous film before patterning. For example a fluorophilic, hydrophobic tip (e.g. a polytetrafluoroethylene (PTFE) tip) is immersed in the overlay then through the aqueous film to the surface. The aqueous film is displaced and replaced with the fluorocarbon. Because the tip is fluorophilic it drags the fluorocarbon with it and assists in replacing the displaced aqueous solution. This is described in more detail below with reference to FIG. 53.

Figure 7:
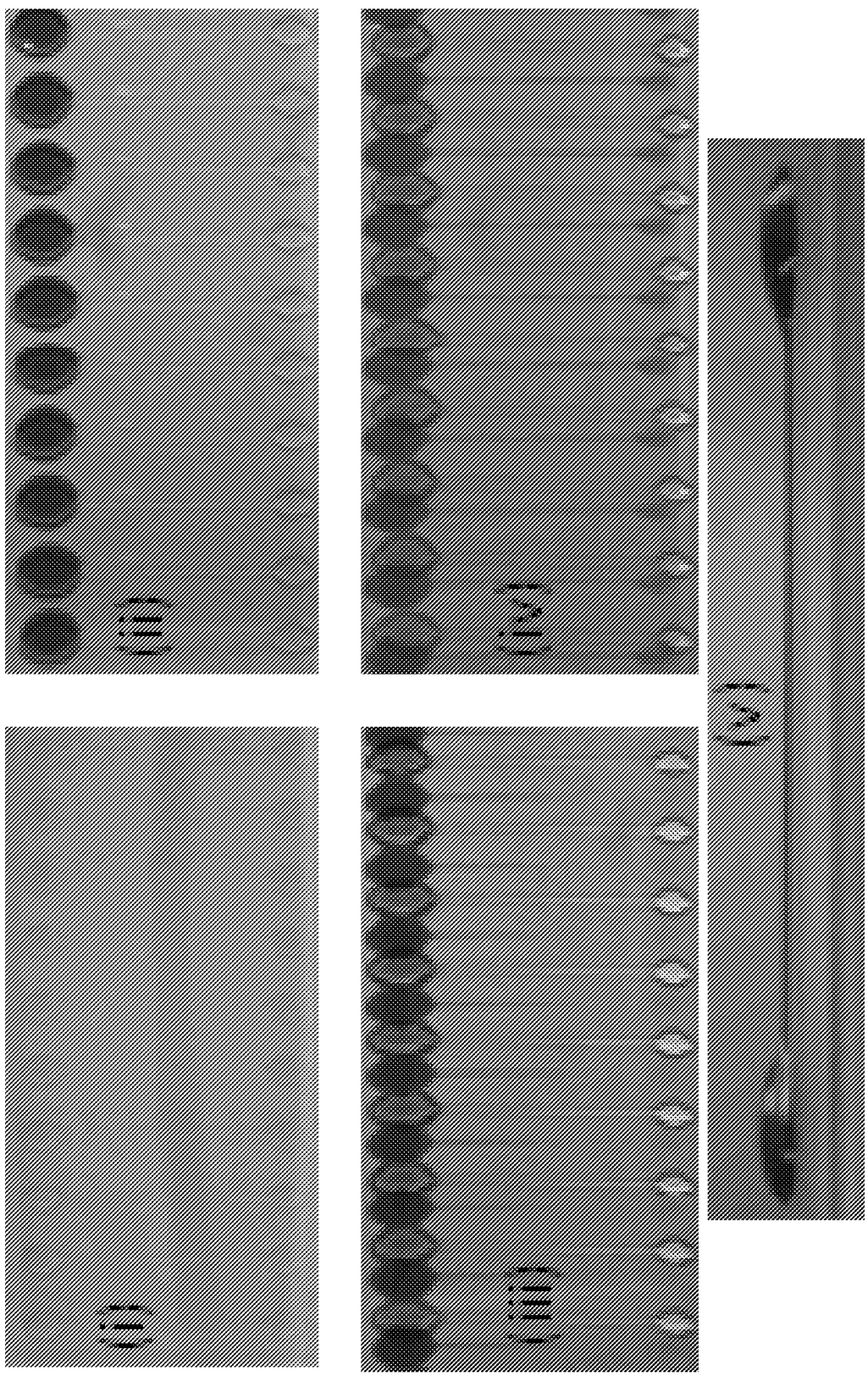

FIG. 7 shows an example of the formation of, and hydrostatic pressure-driven transport of fluid between interconnected fluid drops, in an experimental microfluidic arrangement. A plurality of fluid channels were formed in a polystyrene cell culture dish (providing a surface) suitable for adhesion cell lines, and overlaid with fluorocarbon. The experiment was carried out as follows:

(i) In a horizontal orientation, ten 1 µl drops of RPMI media were connected by ten fluid channels of 20 mm length formed by infusing media through a blunt stainless steel needle, ideally positioned just above the substrate surface; the needle then moving in a pre-defined sequence using a robot. Effectively, a liquid "bridge" is formed between the needle ("pen") and the hydrophilic surface to allow the aqueous fluid to form any pattern on the surface by motion of the needle relative to the surface. To create the fluid channels, a syringe pump was set to deposit fluid at 300 nl/s with traverse speed of 10 mm/s. The width of the resultant fluid conduit was measured at 40 random locations and found to be 484 µm with standard deviation less than 4% of the mean. The circuits were subsequently overlaid with FC40.

(ii) 4 µl of (red) dye solution was added to the top row of 1 µl fluid drops, and photograph was taken ~1 hour after addition of the dye to demonstrate that there was no flow of (red) dye through the fluid conduits while maintained in a horizontal orientation.

(iii) Flow with fluid drops at different relative elevation. The culture dish (surface) was inclined at an angle of 7° with respective to the horizontal (i.e., the coloured (red) drop was moved lower than the (clear) media drop), which resulted in flow from the row of red fluid drops through the channels toward the higher drops shown at the bottom of FIG. 7 (i.e., the flow was "uphill"); the images were taken ~60 seconds directly after altering the angle of the dish indicating repeatability of flow in the various channels. The lighter fluid drops seen here and in the next panel are reflections of the primary drops from the bottom surface of the dish, and they appear between the primary drops due to the slope of the dish.

(iv) The (clear) media drops begin to grow larger due to the addition of (red) dye supplied through the fluid channels, with this image being taken 400 seconds after tilting the dish and the initiation of flow.

(v) A side view is shown of a typical fluid circuit showing that the two drops eventually come to have similar sizes, and that red dye has been transferred from one to the other.

Figure 8:
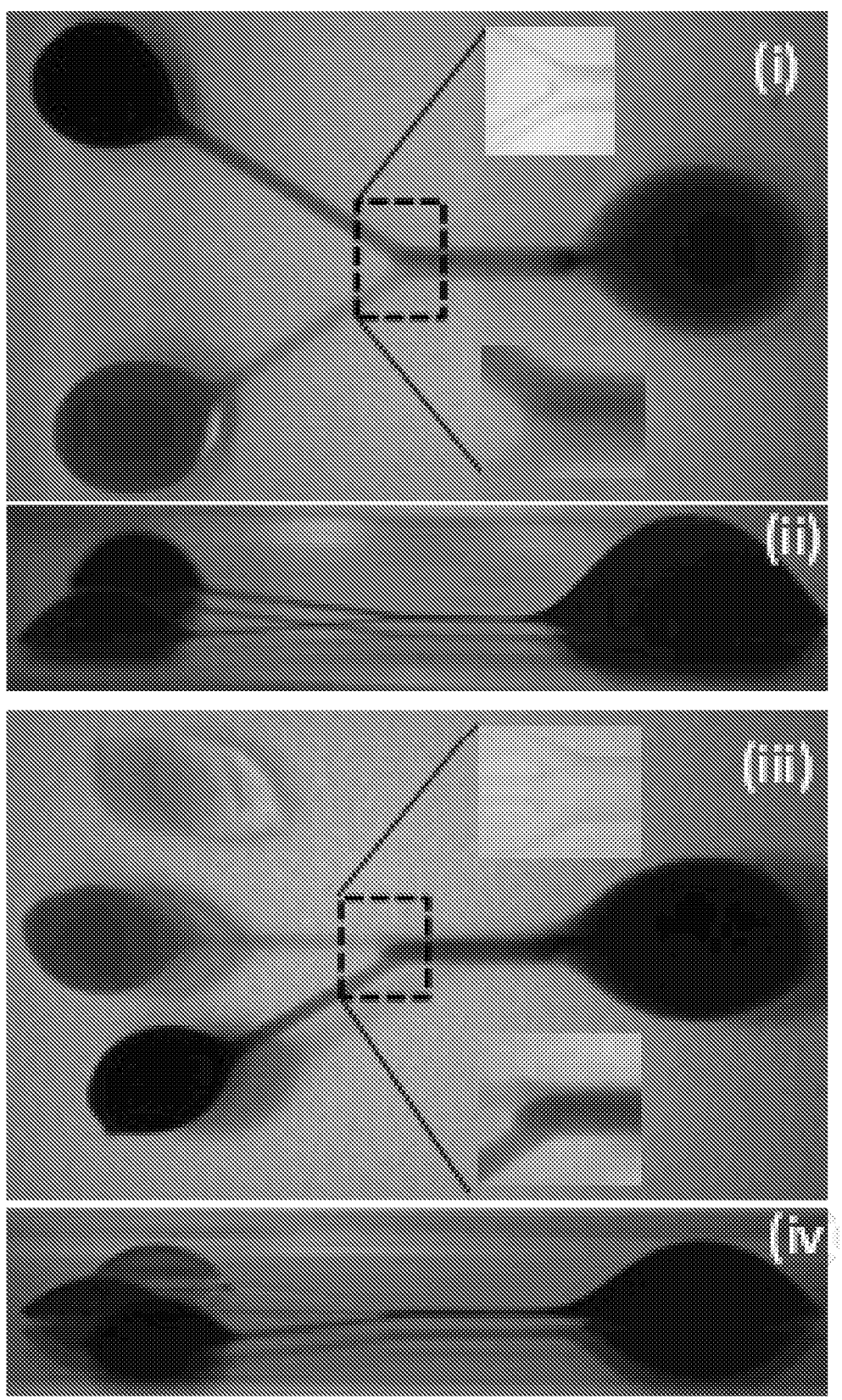

FIG. 8 shows examples of concentration gradient "devices" with laminar flow driven by a combination of Laplace and hydrostatic pressure difference between drops. The fluid conduits were formed using a 0.61 mm external diameter (stainless steel) needle (not shown) with constant infusion rate of 600 nl/sec. Varying the traverse time of the needle (above the surface) enabled the formation of fluid drops at those locations. The width of the larger fluid conduit after the merging location in the middle is obtained by off-setting the position of each fluid conduit after the junction by 0.5 mm when created. Such devices typically operate on a horizontal surface, and the initial volumes deposited into the fluid drops (using a pipette tip) were 10 µl for the source fluid drops (left) and 20 µl for the sink (right) fluid drop. The fluid conduits are overlaid with 4 mm height of fluorocarbon.

In more detail, FIG. 8 shows the following:

(i) A concentration gradient created using a two-'inlet' device. The fluid conduits providing the (branch) inlets are 600 pin wide, and the gradient fluid conduit (after the intersection/junction) is 1030 µm wide. Flow from the source fluid drops results in a concentration gradient, perpendicular to, and in direction of flow. The enlarged ("inset") images of the junction show phase-contrast and bright-field images, of the junction during flow.

(ii) A side view of the 'device' in (i), illustrating the height of the connecting fluid conduits. Also of note is the 'sink' fluid drop, which results in a mixed solution and hence the device also serves as a mixer.

(iii) A three-inlet gradient generator, the inlet fluid conduits are 600 µm wide and the gradient fluid conduit (after the junction) is 1550 µm wide. Drops are initially 1 µl volume. To start flow, 10 µl medium, 10 µl red dye, 10 µl blue dye, and 20 µl medium were hand-pipetted into the left-hand drops and sink, respectively. The inset images show the junction both after formation and during operation, where the lighter (red) fluid stream narrows after the junction, 'flow-focussing' due to higher velocity and height, at the centre of the three fluid streams.

(iv) A side view of the 'device' in (iii), illustrating the height of the fluid conduits and drops.

FIG. 9 shows microfluidic arrangements analogous to those formed in FIG. 8 (and also with laminar flow driven by Laplace pressure difference between drops), wherein:

(i) A microfluidic arrangement is shown formed before deposition of solutions into the fluid drops. The enlarged "inset" images show the junction between fluid conduits during operation (phase-contrast and bright-field images).

(ii) Demonstrates the same device as in FIG. 8iii with the (red) dye and cell media fluids in the left-hand source drops reversed. The enlarged "inset" images show the junction between fluid conduits during operation (phase-contrast and bright-field images).

(iii) A five-inlet "device" for creating concentration gradients, or a perfusion system is shown, where cells might be grown on the surface in the wider fluid conduit whilst being exposed to 5 different solutions simultaneously.

[Flow is from Left to Right in Each Image]

In some applications it is desired to maintain constant flows through laminar streams over a long period of time. An example is an application exposing adherent cells growing at one position in a conduit to a constant concentration of a drug (which is represented in the examples illustrated in FIGS. 8 and 9 by a blue dye), and cells at different positions to different (but constant) concentrations of the same drug. The Y-shaped (and trident-shaped, and multi-feed inlet) circuits illustrated in FIGS. 8 and 9 can be used to do this; a suitable protocol for a simple Y-shaped circuit as shown in FIGS. 8(*i*) and 9(*i*) is now described in more detail. First, some medium is removed from each of the drops at the left (top-left and bottom left), and then a small amount of blue dye is added into the drop at top-left, and an equivalent volume of medium is introduced into the drop at bottom-left. Now, both drops on the left have a greater curvature than the one on the right, so the difference in Laplace pressure drives medium from left to right. After the junction point (where cells are growing in the conduit), the two streams flow side-by-side (the lower insets in FIGS. 8(*i*) and 9(*i*) demonstrate the laminar flow after the junction). During such laminar flow, blue dye diffuses from the top stream to the bottom one; consequently, the concentration of blue dye in the lower stream progressively increases along the length of the conduit, so cells at any point in this conduit are exposed to a constant drug concentration for as long as flow continues at the same rate.

Over time the difference in Laplace pressure between drops on the left and right falls, and flow reduces as fluid is transferred from the smaller drops on the left to the larger one on the right. Therefore, it is useful to have as large a volume as possible in the drops on the left, whilst maintaining an appropriate difference in Laplace pressure. This can be achieved by duplicating (or triplicating, or more generally increasing) the number of input drops and conduits on the left to create 4-conduit (or 6-conduit, etc.) junctions. Because flow is directly proportional to pressure difference (and pressure depends on curvature, and so drop radius), and source-drop volume scales with radius cubed, the source volume can be increased. Thus, one left-hand drop with a Laplace pressure of 30 Pa can be replaced (in order to maintain the same flow rate) by two drops with a Laplace pressure of 15 Pa each, achieving an 8-fold increase in volume.

FIG. 10 shows a similar 'device' as shown in FIG. 9, but with laminar flow driven by gravity and wherein the microfluidic arrangement of fluid drops and interconnecting conduit(s) are formed of a fluid that is covered by (ambient, atmospheric) air as the immiscible fluid that defines the arrangement on the surface. This 'device' is operated by tilting the surface and exploiting gravity. The angle of the surface and differences in Laplace pressure determine the flow rates. It was found that when using this 'device' in a high humidity environment no noticeable change in the size of the fluid conduits was found after 5 hours.

FIG. 11 shows an exemplary array of microfluidic arrangements, providing fluidic 'devices' for creating concentration gradients or perfusion experiments. A 2 by 6 array of 12 individual microfluidic circuits is seen, each circuit having a trident shape with three inlet drops that join at a junction to form a wider conduit and then end in a sink drop.

FIG. 12 shows fluid transfer between three connected drops on a horizontal surface, driven by Laplace pressure difference between the drops. The flow drives blue dye from the smallest drop on the left to the larger drop on the right. In more detail:

(i) After 30 minutes operation, (blue) dye has begun to transfer to the middle drop due to Laplace pressure differences caused by the different curvatures (and also hydrostatic pressure caused by the different heights of the denser second fluid above the drops).

(ii) After 12 hours operation the first drop has almost been emptied and its fluid transferred to the middle drop, and fluid from the middle drop has been transferred to the right-hand drop.

FIG. 13 is a demonstration of a more complex microfluidic arrangement used to provide a 'dilution generator device'. The rectangular reservoir at the top is connected to three conduits of different lengths.

FIG. 14 is a graph showing the flow rate (in microliters per second) of fluid pumped between a fluid drop on a horizontal surface having a volume of 18 µl and a fluid drop having a volume of 20 via a 0.66 mm wide fluid conduit, as time progresses. Pumping is achieved by a combination of differences in Laplace and hydrostatic pressures. Over time the pressure difference between the drops decreases and the flow rate decreases.

It has also been found that the first fluid may be deposited on a surface to define a microfluidic arrangement that is allowed to dry, and which can then be reconstituted later by the addition of more of the first fluid to the same location on the surface. For example, fluid circuits may be formed in air, and the liquid allowed to evaporate; then dried solutes are left on the surface to leave the pattern of the circuit on the surface, as shown in FIG. 15A. The dried circuit may then be rehydrated at a later time by adding volumes of hydrophilic fluid to each end of the circuit. FIG. 15B shows that fluid is wicking (flowing) from each end towards the middle, to fill the dried conduit. Once the dried fluid conduit is fully rewetted, as shown in FIG. 15C, the microfluidic arrangement (in the example shown in FIGS. 15A to 15C a straight conduit with a circular drop at either end) may then be used in the conventional way.

FIG. 16A shows a more complex pattern of a microfluidic arrangement (a trident shaped circuit) that has been allowed to dry. In FIG. 16B, the fluid conduits have been rehydrated by adding a volume of hydrophilic fluid to each of the circular reservoirs on the right (fluid was added first to the reservoir at the bottom, and last to the reservoir at the top). FIG. 16C shows the microfluidic arrangement fully wetted once more, ready for use.

Figure 17:
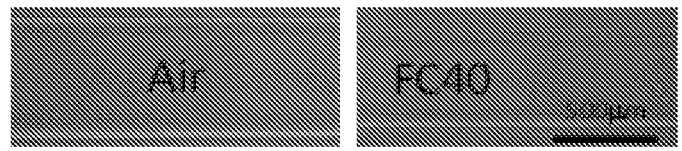

FIG. 17 shows the different width of fluid conduits formed in (i) air and (ii) fluorocarbon (FC40), respectively. Using the same method as described previously, the fluid conduits were formed on a clean surface of (i) a cell culture dish open to atmospheric air and (ii) a cell culture dish containing fluorocarbon. It was found that fluid conduits created in fluorocarbon had a reduced width of 20% compared to the fluid conduits created in air. Both images were taken using contrast microscopy with bright field light source.

FIG. 18 shows an array of fluid drops 1802 (or "reaction chambers") arranged to provide individual reaction chambers, which are not connected by fluid conduits. The array of fluid drops 1802 may be covered by a third fluid, which is immiscible with the second fluid. Aliquots of fluid can be added or removed to each of the fluid drops 1802, at varying concentrations, if required. Aliquots of a further fluid may be added to a fluid drop 1802 to complete a reaction within that fluid drop, for example.

A method of forming fluid drops and/or conduits will now be described, by way of the following example.

A blunt needle of 0.49 mm external diameter was connected via PTFE tubing of 220 µm diameter to a syringe pre filled with RPMI media, controlled by a Harvard Ultra series syringe pump. The needle was attached to a 3D traverse system (Z-400, CNC Step, Germany). Using a pre-programmed system, the needle tip was brought close to the base of a petri dish while in a horizontal orientation.

To form one circuit containing a single fluid conduit connecting two fluid drops, the syringe pump was set to infuse at rates from 300-2000 nl/sec, while the needle remained in a fixed position whence a drop was formed on the substrate. The needle was then traversed along the surface at a fixed speed (2-20 mm/s) with a fixed infusion rate from the syringe pump (300-2000 nl/sec) to form the fluid conduit. Once the needle had traversed the required fluid conduit length, the traverse was stopped and a second fluid drop was formed using the same syringe pump infuse conditions as the first. The needle was then retracted from the substrate surface, and the same sequence was repeated for forming any number of additional fluid conduits.

To prevent evaporation of the deposited fluids, fluorocarbon (an immiscible fluid) was then used to cover the fluid conduits and drops. Alternatively, the fluid channels and drops could be formed in a pre-filled reservoir of fluorocarbon, this alternative method being useful when the forming process may take significant time such as drawing hundreds of fluid conduits. Parallel fluid conduits could easily be produced simply by adding up to 10 syringes to the same syringe pump and hence increasing the circuit-forming rate by an order of magnitude.

FIGS. 19(i)-(v) show a sequence of images explaining an exemplary multi-channel "radial mixer" microfluidic arrangement. FIG. 19(i) shows the microfluidic arrangement on a surface (a 6-cm polystyrene petri dish), devoid of any dyes. In FIG. 19(ii), dye has been added to each of the drops, which is gradually conveyed along each of the fluid conduits towards a centrally connected fluid drop, as shown in FIG. 19(iii). FIG. 19(iv) shows the separated fluids begin to mix together once they reach the central drop, and in Figure (v) the separate fluids from each drop around the edges of the microfluidic arrangement are shown mixed together in the central fluid drop. The flow is driven by Laplace pressure difference between the peripheral drops and the central drop.

FIGS. 20 to 23 show several further exemplary microfluidic arrangements that can be created using the methods described herein.

Figure 20:
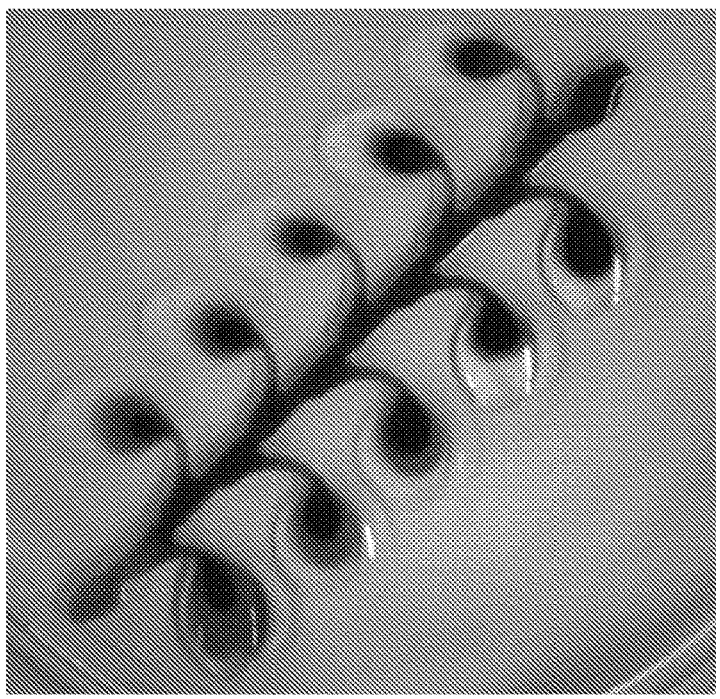

FIG. 20 shows a "dilution series generator" arrangement where in a first step a flow from an orange reservoir drop (bottom left) is established, and in a second step a flow from a blue reservoir drop (top right) is established, such that varying amounts of orange and blue dye is deposited in the 10 branch drops. In both steps the flow is driven by Laplace pressure difference between drops.

Figure 21:
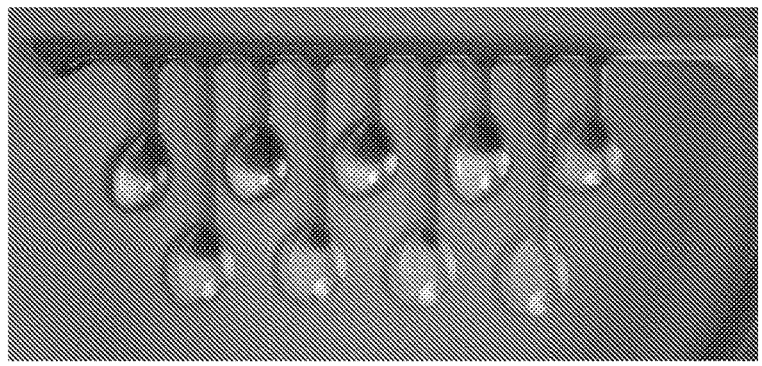
Figure 21:
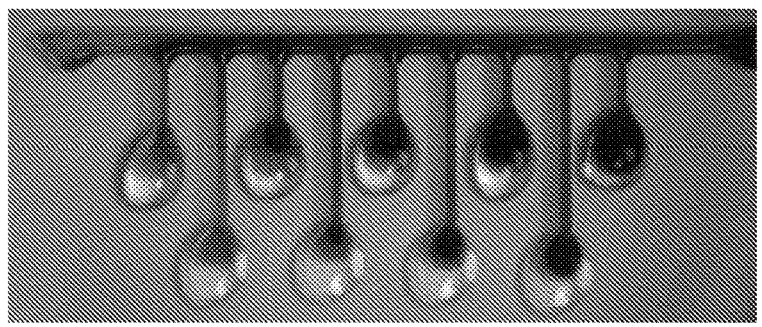

FIG. 21 shows an alternative "dilution series generator" arrangement, similar to the example illustrated in FIG. 20, but with the branch drops having different lengths of feed conduit (5 short, 4 longer feed conduits). The top image shows the circuit after addition of the orange dye (to the left-hand end of the conduit at the top) but before addition of the blue dye; and the lower image shows the circuit after addition of blue dye (to the right-hand end of the conduit at the top).

A method of causing fluid flow is now described, by way of the following example. A nozzle, a blunt needle for example, is connected by a filled tube to a reservoir of fluid at the same pressure as the surroundings. Here when the nozzle tip is lowered just below the level of the reservoir, the resulting small hydrostatic head of pressure drives fluid from the nozzle tip. The pressure drop in the system becomes largest when the drop at the tip forms a hemisphere. The Laplace pressure across the drop interface on the tip of the nozzle will stop flow if the hydrostatic head of pressure is insufficient. If the liquid at the nozzle tip is now brought into contact with the surface, a liquid bridge between nozzle and surface forms. This reduces the curvature of the liquid at the nozzle tip, and so the Laplace pressure. Consequently, fluid flows from the tip, with the flow rate now being proportional to the hydrostatic head of pressure. When the tip is retracted from the surface, flow again ceases due to the increased Laplace pressure at the nozzle tip. This is how flow of first orange dye solution and then blue dye solution through the circuit illustrated in FIG. 21 was controlled. This arrangement can also be used to draw circuits by moving the nozzle along the surface.

Figure 22:
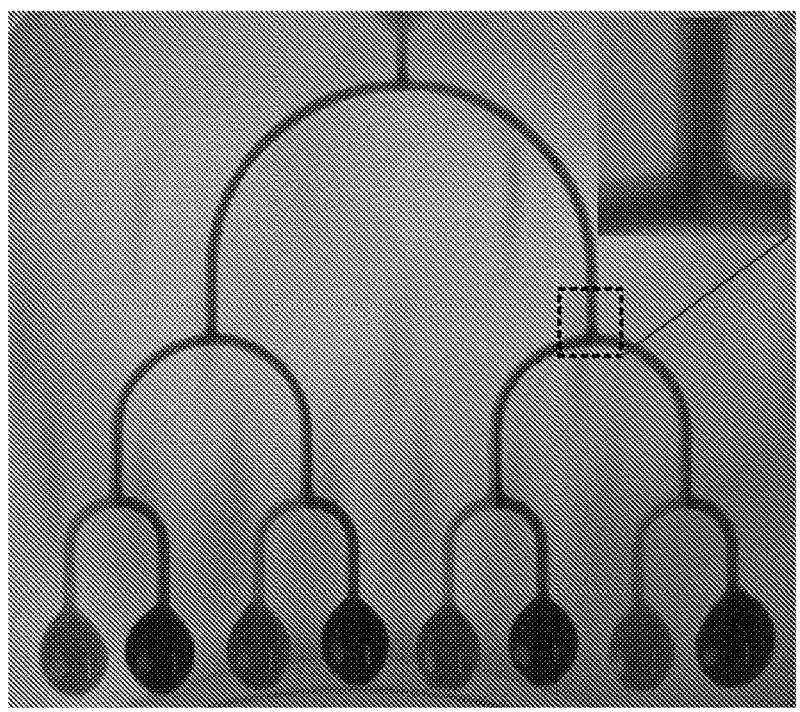
Figure 23:
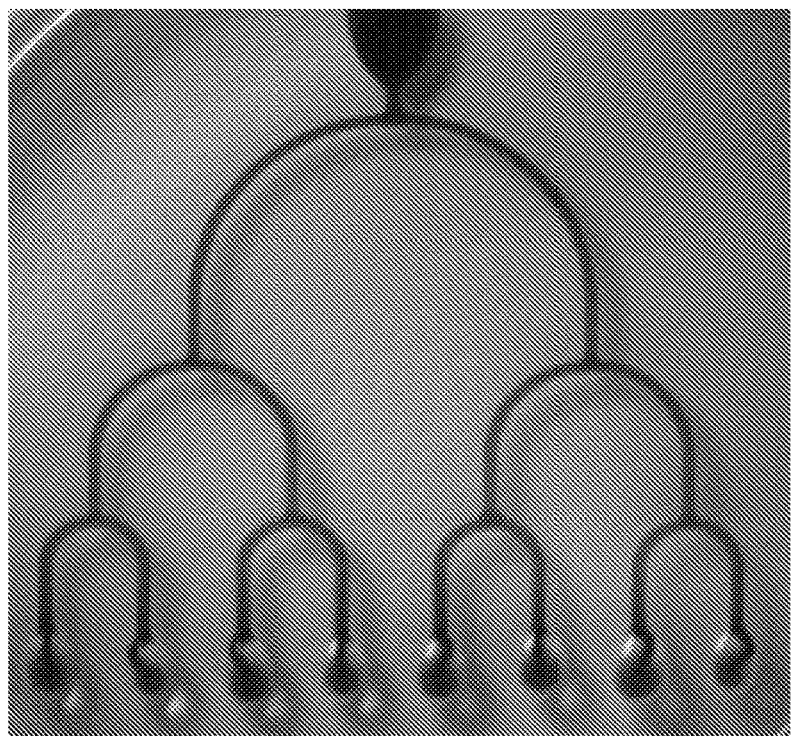

FIG. 22 shows an "eight-channel mixer" arrangement. The inset in the top right corner shows the laminar flow at the junction. FIG. 23 shows an "eight-channel splitter" arrangement; both employ Laplace pressure difference between drops to drive flow.

Nunclon "delta" surface 60 mm diameter cell culture dishes may be used as the substrate to form the microfluidic arrangement, for example (one was used in FIG. 23 and in a number of other illustrated examples). Some cell culture dishes are plasma treated for cell culturing; this may also provide useful surface properties for forming microfluidic circuits.

Conventional microfluidic circuits are embedded in a solid (typically plastic), and fluids in the circuit are confined by solid walls. The circuits described here are formed on a uniform, flat un-patterned surface and they are confined to a particular region of the surface by fluids (e.g., air, oil, FC40)—and not solid walls. Conventional open microfluidic circuits that are not contained by solid walls have been produced either by forming grooves in a flat surface in order to define the circuit topography, or alternatively by chemically modifying (functionalising) the surface to define distinct hydrophobic and hydrophilic regions in order to define the circuit topography. By contrast, the microfluidic arrangements described here are formed on an un-patterned surface that is both flat and has a uniform surface chemistry.

Some of the key aspects of the microfluidic arrangement are:
- having fluid (not solid) walls;
- The area of the interface between fluid 1 and the surface is less than that between fluids 1 and 2;
- Fluid may be pumped through a network by adding fluid in line with an existing conduit and/or by adding fluid to a reservoir;
- conduits may morph and have a variation of cross sectional area/shape/height in a direction of flow (this results from the occurrence of a pressure gradient that in turn causes the radius of curvature to vary); without a flow, a conduit may have a uniform shape and height along its length (provided the conduit footprint is uniform along its length);
- addition or removal of fluid from an circuit/array may change the area of the interface between the immiscible fluids;
- cross-sectional shape and area of features of an circuit/array may morph/change
- conduit height may vary along a length of a conduit when fluid is flowing through that conduit, or when fluid is added to a drop or circuit (provided the footprint of the microfluidic arrangement does not change);
- formed on a flat and/or un-patterned surface, and not for example in a channel formed by a depression in the surface;
- a fluid can be added to (or removed from) any point in a circuit or drop (as all points are readily accessible from all directions above the surface); and when fluid is pumping in the system and the channel is on a horizontal plane the reservoirs will have different shapes, (although they have geometrically similar footprints) at inlet and outlet.

Various features of the present microfluidic arrangements and options for designing the present microfluidic arrangements (both circuits and arrays of drops) are now discussed in more depth.

Drop Shape

The shape of isolated drops—and especially their footprint—is important in order to
(i) pack as many drops as possible into a high-density array on a planar surface,
(ii) ensure that adjacent drops do not merge, and
(iii) enable addition/removal of fluid to/from drops without altering the footprint (which would allow an array of drops on a planar surface to replace a microtiter plate).

Consider an isolated water drop with a circular footprint on a surface in air (similar to the arrangement shown in FIG. 18 of an array of circular aqueous drops overlaid with FC40). The contact angle (the angle at which the drop meets the solid) is determined by the interfacial tensions between (solid/water), (water/air) and (air/solid). Due to contact angle hysteresis an advancing (maximal) contact angle can be formed that is greater than the equilibrium contact angle, and a receding (minimal) contact angle that is smaller than the equilibrium contact angle. A certain amount of additional water can be added to (or removed from) the drop without altering the circular footprint; the contact line defining the limit of the footprint is "pinned", and the contact angle increases (or diminishes) up to the limit of the advancing maximal contact angle (or receding or minimal contact angle). If however water is added (or removed) to change the contact angle beyond these limits, the surface area of the footprint increases (or diminishes). Where a fluid does not pin well on a given surfaces addition of hydrophilic molecules to the fluid can help reduce the contact angle and facilitate pinning.

Now, compare the shape of a roughly hemispherical water drop on a polystyrene surface in air with a water drop of the same volume under FC40; at equilibrium, the circular footprint under air has a greater diameter than that under FC40 (as the contact angle under FC40 is higher). Now consider the effect of adding an FC40 overlay on the shape of a water drop created in air; "pinning" ensures that the diameter of the footprint remains unchanged. Moreover, more water can be added (or removed) without changing the area of the footprint. For example a cell media drop with an equilibrium contact angle of ~50 degrees in air on a culture treated polystyrene substrate has an equilibrium contact angle of ~70 degrees when overlaid with FC40, thereby allowing the addition of ~60% additional fluid without changing the wetted footprint area while maintaining a shape represented by the cap of a sphere. In practice even greater volumes can be added as the advancing contact angle is greater than the equilibrium contact angle. Additionally when the drop is large enough for buoyancy effects to be important even more fluid can be added to the initial drop size.

Some examples follow to illustrate the consequences of the pinning effect described above. In a first example a water drop of ~0.27 microlitres is drawn on a polystyrene surface in air with a circular footprint of 3 mm in diameter; the drop has a contact angle of ~5 degrees (this is less than the equilibrium contact angle as there is so little volume relative to the wetted area) and a maximum height of approximately 0.075 mm. The (height:width) aspect ratio of this drop is approximately (1:40). Up to 2.5 microlitres can be added to this drop before the footprint increases due to failure of "pinning". If the water drop is under FC40 rather than air, 4.32 microlitres can be added before the footprint increases. In a second example a water drop of ~0.27 microlitres has a footprint of 4 mm diameter, and a contact angle of ~2 degrees. In this example the drop has a height of approximately 0.04 mm. The (height:width) aspect ratio of this drop is approximately (1:100). Without an increase in footprint the drop can contain up to 6.3 microlitres in air and up to 10.2 microlitres under FC40. Therefore many multiples of fluid in the drop can be added without changing the footprint. Determining the volumes of fluid that can be contained by a drop of any other diameter is the ratio of diameters cubed—so a drop with 1 mm diameter holds $(¼)^3$ volume of one with a 4 mm diameter (and is ~100 nl in air and ~156 nl in FC40).

With larger water drops, the FC40 overlay has another effect that allows more water to be added to a pre-existing water drop on a polystyrene surface without altering the footprint. With larger drops, gravity becomes more important; it works through differences in buoyant density between (denser) FC40 and water, coupled to "pinning". Addition of more water to a "pinned" water drop under FC40 initially increases the vertical height of the drop without increasing the area of the footprint (as water tends to rise through the FC40 to float upward). This means that yet more water can be added to the drop without increasing the footprint (i.e., the drops become taller, with a column or bell shape)—and this can allow tighter spacing of drops, with the advantages described above.

Using the method of 'drawing' fluid on a surface as described above allows drops to be created that have non-circular footprints (for example, square, hexagonal, or star-shaped instead of circular). For example, in order to create a square-shaped drop a number of straight lines of fluid (of equal length) are drawn side-to-side so that adjacent conduits merge to form a square. In the case of an array of drops with square footprints, the footprints can occupy a greater fraction of the area of the substrate (which can be advantageous if—for example—it is beneficial to maximize the number of adherent cells growing in each drop). The height of fluid in drops with square footprints printed in this way can be much less than the height of fluid in drops which have an equal volume and have a circular footprint, and which were deposited in air at one point on the surface.

In an example a uniform distribution of adherent human cells in a drop on the surface of a tissue-culture dish is desired. In one example a drop of cell-growth medium is deposited on a surface in air, and then cells in suspension are added to the drop (without pinning); cells tend to fall quickly to the surface, while the radius of the circular footprint of the drop slowly increases to its equilibrium condition. This can lead to a concentration of cells in the middle of the footprint, with fewer cells at the periphery. Now consider printing the same volume of growth medium to form a drop with a larger footprint and a flatter profile. Medium containing adherent cells can now be added to this drop without increasing the footprint. Moreover, fluid flows ensure that fluid/cells quickly spread throughout a drop so that they then settle on to the surface with a more uniform distribution throughout the footprint. To obtain a uniform distribution it is preferable to first form a drop on the surface with a contact angle lower than the equilibrium contact angle (providing a relatively 'flat' drop), and then to add further fluid to the drop, without changing the footprint of the drop, so that the newly-added constituents are evenly distributed over the drop. Since the subsequently added fluid spreads across most of the drop, the mixing with the additional fluid is more uniform and rapid.

Different drops can have different internal pressures which may be used to control flow through the circuit. This is described in more detail below.

Conduit Shape

Conduits are shaped using the same general principles described for drops. Conduit width can be controlled by ejecting more or less fluid from a circular nozzle, or using nozzles with different sizes and shapes or varying the distance between substrate and nozzle tip, or by the choice of overlay fluid—as per FIG. 17 (described in more detail below). Additionally, multiple conduits of fluid can be printed in close proximity so that they merge to form one wider conduit. Several conduits side by side and permitted to merge can form any width conduit. This controls the amount of fluid a conduit can hold; for example a 6 mm wide conduit holds approximately 8 times as much fluid as a 3 mm conduit with the same contact angle. Conduit height and cross-sectional profile can be controlled using different immiscible fluids (e.g., air, oil, FC40). Conduit height can also vary along conduit length; as the flow rate (mass transport per time unit) is invariant along the conduit, the varying conduit height has consequential effects on local velocities—and is discussed in more detail below in the section on Laplace pressure. Varying conduit cross-sectional profile and length can then be used to control flow through a conduit. Varying local velocities at different positions along a conduit can be used to assess the effects of shear on cells growing along the conduit (of interest for example in pathologies of the heart/circulatory system). At junctions (e.g., at a T-junction, or where a conduit joins a drop), conduit shape and direction can be used to control the initial direction and rate of laminar flows into the drop.

As illustrated in FIG. 17 the covering fluid affects the geometry of the patterned fluid; in the example a conduit drawn under FC40 is ~20% narrower than the same conduit drawn in air.

Manipulating Flows in Circuits

Flow through a conduit is directly proportional to cross-sectional area/profile and length of the conduit, and fluid viscosity. For discussion here, we generally use as an example (unless stated otherwise) a simple circuit in a polystyrene dish consisting of two aqueous drops of equal volume with spherical footprints (drops A and B) connected by a straight aqueous conduit that joins the drops; the circuit is overlaid with FC40 and the dish is horizontal (as shown in FIGS. 2A and 2B).

1 Active Methods.

(i) External pumps. For example, the tip of a tube filled with water and connected to a syringe pump is inserted below the surface of drop A, and the tip of another tube filled with water is inserted below the surface of drop B (the other end being connected to a waste reservoir). The syringe pump can then inject water into drop A, as water flows out of B into the waste reservoir. In a variant drops A and B are omitted; instead the tip connected to the syringe pump is inserted directly into a fluid conduit on the surface, and the tip of the tube connected to a waste reservoir is similarly inserted at a suitable downstream location in the fluid circuit. The syringe pump can then inject water into the conduit, and water flows through the conduit and then away into the waste reservoir. Examples are described below with reference to FIGS. 40-45 to illustrate both variants for flows driven by external pumps.

(ii) Electric fields. Electrodes are inserted in drops A and B, and an electric field can then drive anions, cations, and charged particles towards one or other electrode.

(iii) Magnetic fields. Magnetic beads or particles are added to drop A, a magnet is positioned near drop A, and the magnet dragged laterally to drop B; consequently, beads/particles are transferred from A to B.

2 Passive Methods.

(i) Gravity. A dish unfilled with FC40 is tilted from the horizontal, so water flows downhill through the circuit.

(ii) Gravity combined with interfacial tension is used to initiate and control fluid flow through a nozzle, as described above with reference to FIG. 21. In brief, a nozzle is connected by a filled tube to a reservoir of fluid filled to the same level as the nozzle; consequently no fluid flows through the system. If the nozzle tip is now lowered, fluid flows out of the nozzle to form a drop that grows until it forms a hemisphere (with a diameter defined by the internal diameter of the nozzle). The Laplace pressure across the drop interface on the tip of the nozzle stops flow if the hydrostatic head of pressure is insufficient. If the liquid at the nozzle tip is brought into contact with the surface, a liquid bridge between nozzle and surface forms. This reduces the curvature of the liquid at the nozzle tip, and so the Laplace pressure. Consequently, fluid flows from the tip. When the tip is retracted from the surface, flow ceases again due to the increased Laplace pressure at the nozzle tip. This kind of approach may be particularly attractive for high-throughput applications where it becomes prohibitively expense to use many syringe pumps. It may also be faster as a large volume of fluid in a reservoir can feed the printing tips rather than a small volume that can be contained within a syringe.

(iii) Gravity acting through hydrostatic pressure. A dish filled with FC40 is tilted so drop B is higher than drop A; consequently, the depth of FC40 over drop A is higher than that over drop B, and higher "hydrostatic" pressure of FC40 acting on drop A drives water uphill to drop B (as illustrated in FIGS. 3A and 3B). A special case of gravity acting through hydrostatic pressure is where an aqueous circuit like the one in FIG. 2A is overlaid with a small amount of FC40 so that the interconnecting conduit is covered (to limit evaporation), but neither of the two drops is fully covered. If fluid is now added to the left-hand drop, the hydrostatic pressure of the water in that drop can drive fluid from left to right (if sufficient to overcome the difference in Laplace pressure between the two drops). Alternatively tubing could be used to connect one drop at higher or lower elevation to another.

(iv) Diffusion. A solute like NaCl is added to drop A; sodium and chloride ions diffuse through the conduit to drop B.

(v) Diffusiophoresis. Two phenomena contribute to diffusiophoresis; chemiphoresis (which arises from difference in chemical potential, and electrophoresis (which arises from the different diffusivities of anions and cations). [Note that no electrodes are inserted into drops.] Here, drop B is absent so a dead-end conduit is connected to drop A (which also contains colloidal particles). If there is a higher concentration of solute in the conduit, diffusiophoresis drives the colloidal particles into the conduit and towards the dead-end; the transport rate can be orders of magnitude greater than that due to pure diffusion. This transport is associated with a circulating flow in the conduit and particle focussing (which can drive separation of particles of different size). Particle flow can also be driven electrophoretically using KCl in the drop, and NaCl in the conduit (and vice versa) under conditions where there is constant osmolarity in the system. Analogous phenomena occur at the edge of a conduit (as well as at the surface of a particle, as in diffusiophoresis); therefore, a Marangoni stress can carry particles along the surface.

(vi) chemically powered pumps, including where fluid flow is caused by density-driven phenomena, self-diffusiophoresis, bubble propulsion, self-electrophoresis, self-electroosmosis, enzyme action; electro- and magneto-kinetic pumps, including electrohydrodynamic, electroosmotic and magnetohydrodynamic pumps;

(vii) Differences in Laplace pressure (the pressure difference between the inside and the outside of a curved surface). The Laplace pressure in a drop depends on the radii of curvature and interfacial tension. Differences in Laplace pressure are here most easily achieved using drops of different size and/or shape—which yield different radii of curvature. For example, if both drops have a circular footprint on the dish and the footprint radius of drop B is greater than that of drop A (i.e., volume drop A<drop B)—and the curvature of drop A is greater than drop B, then A has a greater Laplace pressure than B and fluid flows from A to B. In this example differences in Laplace pressure can drive flow from a smaller (water) drop A towards a larger drop B—which is against the intuition that gravity working through the greater height of water in the larger drop will drive flow in the other direction. Moreover, if the circuit is overlaid with FC40, the greater height of (denser) FC40 above the smaller aqueous drop A can give an additional hydrostatic pressure to augment the effects of the difference in Laplace pressure between the two drops, and drive flow towards the larger drop B.

An example of a fluidic circuit is now considered with reference to FIG. 58 where a schematic of a simple microfluidic arrangement is shown with various dimensions. The footprint of the drops and the conduit (i.e. the conduit width) is fixed by the pinning line. Drop shape is approximated by the cap of a sphere, and the Laplace pressure difference across the interface is $$\Delta P_{interface\_drop} = \frac{2\gamma}{R_{drop}}$$

where γ, R, and P are the interfacial tension, radius of curvature, and pressure. Then, the smaller drop has a larger pressure difference across its interface than the larger one. As drops are overlaid with different heights ($h_1$, $h_4$) of FC40 (density, ρ=1,850 kg/m³), the pressure at the base of a drop results from both hydrostatic and Laplace pressures:

$$P_{base} = P_{atm} + \rho_{FC40} g h_{FC40} + \rho_{water} g h_{water} + \frac{2\gamma}{R_{drop}}$$

The pressure difference at the base of the two drops driving flow to the right is $$\Delta P_{drops} = \rho_{FC40} g (h_1 - h_4) + \rho_{water} g (h_5 - h_8) + \frac{2\gamma}{R_1} - \frac{2\gamma}{R_2}$$

The interplay between hydrostatic and Laplace pressures explains why the decline in volume of the source drops can occur relatively linearly. Thus, as the volume shrinks, the radius of curvature increases and the Laplace pressure falls, and this reduction is balanced by an increase in hydrostatic pressure due to FC40 (which is denser than water).

FIG. 59 shows a graph to illustrate the interplay between the effects of Laplace and hydrostatic pressures on the change in volume of source. Pressure (P) and volume (V) ratios are defined as $$\text{pressure ratio} = \frac{P_{base\ drop} - P_{base(FC40)}}{P_{initially\ (base\ drop)}}$$

$$\text{volume ratio} = \frac{V_{drop} - V_{drop\ initially}}{V_{drop\ initially}}$$

The red dotted line shows the change in pressure ratio when fluids in the source drop and overlay have the same densities; then, a change in Laplace pressure is the sole driver of a reduction in pressure ratio, and the volume of the source drop (and so flow rate) declines progressively. This decline would be even more rapid if the overlay were less dense than water. Dashed-green and solid-black lines show changes when source drops of 5 or 18 µl are overlaid with denser FC40. For a 5-µl drop, a reduction in pressure ratio by ~8% reduces volume by ~25%. For the 18-µl drop, the pressure ratio is essentially constant (<1% variation) until volume falls by ~25%. Hence, larger drops can maintain a constant pressure ratio (and the steady flow rate mentioned above) for a greater percentage of their original volume. Similar considerations apply to the sink drop where change in volume becomes non-negligible.

The table below gives numerical examples of pressures for drops in a circuit as illustrated in FIG. 58 assuming a contact angle, interfacial tension, and FC40 depth of 70°, 40 mN/m, and 3 mm, respectively. The drop volumes are of a magnitude that can be pipetted reliably by hand. Geometric values give the scaling $$V \propto h^{1/3} \propto BR^{1/3} \propto BA^{2/3}$$

| Parameter | Drop volume (µl) | | | |
| --- | --- | --- | --- | --- |
| | 2.5 | 5 | 10 | 20 |
| Drop height (mm) | 0.88 | 1.10 | 1.39 | 1.75 |
| Base radius (mm) | 1.25 | 1.58 | 1.98 | 2.50 |
| Base area (mm²) | 4.91 | 7.79 | 12.37 | 19.64 |
| Hydrostatic pressure, FC40 (Pa) | 38.56 | 34.43 | 29.23 | 22.67 |
| Hydrostatic pressure, water (Pa) | 8.59 | 10.82 | 13.63 | 17.17 |
| Laplace pressure (Pa) | 60.13 | 47.73 | 37.88 | 30.07 |
| Pressure at base of drop (Pa) | 107.28 | 92.98 | 80.74 | 69.91 |

In another example of flow caused by differences in Laplace pressure a drop A has a circular footprint and drop B has a square footprint of the same area. If the two drops have equal volumes, drop B has the greater Laplace pressure, and fluid flows from drop B to drop A. By suitable selection of footprint shape and area any volume of fluid can be used to create a pressure sink or high pressure source by way of achieving suitable drop curvatures. The same effect can be achieved as if the two drops have the same footprint area with varying volumes. For the case of a single drop shaped like a capped sphere, with a specified fluid interfacial tension, the achievable drop curvature is related to the natural geometry the drop forms with the surface as a result of equilibrium contact angles.

Differences in Laplace pressure between two drops connected by a conduit have consequential effects on conduit height—and so flow through the conduit. Conduit height can vary due to the pressure drop in the direction of the flow, and the shape of the confining wall of the fluidic conduit morphs to assume a height that satisfies the Laplace pressure balance resulting from the curvature of the conduit. For illustration, consider the basic circuit with two identical drops A and B connected by a conduit; the Laplace pressure in the two drops is identical, and the conduit height is constant throughout its length (as shown in FIG. 6A). If water is now added to drop B to increase the drop's volume (and reduce the curvature at the water-FC40 interface—as shown in FIG. 6B), the Laplace pressure at drop B is less than at drop A. This results in a pressure difference down the conduit (high close to drop A and low close to drop B; there are consequential effects on conduit height (high close to A and low close to B) and flow velocity (which is from A to B) through the conduit (low flow velocity close to A and high flow velocity close to B). Controlling the content and pressure of drop A and, independently, drop B enables control of a variable conduit geometry. This variation in conduit height may be negligible, or may be significant depending on the circumstances. Variations in conduit geometry cause variations in local flow velocity; this occurrence can be used to assess the effects of shear on cells growing at different positions along the conduit (of interest e.g., in pathologies of the heart/circulatory system).

In the schematic microfluidic arrangement shown in FIG. 58 the conduit height is higher on the left than on the right, and conduit heights morph as drops change in size/volume.

The cross section at any point along the conduit is approximated by a segment of a circle; as there is only one radius of curvature, the Laplace pressure across the interface is $$\Delta P_{conduit} = \frac{\gamma}{R_{conduit}}$$

The radius of curvature ($R_{conduit}$) of the inlet at the point where the height is $h_6$ may be obtained by assuming pressures at the base of a drop and inlet are equal. The pressure drop across the conduit interface, assuming conduit height is negligible, is given by $$\frac{\gamma}{R_{conduit}} = P_{base(drop)} - \rho_{(FC)}g(h_5 + h_1) = \frac{2\gamma}{R_1} - \Delta\rho_{(FC/water)}gh_5$$

Once the radius of curvature of the conduit is known, the geometry of the cross section may be calculated. The table below gives numerical examples of pressures for drops in a circuit as illustrated in FIG. 58 assuming a contact angle, interfacial tension, and FC40 depth of 70°, 40 mN/m, and 3 mm, respectively.

| Conduit width w (µm) | Parameter | Drop volume (µl) | | | |
|---|---|---|---|---|---|
| | | 2.5 | 5 | 10 | 20 |
| 300 | Radius of curvature, R (µm) | 757 | 1038 | 1521 | 2586 |
| | Centre height conduit, h (µm) | 15.0 | 10.9 | 7.4 | 4.4 |
| | Contact angle, CA (degree) | 11.4 | 8.3 | 5.7 | 3.3 |
| | Length of interface, L (µm) | 302.0 | 301.1 | 300.5 | 300.2 |
| | Cross-sectional area, CSA (µm²) | 3008 | 2181 | 1483 | 871 |
| 600 | Radius of curvature, R (µm) | 757 | 1038 | 1521 | 2586 |
| | Centre height conduit, h (µm) | 62.0 | 44.3 | 29.9 | 17.5 |
| | Contact angle, CA (degree) | 23.3 | 16.8 | 11.4 | 6.7 |
| | Length of interface, L (µm) | 616.9 | 608.7 | 604.0 | 601.4 |
| | Cross-sectional area, A (µm²) | 25001 | 17795 | 11974 | 6989 |
| 900 | Radius of curvature, R (µm) | 757 | 1038 | 1521 | 2586 |
| | Centre height conduit, h (µm) | 148.3 | 102.6 | 68.1 | 39.5 |
| | Contact angle, CA (degree) | 36.5 | 25.7 | 17.2 | 10.0 |
| | Length of interface, L (µm) | 963.8 | 930.9 | 913.7 | 904.6 |
| | Cross-sectional area, CSA (µm²) | 90856 | 62200 | 41038 | 23711 |

These data provides the following scaling $$w \propto h^2 \propto CA \propto L_{interface} \propto CSA^3 \propto R^0$$

where CA is contact angle, $L_{interface}$ is the length of the interface, and CSA is cross-sectional area of the conduit.

Flow in the circuit shown in FIG. 58 is driven by the pressure difference between drops. The mean flow velocity varies along the length of the conduit due to the morphing of conduit height in response to local pressure. For example, with 5 and 10 µl drops, there is a pressure difference of 22 Pa over the length of the conduit, and the maximum conduit height reduces from ~30 to ~17.5 µm; consequently, the mean velocity increases by ~70% from inlet to exit. The schematic circuit shown in FIG. 58 includes the simplification that conduit height falls uniformly from inlet to exit; in actual fact the relationship between velocity and pressure drop is non-linear, and deviation from the linear height change occurs.

An example is now described of an arrangement with varying conduit geometry for varying local flow velocity. A 5 microlitre aqueous drop (drop A) is connected by a fluidic conduit to a 10 microlitre aqueous drop (drop B) on a planar horizontal surface covered by air only. At an instant in time both drops have a contact angle of 50 degrees and interfacial tension between the aqueous fluid and the surrounding air is constant everywhere, for example 0.04 mN/m, giving drop heights of 0.86 mm for drop A and 1.1 mm for drop B. This provides a Laplace pressure difference across the air/drop interfaces of ~33 Pa at drop A, and ~26 Pa at drop B. The difference in height between the two drops also provides hydrostatic pressure difference between the two drops. The hydrostatic pressure difference is equal to the density difference between the aqueous fluid and the air multiplied by gravity multiplied by the height difference between the drops. In the present example the second fluid is air and its density is negligible compared to water. In the present example the hydrostatic pressure difference is ~2.4 Pa. Since this pressure difference opposes the Laplace pressure difference the net pressure difference between the drops is 4.5 Pa, which pumps a flow from drop A to drop B through the conduit. The conduit height also varies along its length as the pressure is reducing and this change is related to the Laplace pressure across the conduit interface locally. For example a 500 microns wide channel with inlet pressure of 33 Pa and outlet pressure of 28.5 Pa (Laplace and hydrostatic) would result in a height variation from 26 microns to 21 microns along the length of the channel. This change in height is non-linear between the drops.

In a variant drop A has 2 microlitre volume (instead of 5 microlitre), with all else the same as the example above; here the inlet height of the channel is ~40 microns while the outlet height of the channel remains much closer to 21 microns (as this is controlled by the outlet reservoir drop B). In this example the flow rate (and also the local flow velocities) through the conduit is increased compared to the previous example. As the pressure gradually equalises from the outlet to the inlet the channel height morphs in time and space to become significantly uniform in regions away from the drops.

In a variant an overlay fluid (with a non-negligible density) replaces the air surrounding the drops and conduit; here the hydrostatic pressures can add to the Laplace pressure differences, rather than an opposing it as in the examples above, resulting in an increase in the pressure difference between drops A and B. In the case where the density of the overlay fluid is greater than the density of the aqueous fluid then the hydrostatic pressure between drops A and B acts to assist the Laplace pressure difference. It may even be the case that the Laplace pressure across the conduit interface is smaller than the hydrostatic pressure from the overlay fluid at that position; in this case the conduit height can be reduced to zero as the conduit is squeezed and eventually interrupted; then the flow stops. This would occur near the conduit exit, where the Laplace pressure across the conduit interface is lowest. This behaviour can be used in a method of controlling the flow rate through the conduit by varying the conduit height at the exit by adding/removing fluid from the exit reservoir.

Types of Flow in Circuits (i) Laminar flow. In an example fluid flow in a Y-shaped structure is considered, from two source conduits into one common conduit (as shown in FIG. 8(*i*) and discussed in more depth above). After the point where the two streams merge, laminar flow ensures there is little mixing, although solutes can diffuse between the two streams. Note that the two streams can flow at different rates through one conduit. In another example three laminar streams can flow through one conduit if introduced from the 3 arms of a trident (as shown in FIG. 8(*iii*)). In another example 5 laminar streams can flow through one conduit if introduced from the 5 arms of a multi-inlet circuit (as shown in FIG. 9(*iii*)).

(ii) Vortices in drops. In an example flow within drop B is considered as fluid arrives through the conduit from A (driven perhaps by Laplace pressure). As the laminar stream enters drop B, whirlpools (vortices) form. Whirlpool shape is influenced by the geometry of the conduit/drop junction. Viewed from the side, these whirlpools tend to be at the bottom of the drop. Viewed from above, and if the entry point is normal to the central diameter of the footprint of a spherical drop, the major flow is from the entry point along the centre-line of the footprint to the back of the drop; flow now splits to travel around the edges of the footprint to give a whirlpool on each side. If the entry point is offset from the centre-line of the drop, flow is again from the entry point to the back of the drop, but now the main flow is diverted towards the larger volume on one side. Such vortices/whirlpools can improve mixing in a drop.

(iii) Capillary flow. Consider an illustrative circuit with two drops (A and B) connected by a straight conduit; the circuit contains cell culture medium or a dilution thereof (or any other molecules that leave residues on the surface of the dish after—for example—the water has evaporated). Now the circuit is allowed to dry out. Addition of water to drop B and then to drop A leads to (capillarity-driven) wicking of water from each end of the dried conduit towards the middle (this is also described above with reference to FIGS. 15A, 15B, and 15C). Wicking generates a functional circuit from a surface deposition pattern. Dried out circuits can be conveniently stored and transported, and rehydrated prior to use. This can enable central fabrication of sophisticated circuits, and also facilitate autoclaving.

Alternative methods of rehydrating a circuit include:

(a) Overlaying a dried circuit on a polystyrene culture dish with FC40, putting the dish in a conventional (humidified) cell-culture incubator (37 degrees C., 5% $CO_2$, around 95-100% relative humidity), and the circuit spontaneously rehydrates overnight (water in the humid atmosphere dissolves in the FC40, and rehydrates the circuit). The footprint of a rehydrated drop is that of the corresponding original drop (as relatively little water is transferred through the FC40). This has the important consequence that a large volume of additional fluid can then be added to the drop without increasing the shape or size of the footprint (which is important for packing many such drops or circuits into an array on a plate).

(b) Placing a dried plate in the humid atmosphere of an incubator as above (when the circuit rehydrates), then following rehydration overlaying with FC40.

(c) Cooling a dried plate in a humid atmosphere so the circuit rehydrates, and then overlaying with FC40.

(d) Increasing the humidity to initiate rehydration, before overlaying with FC40.

(e) Putting water drops on the lid of the dish to increase humidity locally to allow rehydration, and then overlaying with FC40.

(iv) Valves. A hydrophobic probe can be used to interrupt the conduit or a hydrophilic probe can be used to restore flow through the conduit. For example, flow can be interrupted between drops A and B by drawing the hydrophobic probe across the conduit to "cut" it. Flow can now be re-established by drawing the hydrophilic probe between one cut end and the other. Such cutting and rejoining creates a valve. Alternatively a solid can be placed to extend from one cut end to the other; the fluid wets the solid and, assisted by capillary forces, the fluid is drawn along the solid and forms a join between the cut ends of a conduit. For the solid an elongate hydrophilic material (e.g. stainless steel needle) is particularly suitable. By way of example, a conduit may be cut with a 0.5 mm PTFE tube. The conduit may then be reformed to a continuous conduit by placing a stainless steel needle of 0.5 mm diameter or greater in the cut region. Using a small object to cut a conduit produces a narrow cut or gap, and using a large object produces a large cut or gap.

Now a number of further examples of microfluidic arrangements created using the methods described herein are presented.

FIGS. 24A and 24B show simple microfluidic circuits illustrating how varying drop size (and so differences in Laplace pressure) can control flow rates. FIG. 24A shows 6 identical circuits containing cell-culture medium printed on a 6-cm polystyrene cell-culture dish. The centre-to-centre distance between each drop in a circuit is 30 mm. FIG. 24B shows the circuits of FIG. 24A with 10 µl of medium (pink) pipetted into the right-hand drop in each circuit, and various different amounts of red dye pipetted into the left-hand drop of each circuit with 10 µl added to the bottom drop, then 8 µl, 6 µl, 4 µl, 2 µl and finally 0 µl to the top drop. Differences in Laplace pressure drive red dye through the conduits from left to right. The left-hand drops initially have the same contact angles but the smaller drop shapes form a smaller sphere and hence the curvature is smaller, giving greater Laplace pressure differences across the drop interfaces. The image was collected a few minutes after the last addition of red dye at the top. Although red dye was added to the bottom circuit first, little dye has entered the conduit. In the second conduit from the top, red dye was added last; however, some has already entered the right-hand drop. This demonstrates that difference of Laplace pressure can effectively drive flow.

Varying conduit width also allows sensitive control of flow rates in a microfluidic circuit. FIG. 57 shows graph of chamber volume decrease over time. In a microfluidic arrangement 18 µl drops are connected to 20 µl drops by conduits 11 mm long and with different widths (590 µm, 670 µm, 880 µm and 1730 µm conduit width). The volumes of the source drops shrink, with the rate of volume decrease (indicative of the flow) being fastest through the wider conduits. Here, flow rates vary from ~8 nl/s to ~80 µl/s as conduit width changes only three-fold. With narrow conduits, flow can remain steady for hours.

A microfluidic circuits can be re-used. For example by removing fluid from drops and adding fluid to drop the contents of drops can be changed to perform new tasks.

FIGS. 25A and 25B show a microfluidic circuit for creating concentration gradients. FIG. 25C shows cell growth at different positions in such a concentration gradient, illustrating how it can be used for a drug screen.

FIG. 25A shows microfluidic circuits prior to addition of dyes. One Y-shaped circuit, and 4 identical linear ones, are printed on a 6-cm polystyrene cell-culture dish and overlaid with FC40; all contain cell-culture media. Plans of the circuits printed on white paper are placed under the dish, and indicate dimensions in mm.

FIG. 25B shows the microfluidic circuits of FIG. 25A after the addition of 3 µl of red or blue dyes (representing drugs), or medium (3 µl) to input ports. These 5 circuits are described in more detail now.

FIG. 25B, topmost circuit with both red and blue dyes: dyes are added to the circular drops on the left. Pressure differences between the circular drops and the rectangle drives both dyes into the rectangle; over time, diffusion creates a concentration gradient of both dyes from left to right across the rectangle (both dyes are present at a high concentration on the left, and low on the right).

FIG. 25B, circuit second from the top with blue dye only: medium is added to the left-hand drop, and blue dye to the right-hand one. Pressure differences between the circular drops and the rectangle drives blue dye into the rectangle; over time, diffusion creates a concentration gradient of blue dye from right to left across the rectangle (high concentration on the right, and low on the left).

FIG. 25B, 3rd and 4th circuits from the top with both dyes (two identical circuits): red dye is added to the left-hand drop, and blue dye to the right-hand one. Pressure differences between the circular drops and the rectangle drives dyes into the rectangle; over time, diffusion creates (opposing) concentration gradients of blue and red dyes from right to left across the rectangle (high concentration of red dye on the left, and high concentration of blue dye on the right).

FIG. 25B, bottom circuit with red dye only: Red dye is added to the left-hand drop, and medium to the right-hand one. Pressure differences between the circular drops and the rectangle drives the red dye into the rectangle; over time, diffusion creates a concentration gradient of red dye from right to left across the rectangle (high concentration on the left, and low on the right).

FIG. 25C shows bright-field views of cells growing at different positions (from left to right) in the central rectangle in a circuit like the ones 3rd and 5th from the top in FIGS. 25A and 25B. For a drug screen, cells are added to the central rectangle, grown for 24 h, drugs added, and cells regrown for 24 h before imaging using a bright-field microscope. Here, TNFα replaced the red dye, and MG132 the blue dye. Images in the bottom row indicate that TNFα has little obvious effect on cells (cell in all three central panels appear similar); images in the top row show that high concentrations of MG132 (which are found at the right of the rectangle in this circuit) induce cell death (indicated by the presence of many refractile round cells in the panel showing the right side).

Figure 26:
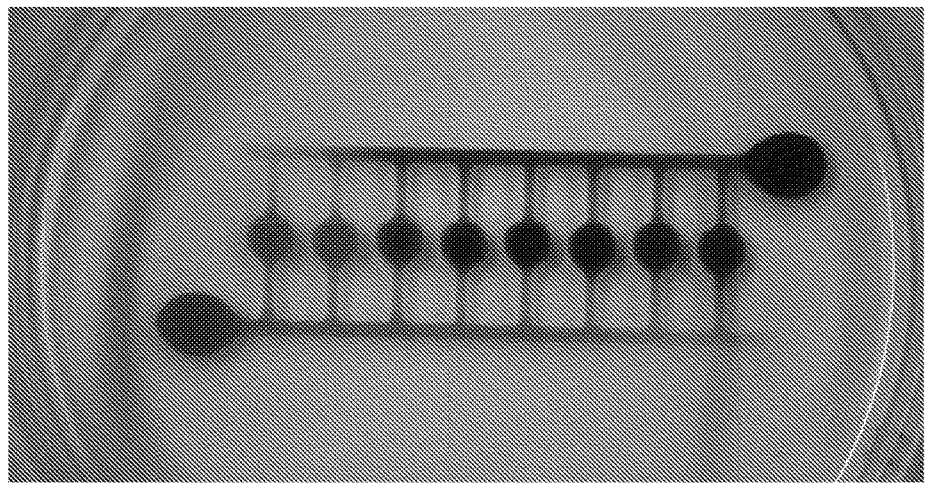

FIG. 26 shows a circuit for creating a dilution series of a reagent. A possible application for this kind of gradient is in examining the effects of combinations of two drugs (represented by red and blue dyes) on living cells (not present). Only sub-microlitre volumes of dye/drug are required for each concentration tested. The circuit (containing cell-culture medium) is drawn (0.5-mm nozzle; flow rate 250 nl/sec; nozzle speed 20 mm/s) in air on a 6-cm polystyrene cell-culture dish, and then overlaid with FC40. The number of times the nozzle was raised in the z axis to traverse from one point to another without printing fluid on the surface was minimized.

Each chamber was created by first drawing its footprint on the dish, and then filling the chamber subsequently. This two-step process is important as it allows accurate printing of the footprint so that—in this case—all identical chambers have the same footprints (and so Laplace pressures); then, once flow begins, all identical chambers empty/fill at exactly the same rates.

The upper and lower "main" conduits (width ~1 mm) are created by running the nozzle along two parallel paths offset by 0.4 mm. The large chamber with a circular footprint (diameter 2.9 mm) at the end of each main conduit was created by drawing 3 concentric circles each offset from the next by 0.5 mm; a straight line also ran along the diameter of the largest circle and was composed of 3 short lines running between circles and across the diameter of the smallest. Eight "feeder" conduits (drawn by the nozzle in a single pass) connect each main conduit to 8 smaller and identical chambers with circular footprints with diameters of 2.5 mm (drawn as a set of 2 concentric circles each offset from the next by 0.4 mm, and each with a line along the diameter composed of 2 short lines running between circles and across the diameter of the smallest). Thus, these chambers are all created as the nozzle moves continuously (and not using a stationary nozzle).

Flows through conduits are determined by conduit length and cross-section, and hydrostatic/Laplace pressures acting on chambers; here, it is important that all 8 small chambers have approximately equal volumes and footprints. Next, 5 µl red dye (representing a first drug) is added to the large chamber on the left, and 5 µl blue dye (representing a second drug) to the large one on the right. As the curvature and height of these two now-filled chambers is greater than that of the 8 smaller ones, dyes flow from large to small drops until pressure differences equalize and flow ceases; then, all 8 chambers contain the same volumes (which can be calculated assuming equal pressures in small and large chambers). The left-most small chamber contains only red dye, and the right-most one only blue dye; those in between contain decreasing (or increasing) concentrations of red (or blue) dye. The volume of fluid within each chamber at equilibrium can be calculated by determining when the pressure in the smaller drop is equal to the pressure in the larger drop (using Laplace and hydrostatic pressure balance).

For drug screening applications cells can be added anywhere to the circuit. For example just the small chambers may contain cells, or cells may be distributed throughout the circuit. Cells may be added together with cell culture medium through the nozzle when the circuit is drawn, or cells may be added after the footprint is defined. In a variant the chambers have square footprints instead of circular footprints.

Figure 27:
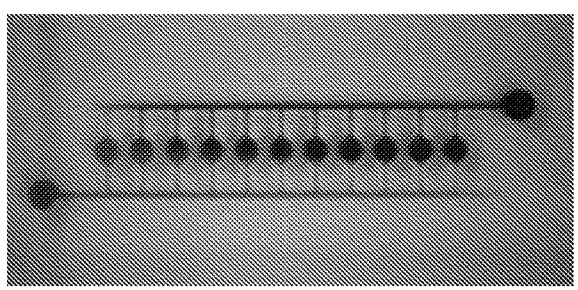

FIG. 27 shows a variant of the circuit of FIG. 26 with 11 smaller drops instead of 8 smaller drops; this allows smaller steps in concentration between consecutive chambers.

Figure 28:
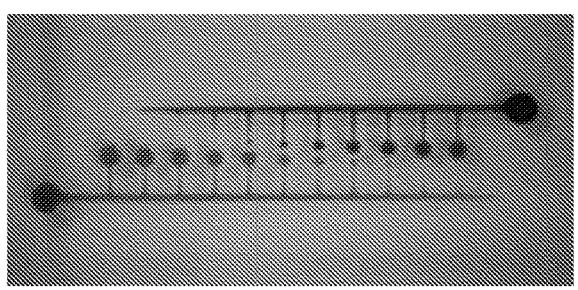

FIG. 28 shows the same circuit as used in FIG. 27 but the photograph was taken at an earlier stage when the red and blue dyes had not yet completely filled the central chambers. For example, in chamber 6 of the 11 (counting from the left), blue dye is entering from the top and red dye enters from the bottom.

Figure 29:
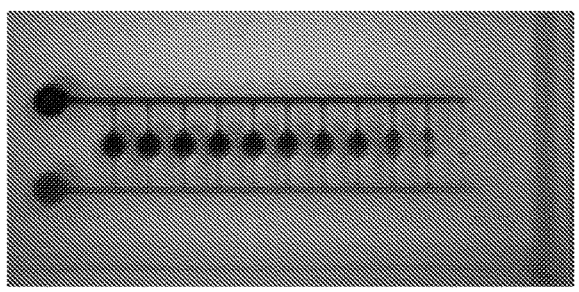

FIG. 29 shows a variant of the circuit of FIG. 27 with both the larger drops (for the blue dye reservoir and the red dye reservoir) located at the left end of the "main" conduits. By this arrangement the small central chambers on the left (i.e., nearest the large drops) have the highest concentration of both red and blue dye, and the small chambers farthest from the large drops have the lowest concentration of both dyes.

Figure 30:
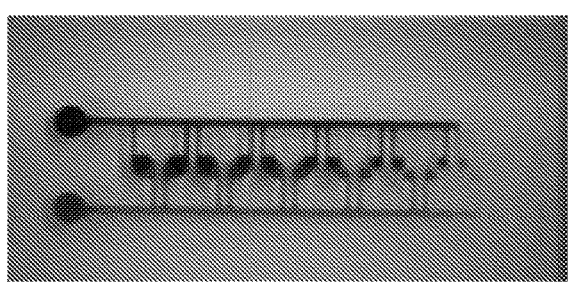

FIG. 30 shows a variant of the circuit of FIG. 29 with an alternative arrangement of the "feeder" conduits. Here feed lines are connected to the smaller drops by a conduit that forms a tangent with the chamber as opposed to a right angle in FIG. 27. Such arrangements have the potential to promote a better mixing of the reagents being added via different conduits.

FIGS. 31 and 32 show variants of circuits used to create a dilution gradient of both a single drug, and a mixture of drugs.

The circuit shown in FIG. 31 is printed in air using tissue-culture medium (pink). The fluidic circuit includes two main conduits (created by drawing two adjacent lines merging to form a wider conduit), each with a large left-hand chamber or "inlet port" (diameter 2.9 mm) and 8 small chambers or "dilution chambers" (diameter 2.1 mm). Feeder conduits (created using a single pass) connect 9 chambers (2.3-mm diameter) in the centre to the two main conduits. All chambers are drawn using concentric circles with a line through the middle. The circuit is overlaid with FC40. Culture medium (10 µl) is added to each inlet port. The culture media is permitted to equilibrate throughout the system so all chambers have the same pressure; this fluid becomes the diluting fluid used for serial dilution of added dyes (which represent drugs). Ten µl red and blue dyes (representing drugs) are pipetted into respective inlet ports, and fluid is spontaneously pumped through the system. As it enters each chamber along the main conduit, the red or blue dye is serially diluted (high concentration in the chamber on the left, low in the chamber on the right). Red (and blue) dyes also flow down (and up) feeder conduits into the chambers of intermediate size in the middle, where the two dyes mix. Consequently, this circuit can generate serial dilutions of two drugs, both singly and in combination. In the mixtures, the two drugs are present at the same ratio at different dilutions.

The circuit shown in FIG. 32 is drawn (0.5-mm nozzle; flow rate 250 nl/sec; nozzle speed 20 mm/s) in air using cell-culture medium on a 6-cm polystyrene cell-culture dish, and then overlaid with 3 ml FC40. Each of the 2 main conduits contains an inlet port on the left (with footprints of 2.9 mm diameter). 8 "dilution" chambers (with footprints of 2.1 mm in diameter) lie immediately above or below the 2 main conduits (the centres of their footprints are offset from the centre-line of the main conduit by 0.5 mm). Feeder conduits connect main conduits to central "cell" chambers (with footprints of 2.3 mm diameter) that are intended to contain cells. Medium (10 µl) is first added to each of the inlet ports; this fills all chambers to the same pressure, and it becomes the fluid used to dilute the dyes/drugs to create the concentration gradient. Once equilibrated, 10 µl blue or red dye is added to an inlet port, and this fluid is pumped through the system. As it enters each dilution chamber abutting the main conduit, it is diluted; this creates a concentration gradient of red or blue dye down each main conduit. Fluid also flows through the feeder conduits into the cell chambers. Each cell chamber therefore contains red and blue dyes at a different concentration (but the ratio of red:blue dye is the same in all cell chambers). Additional fluid may be added to an inlet port if further drug/media needs to be added to cells. Once equilibrium is reached the circuit is observed to remain stable for over 24 h with no variation of the concentrations in the chambers.

FIG. 33 shows the left-hand end of a microfluidic circuit for creating an array of concentration gradients analogous to those described with reference to FIGS. 26, 27 and 28, but with two rows of smaller gradient mixing chambers (instead of one). Here, there are three main conduits which have an input port at each end (red dye was added to two input ports on the right, but these are out of view). The two rows of smaller chambers each create the same concentration gradients. In order to obtain the same concentration gradients as in the single-row arrangement (FIGS. 26, 27 and 28) the parameters for the single-feed conduit (blue) need to be adapted to produce twice the flow rate of either of the double-feed conduit (red), for example by selection of the chamber footprint and added volume.

FIGS. 34 and 35 show a microfluidic circuit that can be used to add fresh fluid to an array of chambers.

The circuit shown in FIGS. 34 and 35 is drawn in air with cell culture medium using a 0.5 mm needle and flow rate of 350 nl/sec. Part of the circuit on the right is out of view, and only regions in the view are described. The 5 large inlet ports on the left have footprints of ~3.4 mm in diameter, and the 5 main conduits that are connected to them are ~1.1 mm wide. The 40 small chambers (with footprints of 2.8 mm diameter) are connected to the main conduits through smaller feeder conduits (width ~0.6 mm). Small chambers have footprints of 2.8 mm diameter, and are spaced 4.5 mm apart (as in 384-well plates). Once made, the circuit is overlaid with 6 ml FC40 to prevent evaporation. Then, 10 µl medium plus red or blue dye is added to each inlet port. Over a period of ~40 min, the system equilibrates as all cell chambers are filled with fluid (fluid height increases without change in the diameter of the footprint). FIGS. 34 and 35 illustrate the system at two times after adding dyes—which are added to illustrate fluid flows. At equilibrium, 3.3 µl is lost from each input chamber, and each of the 40 small cell chambers increases its volume by ~840 nl.

This circuit provides a method to allow feeding of fluid from inlet ports (the 5 large chambers on the left in both images) to a bank of small chambers (here, the 40 small chambers on the right—but there could be many more). This method could be used, for example, to provide fresh media to a single cell as it grows into a colony in each small chamber in a larger array. The system allows fresh medium to be added to each small chamber without change in the diameter of its footprint, and without any fluid flowing from one small chamber to another. This is convenient to use, as the user only needs to pipette media into the 5 inlet chambers, and it flows autonomously here to the 40 smaller chambers, such that all 40 smaller chambers have the same composition. This can for example permit supply of fresh culture medium to cells over time: for example the user can add fresh culture medium to the 5 reservoirs every 3 days, and the fresh culture medium flows evenly to the chambers. The 5 reservoirs could be replaced by a single larger reservoir allowing even less pipetting steps, although this results in increased unused volumes of reagents remaining in the drop to which the reagent is pipetted into.

FIGS. 36 and 37 show microfluidic circuits for investigating combinations of reagents.

FIG. 36 shows a circuit that can be used to examine the effects of combinations of 4 drugs (represented by red and blue dyes) on living cells (not present). The circuit (containing cell-culture medium) is drawn (0.5-mm nozzle; flow rate 250 nl/sec; nozzle speed 20 mm/s) in air on a 6-cm polystyrene cell-culture dish. The four lower chambers each have footprints with a diameter of 2.7 mm, and centre-to-centre distance is 4 mm. The next two rows have chambers which each have footprints of 2.3 mm; these chambers can contain cells. Once printed, the circuit is overlaid with 3 ml FC40. 5 microlitres of each dye is added to the inlet chambers at the bottom. This dye then flows into the smaller reservoirs and the flows merge at the junctions. The top-most drop is used as a lower pressure drop to maintain flow through the system. At equilibrium all drops have the same pressure and therefore drops of equal diameter will have the same volume of fluid.

FIG. 37 shows a circuit that can be used to examine the effects of different combinations of 8 drugs (represented by red and blue dyes) on living cells (which are not present here). The circuit (containing cell-culture medium) is drawn (0.5-mm nozzle; flow rate 250 nl/sec; nozzle speed 20 mm/s) in air on a 6-cm polystyrene cell-culture dish, and then overlaid with 3 ml FC40. 5 μl of a red or blue dye is added to each of the 8 inlet chambers at the bottom (which are spaced 4.5 mm apart—the spacing found in a 384-well micro-titre plate). Except for the topmost chamber (which initially has the lowest pressure), all other chambers are smaller and can contain cells in a drug screen. Dye (or drug) from each inlet chamber is carried upwards into a smaller chamber in the second row from the bottom (which are used to assess the effects of that one drug on the cells). Chambers in the third, fourth, and fifth rows from the bottom contain mixtures of dyes/drugs derived from 2, 4, and 8 input chambers. Once pressures in the system have equalized, all drops have the same pressure, and drops with equal footprints contain the same volume of fluid. Once equalisation is achieved the concentration distribution remains stable and unchanging for at least 12 h.

FIG. 38 shows a microfluidic circuit for joining and splitting streams. Here, two streams (red and blue) flow from the two large input ports (containing blue or red dye on the right) to 4 chambers (that initially contain no dye on the left). Streams from the input ports join at a junction, continue in laminar flow beside each other, and are then split at a junction and subsequently split again. In the conjoined laminar flow portion diffusion occurs between the two flows (though this may result in only negligible mass transfer).

FIG. 39 shows a microfluidic arrangement with a grid of conduits and two input chambers at the bottom left. In the illustrated example first an amount of blue dye is loaded in one of the input chambers and permitted to flow into the grid. Then an amount of red dye is loaded in the other feed chamber and permitted to flow into the grid. The result is a distribution of the two dyes in the grid.

FIG. 40 shows a microfluidic arrangement with external pumps to drive the flow rather than the passive methods described in other examples. In this example external pumps are arranged to drive medium through the circuit at a fixed flow rate over many hours. The two 'inlet' ports (drops) at the front (diameters 2.6 mm, centres 14 mm apart) are each connected by narrow channels (0.6 mm wide) to a wide rectangular channel (20 mm long and 1.6 mm wide), which in turn is connected by a short 4-mm channel (1 mm width) to the large 'sink' drop (5.6 mm diameter) at the back. The circuit was drawn in air in a 60 mm polystyrene culture dish with a 0.5 mm needle tip traversing at 20 mm/s as it ejected cell media+10% serum (flow rate of 300 nl/s), and then overlaid with 4 ml of FC40. Red and blue dyes are being pumped into each inlet port (at 10 nl/sec) through 0.5 mm blunt needles (these may be replaced by plastic tubes made of PTFE). The photograph is taken after 1 h.

FIG. 41 shows a microfluidic arrangement with external pumps to drive the flow, similar to the arrangement shown in FIG. 40. Unlike the example shown in FIG. 40 no 'inlet' drops are provided; instead, the fluid is pumped directly into a conduit. The tips of two stainless-steel needles (front; diameter 0.5 mm; tips are 14 mm apart) are inserted in the input channels (width 1.1 mm). The needles are connected to two syringes driven by one syringe pump that drives flow at a constant rate of 100 nl/sec. Blue and red dyes flow from input channels into the wide central channel (20 mm×1.6 mm), through a short 4-mm channel (1 mm width), and into the large 'sink' drop (5.6 mm diameter) at the back. The photograph is taken after ~5 min. As in the previous example, the circuit was drawn in air in a 60-mm culture dish with a 0.5 mm needle tip traversing at 20 mm/s as it ejected cell media+10% serum (flow rate of 300 nl/s), and overlaid with 4 ml of FC40. At a lower flow rate of 1 nl/s rather than 100 nl/sec, flow is sufficiently slow that considerable amounts of red and blue dyes are able to diffuse between the laminar streams in the central channel (giving purple at the back); at a higher flow rate of 1000 nl/s, flow is so fast that little diffusional transfer occurs. After 12 h dye distributions in the central channel remain similar throughout the 12 hours, but the volume in the sink increases considerably.

Where external pumps drive the flow the present microfluidic features (that are retained in the given shape by a fluid interface) are particularly convenient. The connection to the external pump is achieved by simply inserting a needle (or tube) into the conduit. Because the conduit interface is fluid no damage occurs to the microfluidic arrangement. The needle can be retracted and/or repositioned without damaging the microfluidic arrangement. Consequently no particular design is required to provide inlet/outlet ports, with the advantage of design simplification. Also, as no special connectors are necessary, problems with leaking connectors can be avoided.

Figure 42:
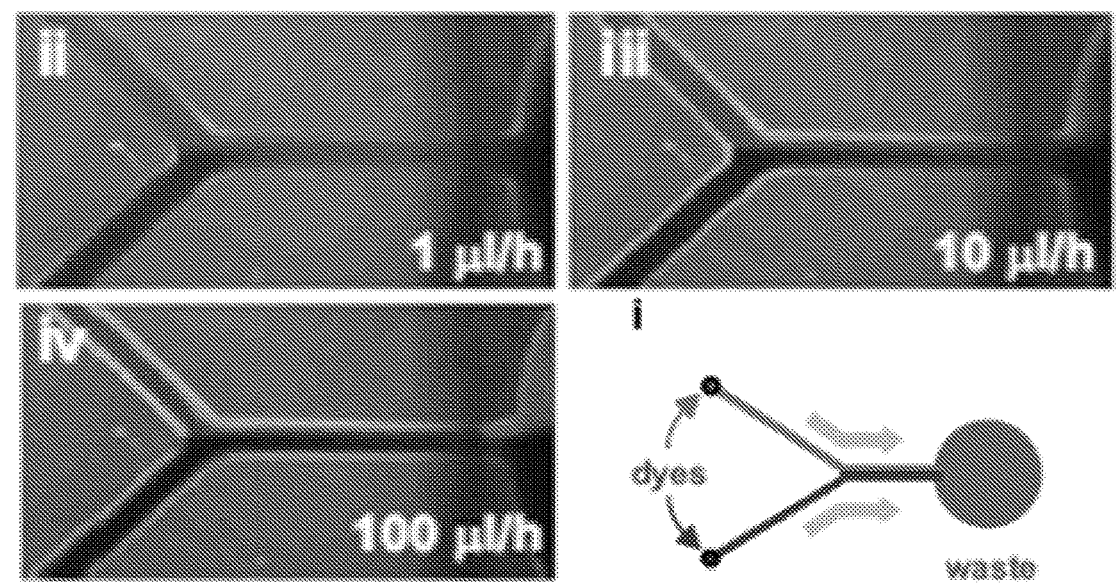
Figure 44:
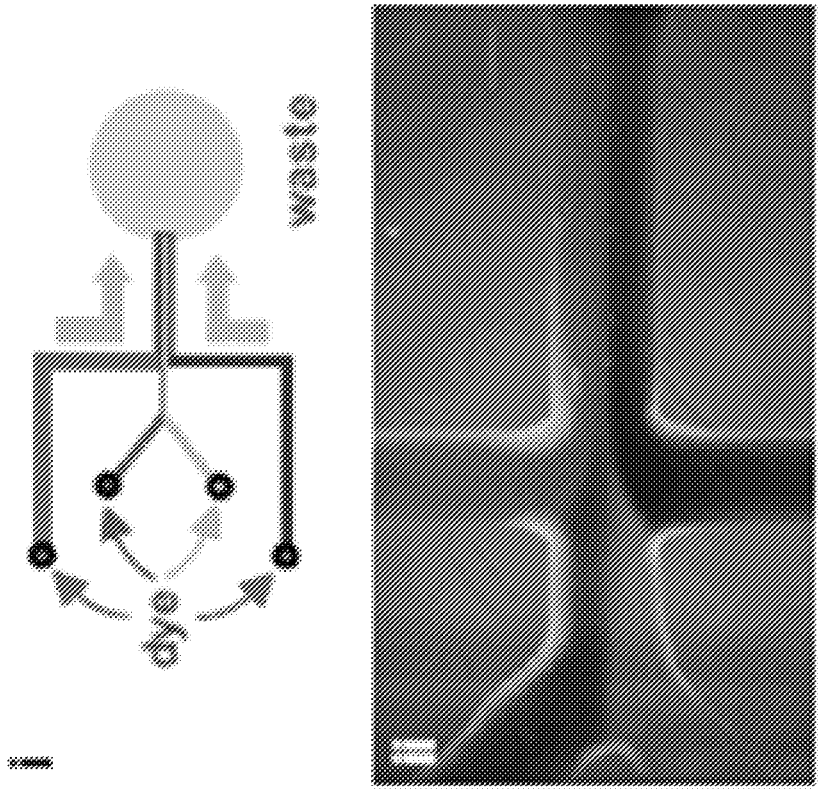
Figure 43:
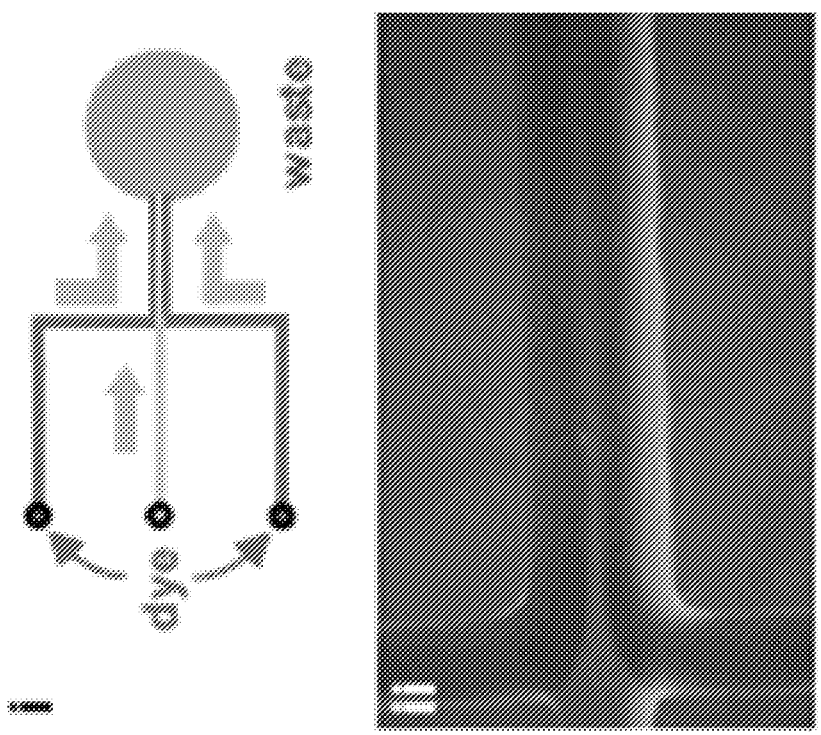
Figure 45:
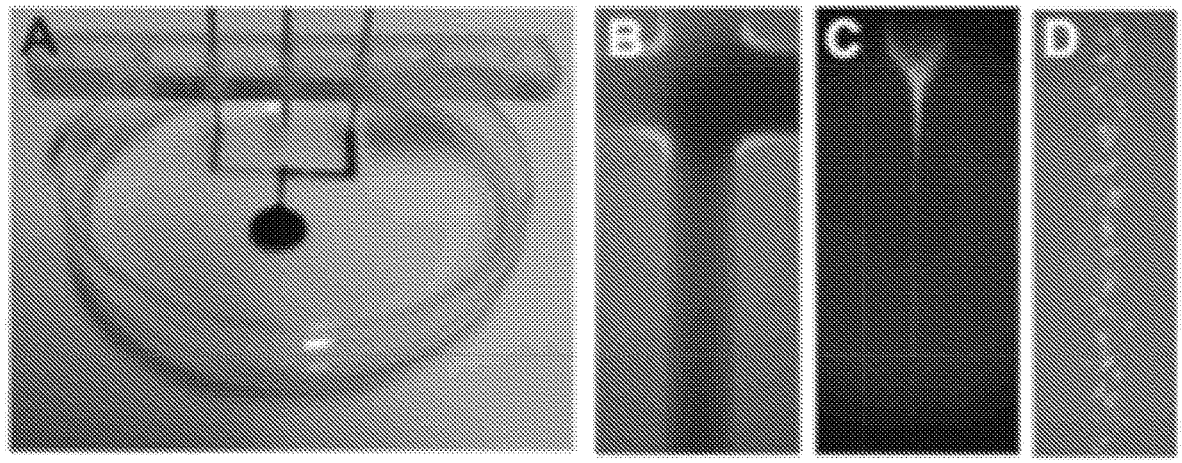

FIGS. 42 to 44 show microfluidic arrangement with external pumps to drive the flow, where the fluid is pumped directly into a conduit similar to the arrangement shown in FIG. 41. FIGS. 42 to 44 show microfluidic circuits with 2-4 stable laminar streams. FIG. 42 shows a Y-shaped microfluidic circuit with 2 input conduits that are joined into a common conduit where the two input streams continue beside one another in laminar flow. FIG. 43 shows a trident-shaped microfluidic circuit with 3 input conduits that are joined into a common conduit where the three input stream continue beside one another in laminar flow. FIG. 44 shows a 'two-plus-two' microfluidic circuit with 4 input conduits that are joined in stages into a common conduit where the four input stream continue beside one another in laminar flow. In all three examples the input conduits are about 500 microns wide, and the common conduit is about 500 microns wide, and the waste drop has a circular footprint with 6 mm diameter. The circuits in these three examples were printed using a 0.5 mm blunt needle at 15 mm/s tip speed and cell culture medium at 300 nl/s flow rate. Needles (outer diameter 0.6 mm; marked by black circles in the schematic views) are connected to a syringe pump; the needles are arranged to deposit fluids from above into the end regions of the input conduits distant from the waste drop. Grey arrows in the schematic views indicate the directions of flow.

FIG. 42 (*i*) shows a schematic view of the Y-shaped circuit. FIGS. 42 (*ii*) to (*iv*) show bright-field micrographs of the Y-shaped circuit fed with red and blue dyes at flow rates of 1 microliter per hour (FIG. 42(*ii*)); 10 microliter per hour (FIG. 42(*iii*)); and 100 microliter per hour (FIG. 42(*iv*)). Considerable diffusion of dyes between the laminar streams in the common conduit is observed at a flow rate of 1 microliter per hour (FIG. 42(*ii*)). Little diffusion of dyes is observed at flow rates of 10 microliter per hour and above (FIGS. 42(*iii*) and (*iv*)).

FIG. 43 (*i*) shows a schematic view of the trident-shaped circuit. FIG. 43 (*ii*) shows a bright-field micrograph of the trident-shaped circuit fed with different coloured fluids; in the common conduit red laminar streams flank the clear central stream.

FIG. 44 (*i*) shows a schematic view of the four-inlet circuit. FIG. 44 (*ii*) shows a bright-field micrograph of the four-inlet circuit fed with different coloured fluids. In the common conduit four laminar streams can be observed.

FIGS. 45A to 45D show a microfluidic arrangement with external pumps to drive the flow, where the fluid is pumped directly into a conduit, similar to the foregoing examples. The microfluidic circuit in this example is for flow focussing; a trident-shaped circuit as described above is used to confine a central stream in the common conduit into a narrow, focussed stream. Images were collected 30 min after starting flow. FIG. 45A shows a photograph of the microfluidic circuit in 6-cm polystyrene cell culture dish overlaid with 3 ml FC40. The three inlet conduits are joined into a common conduit that feeds into a waste reservoir with a circular footprint. The microfluidic circuit was printed using a 0.5-mm blunt needle at 15 mm/s tip speed with cell culture medium at 300 nl/s flow rate. The input conduits are 500 microns wide, and the common conduit is also 500 microns wide. Three hollow needles (outer diameters 0.6 mm) are connected to syringe pumps (not shown) to deliver fluids to the three tips of the input conduits of the trident. Red and blue dyes flow (16 µl/h) through the outer arms of the trident, while fluorescent beads (2 microns diameter) flow (4 µl/h) through the central arm. After a period of flow the lines feeding the trident and the waste reservoir are disconnected using a fluorophilic (hydrophobic) tip pulled along the surface through the conduits to stop the flow.

FIG. 45B shows a bright-field micrograph of the junction area of the trident after the conduits have been cut and the flow is therefore stopped. FIG. 45C shows a fluorescent micrograph of the same area. FIG. 45D shows an enlarged fluorescent micrograph of the laminar stream in the common conduit. It is observed that the aqueous stream containing beads is squeezed by the flanking dye-bearing streams leaving a narrow width of beads on the surface. Beads are confined to a stream ~40 microns wide after flow is stopped.

FIG. 46 shows a microfluidic arrangement on a glass substrate rather than the polystyrene substrate described in other examples. In this example a microfluidic circuit generates diffusion gradients over 1.5 mm on a glass slide. The concentration gradient results from diffusion, rather than from mass fluid transfer (convection), as a constant input concentration is maintained by a steady fluid flow. Circuits were drawn in air on a glass slide with a 0.5 mm needle tip traversing at 20 mm/s as it ejected cell media+10% serum (flow rate of 300 nl/s), and overlaid with 4 ml of FC40. Footprints of inlet drops 1 and 2 (left) have a diameter of 3.3 mm, and the 'sink' drop (right) has a footprint of 6.5 mm diameter. Inlet and sink drops are directly connected by thin and thick channels 0.7 or 1 mm wide. A "cell chamber" with width of 1 mm and length of 1.5 mm (inset) connects the two wide streams. Initially, 6.5 microlitres of media were pipetted into each inlet port; fluid flows from inlet ports to the sink along the shortest route; this flow ensures that a uniform concentration of blue (or red) dye is found at the top (or bottom) end of the cell chamber. Inspection over time shows that some blue dye passes down through the cell chamber (i.e., from the upper wide channel to the lower wide channel) at the same time as red dye passes upwards. This demonstrates that dye transfer results from diffusion, and not convection as convection would be uni-directional.

In some circumstances it may be desirable to include solid structural components, such as a reservoir for containing a large volume of liquid. For example for a reservoir a solid wall structure may be provided around the circumference of the reservoir. The reservoir may remain open at the top. Outlets may be provided in the reservoir wall, for example at the bottom edge of the wall adjacent the substrate, much like a gate in a city wall. Surface tension can retain fluid in the reservoir and prevent it from passing through the outlets, until a conduit is drawn on the substrate connecting the reservoir fluid to the exterior of the wall.

In some circumstances it may be desirable to allow one conduit to cross another without enabling fluidic communication. There is sometimes a need for one aqueous conduit (with walls of FC40) to pass over another conduit (with similar walls). Consider a pair of identical circuits on a polystyrene surface in air; each has two aqueous drops connected by a straight aqueous conduit. One circuit is now overlaid with FC40. Next, the other circuit is inverted (surface tension maintains the shape of the upside-down circuit) and placed over the first so that the conduits cross at a non-parallel angle. Finally the second circuit is lowered on to the first until the tops and bottoms of the drops touch the other surface. The result is a flyover/underpass. Under some circumstances it is possible to produce a number of circuits in different layers, at different heights from the base substrate.

Alternatively a circuit may be formed on both sides of a single substrate with through holes connecting them. Such through-holes could be filled with liquid for flow experiments or gel for diffusion experiments.

FIG. 47 shows a circuit with a fluidic overpass/underpass. A glass slide with a small hole sits on two pedestals (black)

in a rectangular micro-titre plate filled with FC40. FC40 completely covers the aqueous circuit (pink) that is held by interfacial forces on to both surfaces of the glass slide. Water stretches continuously from the drop (at front left) on the lower surface of the slide, through the small hole to the top surface, and then along a connecting conduit to another drop (at top right). This structure can be used as a fluidic overpass or underpass in various ways (e.g., using another conduit that sticks to the underside of the slide, and which is at right angles to the one on the upper surface). Also since the entire structure is overlaid with FC40 the pressure on the drop underneath is higher due to hydrostatic pressure than the pressure on the drop at the top, and therefore this method can be used to feed a reservoir from large drops underneath for long periods of time.

FIG. 48 shows another circuit with a fluidic overpass/underpass. Here two conduits with reservoirs on glass slide are arranged such that the conduits are facing one another, and the glass slides are arranged such that the conduits merge at the area of intersection. This arrangement can provide a complex a 3D type structure to be created where there is communication between the conduits on each glass slide. Again the reservoir is filled with FC40.

In another example of more sophisticated 3D structures the density of the first fluid and the second fluid is matched such that portions of the first fluid can remain supported or suspended within the second fluid. This can enable the formation of more elaborate topographies of the first fluid on the substrate. In the case of chambers, for a given chamber footprint the chamber volume is not limited by the contact angle between the first fluid and the substrate. If the first fluid is suitably positioned in the second fluid then the chamber can form a relatively tall structure.

In another example of more sophisticated 3D structures layers of the first fluid are arranged and solidified (for example by exposure to heat or UV light), and then further layers of the first fluid are arranged on top of the first layer. This can enable the formation of more elaborate topographies.

Although typically in the examples described herein only two or three different fluids (e.g., air, water, and FC40) are used, any number of fluids could be combined. For example a first aqueous fluidic circuit is drawn, a second ethanol-based circuit is drawn, an FC40 overlay is added, and an air-based circuit is drawn beneath the FC40 overlay at the substrate surface.

Now some general techniques for manipulating the microfluidic arrangements described herein are summarised. The starting point is a microfluidic circuit or array of drops with a given footprint that has been drawn onto a surface, potentially with an additional overlay (FC40) to prevent evaporation.

Addition of fluid
  a nozzle adds fluid from below the surface of a drop with the nozzle in contact with the microfluidic circuit.
  a nozzle adds fluid from above the surface of the drop, without direct contact between the nozzle and the microfluidic circuit.
  a nozzle ejects fluid continuously or discontinuously.
  rehydration of a dried-out drop as described above.
  transfer of material (e.g., a gas like carbon dioxide, or a fluid like water) through an overlying immiscible liquid/fluid (e.g., FC40).
Subtraction of fluid
  a nozzle removes fluid from below the surface of the drop or at any location in the microfluidic circuit.
  transfer of material (e.g., a gas like carbon dioxide, or a fluid like water) through an overlying immiscible liquid/fluid (e.g., FC40).
Selection of particular contents from drops
  By attachment to the solid surface (e.g., of adherent human cells to a polystyrene culture dish, of antibodies/proteins to a surface as in an enzyme-linked immunosorbent assay (ELISA)).
  By attachment to the interface between the two fluids (e.g., between water and an oil, which might be used to remove a lipophilic reagent).
  By attachment to magnetic particles held in position by a magnet.

The following techniques for manipulation are specific to microfluidic circuits. The flow rates and the timing of occurrences can be closely controlled for tailored outcomes. The various manipulations can be combined to produce sophisticated functionality.

Adding/merging
  Between laminar-flowing streams in one conduit (which might have the same or different cross-sectional areas and shapes along its length)
  Between two or more conduits at one junction point
  Through mixing in a drop or chamber
  In order to clean a circuit
Dilution
  During passage down one long conduit (which might have the same or different cross-sectional areas and shapes along its length)
  During passage through successive conduits (which again might have the same or different cross-sectional areas along their length)
  During passage through one or more drops/chambers placed along one long conduit
Splitting
At junctions
Creating concentration gradients
  Down a conduit by diffusion (without net fluid flow)
  By diffusion from one stream to another as they flow down one conduit
  By diffusion across the (linear) interface where two streams meet in the middle of one square/rectangular/hexagonal chamber Separating particles
  Using conduits with different cross-sections to filter particles.
  Through diffusiophoresis in a dead-end conduit.
  Through "inertial lift" on a particle in a conduit. This stems from an asymmetry of pressure and viscous stress on the particle surface, and it depends on particle size, conduit geometry, and flow (the latter two can be manipulated easily in the present system).

Now some general features of the microfluidic arrangements described herein are discussed in more detail.

Due to the absence of rigid walls confining the conduits, it is possible to vary the height of a conduit, for example by increasing the pressure of fluid in the conduit. Due to pinning, the footprint of the conduit can remain unchanged. If the height of a conduit (and accordingly the contact angle) exceeds a threshold then the conduit is widened. Conduit height can be varied within 3 orders of magnitude; for example the height of a conduit initially 1 µm high can be increased to 100 µm or even 1000 µm, whilst retaining the same conduit footprint. As discussed above, where there is a pressure gradient along a conduit there is also a variation in conduit height at different positions along its length.

Due to the absence of rigid walls confining the chambers, it is possible to vary the volume of a chamber. By recognising that due to pinning a given footprint can remain the same, it becomes possible to decrease or increase the radius of curvature of a drop (chamber) by removing/adding a certain volume—and without changing the footprint. This permits selection and control of the Laplace and hydrostatic pressure in the drop, and accordingly of flow in a circuit. It should also be noted that the maximal pinning angle depends on three materials (the substrate and the two fluids); by appropriate selection of the combination of materials a relatively high maximal pinning angle can be achieved, and a relatively high capacity for varying the volume of a drop without affecting the drop footprint can be provided.

In the examples illustrated in FIGS. 19-21 and 26-35 the use of a system without solid walls defining the chambers and conduits is particularly relevant, as these designs include 'dead-end' chambers that have an inlet but no outlet. In the present microfluidic arrangements the volumes of the chambers change as fluid is added (to the larger 'reservoir' chambers), as fluid flows out (from the larger 'reservoir' chambers), and as fluid flows in (to the smaller 'reaction' chambers). With fixed chamber volumes this would not be possible, and for a flow into a chamber there would have to be a balancing flow out of the chamber. To provide this conventional solid wall microfluidics generally require an outlet to each chamber, be it a microfluidic channel or a port out of the microfluidic system. Because in the present microfluidic arrangements the chamber volumes can change, the overall device can be much simpler.

It is beneficial if the initial circuit is drawn or printed such that the features are relatively flat (i.e., they have relatively little height above the substrate, and a small contact angle, for example of 1° to) 10°; then, they have a significant capacity for receiving additional fluid. This allows definition of a skeleton circuit layout that enables subsequent addition of reagents and fluids at desired locations and the causing of the desired fluid flows in the circuit. The skeleton circuit can be produced centrally (possibly according to a user-specified design) and can be transported (optionally in a dried or frozen condition) to a user for use as desired. The user can then select a number of further parameters such as volumes to be added (affecting the Laplace pressures and flows in the circuit), overlay (affecting buoyancy of the circuit) and substrate tilting (affecting hydrostatic pressures in the circuit), amongst others.

An additional convenience in the present microfluidic arrangements is that flow can be achieved without requiring an external active pumping device such as a syringe pump. Instead, hydrostatic pressure and Laplace pressure can be controlled to achieve the desired flow in a circuit. Such passive pumping is enabled by the chambers having variable volumes by virtue of the non-solid walls. The absence of an external active pumping device brings advantages such as no dead volume and no sample waste, which can be particularly important for scarce samples, but also system simplicity and independence of costly equipment and implementation/integration with existing equipment.

In drawing a microfluidic circuit, that is, pre-defining a pre-wetted circuit footprint, an automated drawing system is described above to achieve precision of the features. Hand drawing may be perfectly appropriate, especially for cutting off features as described above. If hand drawing is desirable but achieving good precision is difficult, then stencils can provide predefined features such as conduits and chambers that can be arranged as desired. Suitable circuit designs include any conventionally used microfluidic layouts. Additionally designs with 'dead-end' chambers as discussed above are possible.

As described above, one of the advantages of the present microfluidic arrangements is that the user has considerable freedom in altering a given microfluidic layout. In a simple example 4 reservoirs are provided, each with a different reagent, and a reaction chamber is provided. A user can first connect the reaction chamber to a first reagent, than after a certain time additionally connect the reaction chamber to a second reagent, then after a further time cut off the first and second reagents and connect the reaction chamber to a third reagent, and so on. In practice the layout may include interrupted connection conduits between chambers that a user can easily join up again to form an uninterrupted connection conduit. For cutting off conduits a hydrophobic needle can be used, and for joining up interrupted conduits a hydrophilic needle may be appropriate. The ability to quickly change the configuration of a microfluidic circuit permits a high degree of user control over an experiment with few hardware requirements.

The examples described are based on aqueous solutions for the microfluidic circuit, as the described examples relate to biochemical experiments and biological systems are generally water-based. Fluids other than water are equally suitable for forming microfluidic circuits as described herein. For example, an oil-based circuit may be chosen for forming liquid crystals for liquid crystal displays. In another example other solvents and reagents are used for forming quantum dots.

Many of the examples herein describe an FC40 overlay to minimise evaporation of aqueous microfluidic arrangements. FC40 is immiscible with water and is particularly favourable because it has better biocompatibility than many conventionally used oils. FC40 is also more easy to handle than oils, and has a closer refractive index match to water than many oils. FC40 is not generally suitable for use in conventional systems because it has a higher density than water, and water can float on top of FC40. For example in conventional microwell arrays FC40 is not used because it sinks to the bottom of the well due to the large aqueous volume in the well and so fails to cover the aqueous phase. The present microfluidic arrangements are surface tension based so the high density overlay can stably cover the aqueous phase without phase inversion. The higher density of the overlay is even advantageous as it leads to a pronounced hydrostatic pressure difference under tilting as described above. Silicone oil such as AR20 (polyphenylmethylsiloxane) from Sigma-Aldrich with viscosity ~20 mPa·s at 25° C.—and a density approximately the same as water can be used instead of FC40.

Now an application to study interfacial tension changes is described with reference to FIG. 49. FIG. 49 (top) shows two aqueous drops in FC40. FIG. 49 (bottom) shows the same two aqueous drops in FC40 after exposure to surfactant for a certain period of time. As surfactant adsorbs to the surface of the drop the drop shape changes from spherical to bell-shaped. Pinning causes the drop footprint to remain unchanged. The resultant complicated drop shape is determined by the hydrostatic pressure and the interfacial tension; the inflection point in the bell curve can be analysed to provide an indication of the interfacial tension. Conventionally interfacial tension change with addition of surfactants is studied by observing the changing shape of drops suspended from a tube. The method as described here permits dynamic study of interfacial tension, and requires only a small amount of reagent.

At the drop surface the hydrostatic pressure across the interface and the Laplace pressure across the interface balance one another. At the inflection point along the drop surface curve there is curvature in one plane only (by contrast, elsewhere along the drop surface there are generally two radii of curvature, making evaluation of the Laplace pressure more complex). Given only a single radius of curvature at the inflection point the Laplace pressure across the interface may be determined using the simplified relationship:

Laplace pressure across interface=interfacial tension/ radius of curvature.

The radius of curvature is easily determinable by measuring the diameter of the drop at the horizontal plane of the inflection point. Given the density difference between the two fluids the hydrostatic pressure across the interface at the inflection point may be determined by measurement of the vertical distance between the top of the drop and the inflection point. Hence the interfacial tension, (both static and dynamic) can be easily determined using the relationship:

interfacial tension=radius of curvature*hydrostatic pressure across interface.

Drop size may be varied to suit/improve the accuracy of the interfacial tension measurement range.

Arrays

Now the present microfluidic arrangements applied to arrays of individual drops, as described with reference to FIG. 18, are described in more detail.

The ability to add and remove small volumes of reagents (nanolitres to microlitres) to small chambers has many applications in industry. Often, small volumes are dispensed by a micropipette into a microwell. The present microfluidic arrangements applied to microarrays provide an alternative to the use of microwells that is simple and cheap; this alternative can be easily incorporated into high-throughput applications. The present microfluidic arrangements applied to microarrays are especially useful in applications that require specified concentrations of reagents to be added to, and removed from, chambers with volumes of a few nanolitres up to a few microlitres.

The ability to detect ever-smaller amounts of materials improves year by year, and this drives the pursuit of better ways of handling ever-smaller volumes in ever-increasing numbers. The "microplate" (also known as a "microtiter" or "microwell" plate) is widely used during high-throughput liquid handling in analytical and diagnostic laboratories. Microplates have an accepted standard size (ANSI/SLAS standard) of 127.76×85.48×14.22 mm (length×width×height); those with 96, 384, and 1,536 wells/plate have working volumes/well of roughly 100-500, 15-150 and 3-10 microliters, respectively, and wells are usually spaced <1 well-diameter apart. Contents of each well are isolated from others. No exchange of matter occurs between different well, and sterile wells remain sterile even when adjacent to cultured wells. No fluid is lost through walls, and evaporation from the surface can be limited by sealing wells (e.g., with a plastic film, or overlaying an immiscible liquid like an oil).

The present microfluidic arrangements applied to microarrays allow replacement of a conventional "microplate" by a flat un-patterned (having a uniform surface chemistry) surface (made of, for example, polystyrene or glass) which can have the above-mentioned standard size (so it can be used with existing robotic liquid-handling systems). An array of drops are "printed" on to this surface, and each drop then becomes equivalent to a well in a "microplate". Fluids can now be added/removed to/from drops in this array using the robotic systems in current use, or the "printer" described in more depth below. Note that the same general considerations apply to arrays on surfaces of non-standard size, to arrays of drops with non-circular footprints (e.g., square or hexagonal), and to arrays in which drops are packed more tightly (e.g., by offsetting every second row and column). The features and considerations described above with reference to microfluidic circuits apply equally to drop microarrays as herein described.

In an example of present microfluidic arrangements applied to microarrays, aqueous drops are formed on a flat un-patterned polystyrene surface (other liquids/surfaces yielding appropriate interfacial tensions can be used). First, an aqueous drop is "printed" on the flat un-patterned surface by ejecting the water from a nozzle/"pen". An air:water (i.e., fluid:fluid) interface surrounds the drop. The drop is confined to the local region on the surface where it was deposited by interfacial tension. No solid confining wall around the surface is present; similarly, no surface functionalisation encourages a drop into a specific area. Next, the drop is overlaid with an immiscible fluid to isolate it from its surroundings and prevent evaporation; a fluid:fluid interface still surrounds the drop. The immiscible fluid might be an oil that floats on water, or a fluorocarbon like FC40 that is denser than water (if the drop is small enough, surface tension is strong enough to ensure the water remains stuck to the surface where it was deposited, despite the higher density of the overlying fluid). Finally, water can be added to, or removed from, the drop through the overlaying immiscible fluid using the same or another nozzle. Then, interfacial tension ensures the footprint and position of the drop on the plate remains largely unchanged (which facilitates subsequent robotic liquid-handling, as the robot can easily be programmed to return to the same x,y,z coordinate). These processes can be used to generate arrays of isolated drops (roughly caps of spheres in geometry) on a flat un-patterned surface.

FIG. 50 shows an array of drops. In this example an array of water drops with blue dye in a standard micro-titre plate is shown (inset shows magnification). Here, there is an array of 1,536 drops of 600 nl (volume extendable up to 1,000 nl) overlaid with FC40.

The use of such an array has several inter-related advantages that are now described in more depth.

(i) The printed array of drops retains "functionality" in the sense that fluid in each drop subsequently remains amenable to liquid handling. For example, fluid can easily be added to the drop, or removed from it, through a conventional robotically-driven pipette by inserting that pipette below the surface of the drop. As with conventional "microplates", a different pipette is used when adding/removing fluid from different drops to minimize fluid transfer—and so contamination—between drops.

However, fluid can also be added to a drop using a bespoke fluidic printer (such as the printing system described in more detail below). In this case, the nozzle can be positioned above the surface of the drop, with fluid flowing continually out of the nozzle and on to the pre-existing drop in the array. This minimizes contamination of fluid in the nozzle by fluid in the pre-existing drop. Consequently, the same nozzle can be used to add the same reagents to different drops in the array.

(ii) For high-throughput applications, it is usually advantageous to maximize the density of fluid chambers (wells/drops) per unit area, and minimize the aqueous volume within each well/drop (as reagents are often expensive). Consider a conventional 384-well plate, where a well typically has a recommended minimum working volume of ~5 microliters. Slightly more (at least 384) aqueous (spherical) drops containing only 1 microliter can be arrayed in the same area on an un-patterned surface (even allowing for a larger inter-drop "dead" space of 1-drop diameter). The differences increase in such a comparison as wells/drops become smaller. Thus, a conventional 1,536-well plate (recommended minimum working volume ~3 microliters) compares with the ~1,855 aqueous drops containing only 0.1 microliter that can be arrayed in the same area on an un-patterned surface (again assuming a larger inter-drop "dead" space of 1-drop diameter). Moreover, ~8,475 drops (volume 0.01 microliters) can be arrayed in the working area of a typical "microplate". Modern widely-used robots are able to pipette such small drops. Consequently, the present microfluidic arrangements applied to microarrays allow more lower-volume chambers to be packed into the working area of a standard "microplate"—which should bring savings in volumes used. Drops can be packed more tightly (e.g., by offsetting every second row and column).

(iii) Using small volumes in conventional "microplates" brings significant "edge" effects, and this can complicate downstream analyses. For example, ~11% of the volume of a 3-microliter aqueous drop in one well (radius 0.86 mm) in a standard 1,536-well "microplate" is in the peripheral meniscus (i.e., above the level in the middle). Then, contents of interest in the well (perhaps human cells growing on the bottom) can only be imaged using a microscope with difficulty, especially when that microscope can only "see" into the well directly from above. But many drops on a flat surface containing growing cells can be imaged easily and simultaneously from one point of view.

(iv) It is attractive to screen drugs for their effects on mammalian cells growing in arrays. Such cells are routinely grown on polystyrene. It is observed that if a tube is filled with a 2-phase system containing a drop of serum-containing medium engulfed in FC40, then flow induces the formation of vesicles and aggregates of serum proteins/lipoproteins at the lagging end of the drop. The presence of such vesicles/aggregates can complicate subsequent microscopic analysis (as the vesicles look much like cells, nuclei, or sub-cellular organelles). It is also observed that no such vesicles/aggregates are seen when a drop of medium (which might contain cells) is first deposited from a source/tube containing only a single phase using the printing system described below through air on to the surface, and then overlaid with the fluorocarbon, FC40. The addition of subsequent fluid to this preformed drop, using either single or multi-phase flow in the tube results in few, if any, vesicles (due to other non-aqueous phases) in the drops.

(v) Drops in an array can have non-circular footprints—for example square or hexagonal. The footprints of for example square drops in an array can occupy a greater fraction of the area of the substrate bearing the array. This can be advantageous if—for example—it is beneficial to maximize the number of adherent cells growing in each drop for greater sensitivity.

The application of the present microfluidic arrangements to microarrays can be used to perform high-throughput liquid handling of small volumes (the addition/removal of fluids to/from chambers) in a way that is compatible with current processes that are in wide use (e.g., for cell-based assays). A standard "microplate" with its many wells is replaced by a flat un-structured surface (which may have similar dimensions as a conventional microplate). An array of drops on the surface takes the place of the array of wells in a standard "microplate". In the present system the only solid walls are around the edge of the flat surface; these walls confine any overlaying layer of (immiscible) fluid (e.g., an oil or a fluorocarbon like FC40) that might be added subsequently to prevent evaporation and isolate individual drops in the array from another. Minimizing evaporation becomes increasingly important as drop size decreases.

An example of a method for producing the present array is now described. A single aqueous drop is formed using a tube that is filled with fluid and connected to a pump. The pump drives fluid flow through the tube, either with active pumping (e.g., a syringe pump), or with passive pumping (e.g., a gravity-driven syphon). A robot holds the tip of the tube (the "nozzle") and moves it to a predetermined position just above the (hydrophilic) surface. Starting the pump ejects fluid so a drop grows at the stationary nozzle until it eventually touches the surface; then, fluid rearranges rapidly and chaotically to create an unbroken bridge of (still-flowing) water that stretches continuously from the tube through the nozzle to the surface. This fluid bridge and its footprint on the surface are shaped by interfacial tension (between water and both the solid surface and the nozzle, and between water and the surrounding fluid—which in the presently described example is air but in others might be an immiscible fluid like oil or FC40), nozzle dimensions, and flow rate. As flow continues, the nozzle can be moved in the x and/or y directions to alter the footprint of the drop on the surface to any desired shape (e.g., to give a footprint shaped like a square, hexagon, or a star). As flow continues (or not), the nozzle can be raised to break the bridge and leave a drop on the surface. The shape of this now-printed drop is determined by the various interfacial tensions, flow rate, the shape of the departing nozzle, and the speed of departure of that nozzle. This process can be repeated to create an array of drops as the pump continues to eject fluid even as it traverses from one location above the surface to another (which allows rapid printing). Of course, the pump can also stop the flow during such traverses.

Once made, an array of drops can be overlaid with an oil that is lighter than water, similar to the oil overlay conventionally used in microwell arrays. Perhaps surprisingly, a fluorocarbon like FC40 that is denser than water can also be used (as surface tension is sufficient to maintain aqueous drops of less than a few microliters on the surface despite the difference in density).

Water can be added to, and removed from, drops in such arrays using the conventional approach of dipping robotically-driven pipettes into drops in the array. To prevent cross-contamination, a new pipette is typically used with each drop. The printer system described above with the robotically moved nozzle can also add (and remove) water to a pre-existing drop or circuit (which may be overlaid with oil or fluorocarbon) in a different way. When adding fluid, the nozzle is brought close to the surface of the pre-existing drop (preferably without touching it), and the pump started (if it is not already running). Then, a drop grows at the nozzle to eventually coalesce with a pre-existing drop on the surface (much as before). This differs from the conventional approach where a pipette tip is inserted below the surface of the fluid in the well in a microtiter plate, before fluid is pumped into that drop. In the case of a drop that has a circular footprint, mixing is probably more efficient as two effects contribute—the continuous flow provides an equivalent pumping-induced mixing which is augmented by the chaotic flows induced by the coalescence of the two drops. In the case of a drop with a square footprint flows are even more chaotic than in a drop with a circular footprint. Here, continuous flow also minimizes carry-over of fluid from one drop in the array to the next, and so cross-contamination between drops containing different reagents can be minimized. As before, interfacial tensions, flow rate, vertical distance between nozzle and surface, nozzle dimensions, and rates of vertical movement of the nozzle, are all chosen to ensure the water bridge is made/broken appropriately to ensure the desired transfer of water from the nozzle into the drop on the surface. To remove fluid from a pre-existing drop in the array, conventional methods can be used (e.g., with the pump stopped, the nozzle can be inserted like a conventional pipette tip into the drop, and then the pump started in reverse, or a standard pipette/robot can be used if drops are of sufficient size).

As described above, an array can be made as water flows continuously from a nozzle. In other words, flow continues as the printer moves from place to place over the surface to initially create an array of drops. Once an array has been made, water can also flow continuously as more water is added to selected drops in the array. This enables fast production of arrays, and/or fast liquid handling subsequently. As described above, the same nozzle can be used to make arrays and/or add water to selected drops in an area with little cross-contamination. This eliminates the need to use a new pipette tip for each drop (so reducing cost).

We now consider the effect on drop shape due to an overlay of FC40. A small amount of water can be added to (or removed from) a water drop on a polystyrene surface without altering the footprint on the polystyrene; the contact line defining the limit of the footprint is "pinned", and the contact angle increases (or diminishes) up to the limit of the advancing maximal contact angle (or receding or minimal contact angle). However, the surface area of the footprint increases (or diminishes) if water is added (or removed) that changes the contact angle beyond these limits. When overlaid with FC40 the maximal contact angle increases, and "pinning" ensures that more water can be added (or removed) without changing the area of the footprint. This is especially favourable for high-density packing of drops in arrays, while avoiding merging of adjacent drops.

With larger water drops, the FC40 overlay has another effect that allows more water to be added to a pre-existing water drop on a polystyrene surface. With larger drops, gravity becomes more important; it works through differences in buoyant density between (denser) FC40 and water, coupled to "pinning". Addition of more water to a "pinned" water drop under FC40 initially increases the vertical height of the drop without increasing the area of the footprint as the water tends to rise through the FC40 to float on its surface.

As described above, drops in an array can have non-circular footprints for increased pinning, better mixing, and greater substrate area coverage.

The footprints of drops can be selected to fulfil a particular purpose. In one example, two water drops of equal volumes are printed on a polystyrene dish in air; the first drop has a circular footprint and the other has a square-shaped footprint. The drop with the circular footprint has a highest curvature (and so Laplace pressure), and this pressure difference can be exploited in various ways (e.g., to transfer fluid from one to the other after connecting them through a fluidic conduit, or to allow evaporation from the surface at different rates). In another example three drops of equal volumes (as before printed in air on polystyrene) all have circular footprints, but with different diameters. One of the drops is hemispherical; another has a relatively large footprint diameter and is relatively flat; and the third has a relatively small footprint diameter and is relatively high; the hemispherical drop has the highest curvature (and Laplace pressure). As in the previous example this pressure difference can be exploited in various ways (e.g., to transfer fluid from one to the other after connecting them through a fluidic conduit, or to allow evaporation from the surface at different rates).

As described above with respect to microfluidic circuits, it is beneficial if the initial drop array is drawn or printed with relatively flat drops (with a small contact angle, for example of 1° to 10°, and an initial drop volume that depends on the drop diameter) such that the drops have a significant capacity for receiving additional fluid (due to pinning such that the footprint of the drop remains unchanged). This allows definition of a skeleton drop array, and subsequent addition of reagents and fluids at the desired locations.

FIGS. 51 and 52 illustrate an example where fluid is added to and removed from a drop. In FIG. 51(i) a water drop is held by surface tension at a dispensing tip. In FIG. 51(ii) a drop is formed on the substrate, with: advancing contact angle in air. In FIG. 51(iii) adding more water increases the footprint. In FIG. 51(iv) removing water leaves the footprint unchanged (the edge is "pinned"), but the contact angle is <. Now, water can be added to this "flattened" drop without altering the footprint (as the contact angle increases up to). In FIG. 51(v) overlaying structure of FIG. 51(iii) with FC40 allows more water to be added without altering the footprint as the advancing contact angle in FC40 is >.

In FIG. 52(i) a "printing" a "flat" drop that has been printed on a substrate is seen, similar to the drop in FIG. 51(iv) but with an additional FC40 overlay. In FIG. 52(ii) water is added to the drop, resulting in the drop shown in FIG. 52(iii) with a greater volume (in an example 14-fold increased) and without any change to the drop footprint.

As described above, an array of drops can be dehydrated (for ease of handling and shipping, as described above) and rehydrated (as described in detail above) for use. In an example a surface is prepatterned with drops, such that individual drops contain different reagents (for example, the different siRNAs used in a siRNA screen). The water is evaporated from the drops, the plates are packaged and shipped to a user, who can then rehydrate the drops and add samples to start the assay. Alternatively, an array can be frozen, shipped, and then thawed.

Now an example of an array for cell cultures is discussed in more detail. Cell cultures are conventionally grown on microarray plates to give insights into biological processes. Imaging the cells in such wells can be problematic as wells on microarray plates generally have curved walls. With a flat, unpatterned surface carrying drops imaging can be improved. Also, as described above, greater packing and density and surface coverage can be achieved with drops deposited on a flat, unpatterned surface. A typical microwell requires a minimum sample volume of ~30 μl, whereas in a drop with the same footprint the volume can be between 300 nl and 3 μl. The smaller volume makes the drops cheaper to fill and less wasteful of scarce materials such as drug libraries. Due to the pinning behaviour a large amount of fluid can be added to a drop without changing the footprint. For example for definition of a drop 200 nl of fluid are deposited on the surface (in a relatively flat, thin drop); subsequently addition of further up to 2000 nl is possible. In conventional microarrays such a 10-fold increase in volume is typically not possible without increasing the footprint of the well. For storage and transport of microarrays it is often favourable to use arrays prepatterned on a surface, rehydrate them, and then add cells for use; in this respect the ability to add a relatively large volume after patterning is particularly favourable. Because the drop footprint does not increase in area after adding more fluid and cells, and the result is denser, more uniform cell distribution than if the footprint increased and a relatively small amount of the cells found their way to the periphery. Dense, uniform cell distribution is favourable in respect of imaging. Finally FC40 displays superior attributes to oils as discussed above, especially in respect of biocompatibility, but is unsuitable for use in wells: due to the relatively large volume of water buoyancy is great enough to float the water on top of FC40 in wells.

Further possibilities for an array of drops as described above include:

Sequential deposition from two nozzles first forming an aqueous drop and then overlaying an immiscible fluid.

In the method described above, an overlay is added after depositing an aqueous drop; in an alternative method, an aqueous drop is deposited under a film of overlay. An aqueous fluid is ejected from the nozzle into and through a pre-existing layer of oil or fluorocarbon on to the surface; here the aqueous drop never contacts the air, as it is always surrounded by isolating oil or fluorocarbon. In this alternative there may be some contamination of drops with overlay fluid.

In the method described above, drops are formed as fluid emerges from the nozzle; in an alternative method, the tube is pre-filled with water drops engulfed in oil (so aqueous drops already exist when ejected from the nozzle). An aqueous drop is ejected from a tube pre-filled with aqueous droplets surrounded by oil or fluorocarbon onto the surface, or pre-filled with water-drops within oil-drops that are—in turn—surrounded by a fluorocarbon.

In the method described above the overlay is selected such that it just covers drops (to the maximum drop volume/height), or covers drops by a margin. In a variant, the overlay may only partially cover the drops. For example, an overlying second fluid might be 0.5 mm deep, around a drop of first fluid that is 1 mm high (some of the second fluid may still form a thin film over the drop of first fluid to prevent evaporation of the first fluid). A third fluid may partially cover the drops. A third fluid may cover the second fluid.

No overlay is added and the drops remain in air.

Drops are deposited on a patterned surface.

Drops may be prepared using an air bubble within a tube as a driving piston.

A tube may be filled from drops formed on a flat surface.

The examples described above relate to aqueous drops on a hydrophilic surface like polystyrene. In an alternative the same methods and considerations are used to form an array of oil drops on a hydrophobic surface. Further oil can be added to and removed from such oil drops analogously to the aqueous drops as described above. By suitable choice of surface and fluids the appropriate interfacial tensions can be provided to enable a microarray of drops as described herein with a wide spectrum of fluids and substrates.

Printing

Now a printer system for producing microfluidic arrangements as described above is described in more detail.

The printer system prints functional arrays of liquid drops and/or microfluidic circuits (networks of chambers and/or drops and/or conduits) on a surface, for example in order to construct 2D and 3D circuits as described above. In an example the device includes 3 components: a robotically-driven nozzle/pen/stylus, a syringe pump (connected to the nozzle through a PTFE tube), and associated computer/software that drives the robot and syringe pump. The printer system can also add or remove specific amounts of reagents to or from chambers with volumes of a few nanolitres to microlitres. The ability to add and remove small volumes of reagents (nanolitres to microlitres) to small chambers has many applications in industry. Most usually, small volumes are dispensed by a pipette into a test tube or a well in a microtiter plate. The printer system is simple, cheap, and can be incorporated into high-throughput processes.

Single drops, arrays of drops, or more complicated fluidic circuits are "printed" on a surface, typically (but not necessarily) a flat horizontal and un-patterned surface; they are held in position by surface tension, and confined and/or separated by fluid interfaces. Any imaginable microfluidic network can be created by drawing a "pen" filled with water across a (flat, horizontal) hydrophilic surface to leave a trail of fluid. Once made, the deposited fluid can be preserved and isolated by covering it with an immiscible fluid like a fluorocarbon (which, among other things, prevents evaporation). Subsequently, aqueous fluid or solutes can be transferred through the network passively (e.g., by diffusion, or using differences in Laplace pressure in drops that are sited judiciously throughout the network) or actively (e.g., using a pump). Knowledge of interfacial tension is used when creating networks, and manipulating fluid flow through them. The resulting arrays can be used much like conventional microwells (e.g., in cell-based assays, in drug screening, or in almost any assay that requires fluids), and the circuits much like conventional microfluidic chips (e.g., for adding and subtracting reagents).

The printer system has three essential components: (i) a mechanism of driving flow to a "pen" or "nozzle" (e.g. a syringe pump or a gravity-driven siphon), (ii) a robot to hold the pen/nozzle and move it relative to the substrate (e.g., with a precision of ~10 microns in x, y, and z; for example a robot may move a pen in a z-direction and move a stage for carrying the substrate in x- and y-directions), and (iii) software/computer that allows a user to draw a desired circuit on a computing device, and convert the coordinates underlying that circuit into code that drives the pump and robot and so creates an array of drops or a circuit on the surface.

A number of examples of the present printing process are described above. A further example of a printing operation is now described for printing (in air) a single water drop on a polystyrene surface—using a tube that is filled with water and connected to a pump that can drive fluid flow. A robot holds the tip of the tube (the "nozzle") and carries it to a predetermined position in 3D space just above the (hydrophilic) surface. The pump ejects fluid so a drop grows at the stationary nozzle until it touches the surface; then, fluid rearranges to create an unbroken bridge of (perhaps still-flowing) water that stretches continuously from the tube through the nozzle to the surface. The shape and size of the fluid bridge and its footprint on the surface are determined by nozzle dimensions, flow rate and interfacial tension—between water and both the solid surface and the nozzle, and between water and the surrounding fluid. As flow continues, the nozzle is eventually raised to break the bridge and leave a drop on the surface. The shape of this now-printed drop is determined by the various interfacial tensions, flow rate, the shape of the departing nozzle, and the path that nozzle follows. This process can be repeated to create an array of drops as the pump continues to eject fluid even as it traverses from one location above the surface to another (which allows rapid printing). In a variant the pump stops the flow during such traverses (though this can cause delay to the deposition of fluid).

For a more complicated fluidic circuit once the nozzle has been lowered to its position and the first drop deposited on the surface—and as flow continues—a conduit can be added to that drop simply by moving the nozzle laterally (in the x and/or y dimensions without change in z axis) to create a fluidically-attached conduit with any desired 2D shape. By extension, additional drops and connecting conduits can be added to such a circuit by moving the nozzle laterally without change in z axis and without stopping the pump (for quick printing). In a variant the pump stops the flow during such traverses. Addition of further fluid to that circuit ceases when the nozzle is raised to break the fluid bridge, and/or the pump stops. The nozzle may be returned to a previously formed drop or circuit to add additional fluid. The nozzle may be returned to a previously formed circuit feature and add further connected circuit features. Flow rates and vertical distances between nozzle and surface, nozzle dimensions, interfacial tensions, and the rates of lateral and vertical movement, are all chosen to ensure the fluid bridge is made/broken appropriately to give the desired pattern and volume of fluid on the surface.

In the examples described above, the fluid is deposited on the surface while the surrounding fluid is air. In other examples the fluid is deposited on the surface while surrounded by a different immiscible fluid such as an oil or FC40. In one such example aqueous fluids are injected through a fluorocarbon that covers the surface at the outset and are thus deposited on the surface.

In the examples described above, the fluid is deposited on the surface in the desired pattern. In other examples the fluid is repositioned on the surface to form the desired pattern. This process in analogous to the technique known as sgraffito. FIGS. 53-56 illustrate the printing by repositioning in more detail.

FIG. 53 shows a schematic of printing by repositioning. A substrate 480 such as a microtiter plate has on its surface a thin aqueous film 482 that is overlaid with an immiscible layer 484 of a fluorocarbon such as FC40. A hydrophobic and fluorophilic tip 486 such as a PTFE tube is inserted through the aqueous film 482 and the fluorocarbon layer 484 and drawn along the surface of the substrate 480. The hydrophobic nature of the tip 486 assists in displacing the aqueous film 482, and due to the fluorophilic nature of the tip fluorocarbon 484 is assisted in refilling the space previously occupied by the aqueous solution. In this manner a pattern can be formed, in the illustrated example a line 488. By drawing a number of straight lines for example, 'islands' of the aqueous fluid can be produced. Other more complex patterns of the aqueous fluid can be produced similarly.

Figure 54:
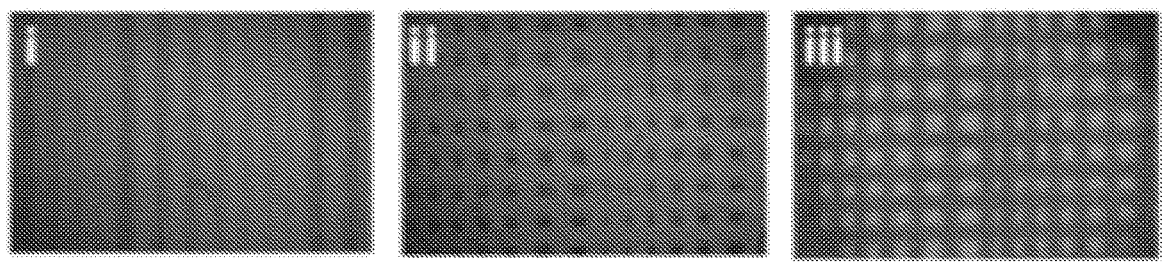

FIGS. 54(i) to (iii) show microfluidic arrangements produced by repositioning fluid. FIG. 54(i) shows a number of parallel microfluidic conduits. FIGS. 54(ii) and (iii) show an array of square-shaped chambers. Instead of printing an array of chambers in the desired places on a surface, the illustrated patterns are drawn by displacing aqueous solution from locations where it is not desired. The printing tip is moved across the surface where aqueous solution is to be displaced, so between the desired conduits and between the desired chambers. In this example, the surface of a plastic substrate is wetted with an aqueous fluid. Excess aqueous fluid is removed to avoid formation of a film of more than minimal thickness, but enough aqueous fluid is left remaining to wet the surface. 1 ml FC40 is overlaid on the aqueous film to form the immiscible layer. A 32G PTFE tube (with 0.23 mm inner diameter) is lowered through the FC40 and the aqueous fluid until it contacts the surface, and is pulled across the plate in a straight line (at 15 mm/s); as the PTFE tip passes through the aqueous film, water is displaced from the surface at the front and replaced by FC40 at the back thereby repositioning the aqueous film into a defined shape.

In FIG. 54(i) aqueous solution is displaced in line shapes. At the end of a line, the PTFE tip is returned to the starting position and offset by a distance to form a succession of parallel lines; each new line is offset from the last by 374 to 600 microns. The bright-field image shows some of the resulting aqueous lines (blue) which have different thicknesses separated by lines of FC40 (with a constant thickness determined by the width of the PTFE tip in contact with the surface normal to the direction that the tip is moving in). In FIG. 54(ii) aqueous solution is displaced in grid shapes. Starting from the pattern seen in FIG. 54(i), a number of further lines are then drawn at right-angles to the first set of lines to create a grid (using a uniform offset). This produces an array of square or rectangular aqueous chambers with sides of ~100-400 microns and volumes down to a few nanolitres. The chambers can be made in a standard plate in this way. Because the aqueous solution that forms a chamber is in a thin film and relatively flat, a chamber can be filled with many times its initial volume without altering the footprint, provided the total volume of the chamber is such that the contact angle of the chamber interface is less than the advancing contact angle for those particular materials. FIG. 54(iii) shows a fluorescent image of the same array as shown in 54(ii).

FIG. 55 shows a number of parallel microfluidic conduits with widths of 20-110 microns produced by repositioning fluid as described above. To produce the conduits a first line is drawn with a tip formed of a 32G PTFE tube touching the surface at 45 degrees; this produces a line filled with FC40 that is about 130 microns wide. Then the tip is moved away from the surface and made to traverse back to the same horizontal starting position of the first line, but offset in the negative vertical direction by a distance of 240 microns. The tip is then brought back onto the surface and a parallel line (conduit of FC40 on the surface) is drawn. These two lines produce an aqueous conduit with a width of 110 microns that is bounded on each side by FC40. This process is repeated with the vertical offsets of 190, 180, 170, 160, 150 microns yielding aqueous channel widths of 60, 50, 40, 30, 20 microns respectively.

Figure 56A:
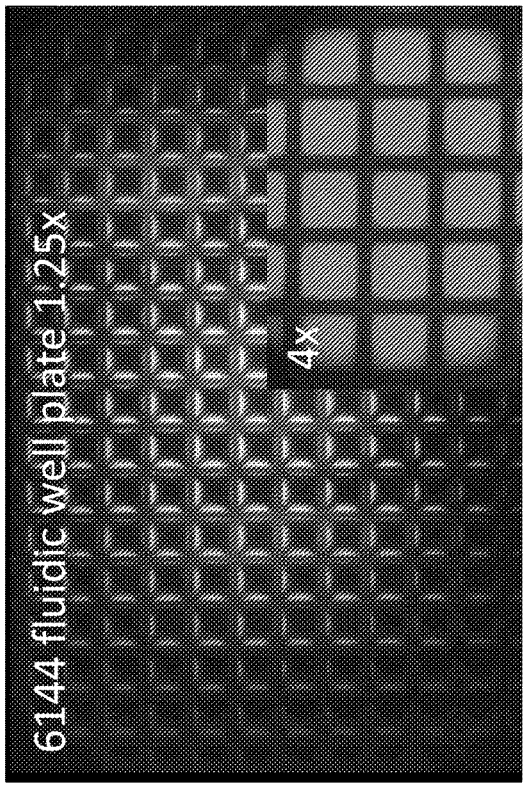
Figure 56B:
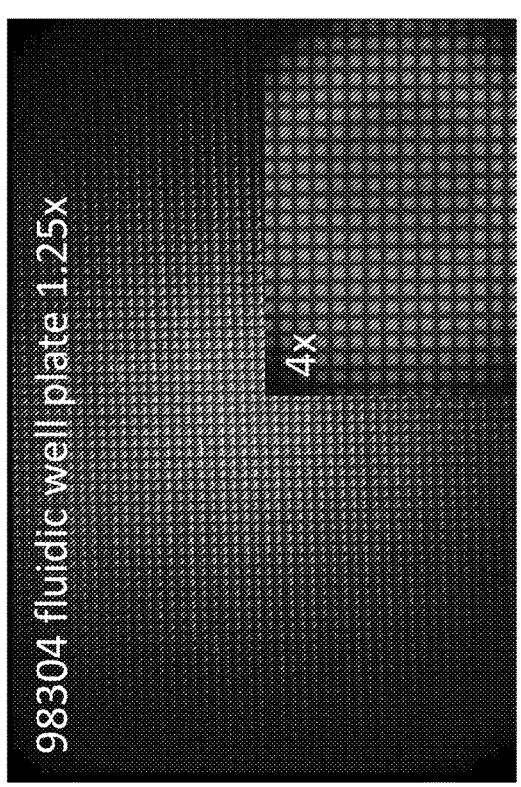
Figure 56C:
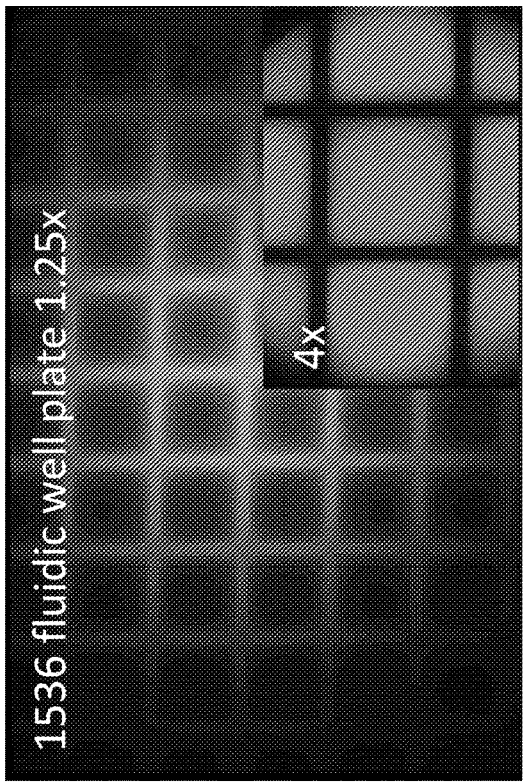
Figure 56D:
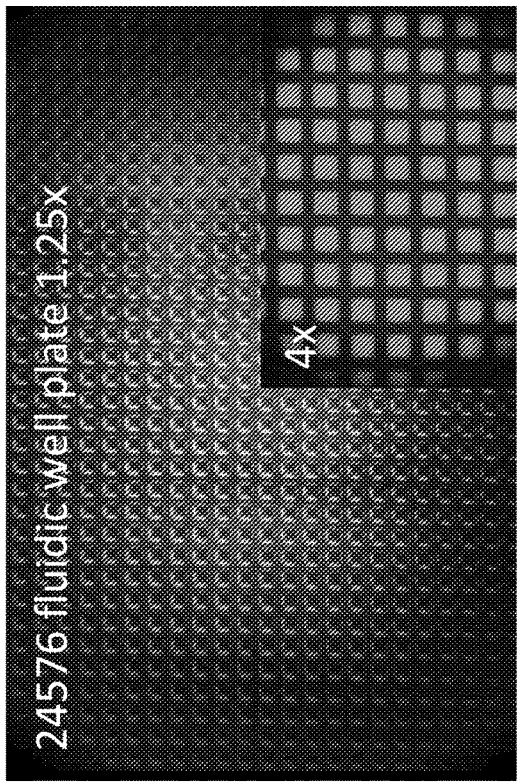

FIGS. 56A to 56D show arrays of square-shaped chambers produced by repositioning fluid. A number of evenly spaced aqueous conduits are produced similar to those described with reference to FIG. 55. Here lines are drawn at equal offsets, unlike in FIG. 55. A further set of evenly spaced lines is drawn at right angles to the first set to create a grid of aqueous chambers in which each square aqueous chamber is covered and separated from its neighbours by FC40. The chamber spacings and number of chambers can be equivalent to those in a standard micro-titre plate containing 1,536 wells (FIG. 56A); higher-density arrays with 6144 wells (FIG. 56B), 24576 wells (FIG. 56C), or 98304 wells (FIG. 56D) within the overall dimensions of a standard micro-titre place can also be made. Each chamber is able to hold approximately 3000 to 4500 nl (FIG. 56A), approximately 300 to 450 nl (FIG. 56B), approximately 30 to 45 nl (FIG. 56C), or approximately 3 to 4.5 nl (FIG. 56D).

For printing by repositioning fluid the printer system described above does not require a mechanism of driving flow to a "pen" or "nozzle" (e.g. a syringe pump or a gravity-driven siphon), but only requires a robot to hold the pen/nozzle and move it from place to place (e.g., with a precision of ~10 microns in x, y, and z); and software/computer that allows a user to draw a desired circuit on a computing device, and convert the coordinates underlying that circuit into code that drives the robot and so creates an array of drops or a circuit on the surface.

In some examples it may be convenient to prepare a first pattern by displacement, then add one or more different fluids to different portions of the pattern, and subsequently reposition the fluid to form a second pattern. For example, a large area is separated into a number of strips (e.g. similar to the pattern shown in FIG. 54i). Then, to each of the strips a particular fluid composition or amount is added. Subsequently further patterning by displacement produces a second pattern (e.g. similar to the array of rectangular chambers shown in FIG. 54ii). Examples where this might be useful include a procedure for preparing an array of chambers for cell culture. An initial fluid film that is relatively thin is favourable as it can be displaced with ease. But in order to provide a sufficiently large volume of culture medium it is favourable to provide chambers with more than the minimal volume. Addition of culture medium to the strips before separation into chambers reduces the number of operations as only one addition per strip is sufficient, compared to one addition to each individual chamber. In another example a variation of chamber compositions is desired; each strip can be supplemented with a different composition and then subdivided into chambers, rather than adding different supplements to the individual chambers.

To provide chambers with uniform volumes a procedure of patterning that separates a feature area into two portions that have the same footprint perimeter length is favourable. This can help avoid non-uniformity due to edge effects. For symmetrical features this is achieved by halving a feature area along a symmetry line. In an illustrative example a strip of fluid is formed that is 32 mm long. A first cut is made at 16 mm, thereby halving the area of the strip and forming two identical compartments. Second cuts are made at 8 mm and 24 mm, thereby further halving the compartments, and so on. By this procedure at each step optimally similar compartments are formed, and the result is optimally uniform chambers.

The printed output from a printing system as described above (regardless of whether pattern formation is by fluid deposition or by fluid repositioning) can be any of a wide range of patterns including an array of drops or a conventionally known microfluidic circuit design. Circuits can perform different functions (e.g., sample dilution, splitting, merging/mixing). Circuits with different functions (e.g., sample dilution, splitting, merging/mixing) can be added together in different ways to generate complete laboratories on a surface.

Some notable features of and options for the printing system and method are:

(i) The use of fluid interfaces as boundaries for the features has the advantage that boundaries are formed accurately and reproducibly as they are determined by interfacial forces. Unlike in conventional microfluidics and microplates with solid wall structures, the boundary of the fluidic feature does not depend upon the precision with which a recess or channel can be formed within a solid object.

(ii) Because fluid is confined by fluid boundaries (not solid walls) the fluids anywhere in a drop or circuit remain amenable to liquid handling (e.g., fluid can subsequently easily be added or removed to any point in the drop or circuit).

(iii) As drops are covered by second fluid the potential for contamination is minimised.

(iv) In the case of fluidic circuits, as fluid boundaries with different shapes and positions can be used to create different local pressures, liquids can easily be driven through the system without using additional pumps (though use of external pumps is possible). Fluids can be transferred through circuits in a pre-determined way, and flow can be started and stopped when needed. In the case of an array of printed drops, drops with different geometries can be printed, and these drops can have different behaviours.

(v) Existing ink-jet printers can create arrays of drops; a drop (formed using the Plateau-Rayleigh instability or a piezo-electric crystal) is shot from an orifice and flies through the air to land on—and adhere to—the surface. In such a case, the drop is never in contact with both dispensing device and the surface at the same time; discrete drops are created at the nozzle, so fluid flow is discontinuous and circuits are drawn in a Pointillist or digital way. With the printer described above, arrays (and/or circuits) are drawn cursively using an analogue approach; flow out of the nozzle can be continuous, and fluid can form an unbroken bridge between nozzle and surface.

(vi) The fluid being printed remains a fluid subsequent to deposition and does not undergo a phase transition or solidify. A conventional 3D printer can form a continuum of plastic (transiently in liquid form) between the nozzle and the surface, but this liquid is solid both before and after deposition.

(vii) Printer function depends on the appropriate choice of nozzle/tip properties, dimensions, configuration and arrangement. For printing by deposition for example, the nozzle-surface distance, and so the appropriate initial nozzle position in the z axis above the surface is relevant. The relative position of nozzle and surface can be zeroed with the following procedure. A robot "grasps" a nozzle part (such as a PTFE tube or a blunt needle tip) loosely and lowers that nozzle part slowly onto the surface. Once the nozzle contacts the surface, the nozzle part slides through the robot's grasp, and the robot is stopped. The sliding of the nozzle part can easily be detected by eye, for example. The grip of the robot on the nozzle part is fastened. Then the robot can raise the nozzle by exactly the desired distance above the surface. The nozzle part can be attached to the robot such that only a very small force is sufficient to move the nozzle part relative to the robot. The nozzle part can be attached to the robot such that negligible motion hysteresis occurs during the interaction between surface, nozzle part and robot. For example, the nozzle part can be selected to be relatively stiff. This can permit accuracy in the zeroing. In a variant the robot securely grasps a sleeve and a needle is mounted in the sleeve such that it can move if a force is applied, but in the absence of a force the needle remains secured within the sleeve. This can permit avoidance of the step of fastening the robot's grip, and also can enable a favourable combination of stiffness, ease of sliding and gripability. A particularly favourable nozzle part comprises a silicone rubber tube that can be gripped by a robot; a PFTE tube within the silicone rubber tube for ease of sliding; and a steel needle within the PTFE tube for stiffness, with the steel needle protruding from the PTFE tube and the silicone tube. In a variant the nozzle is moved by a set distance toward the surface until it can be presumed (with actual observation being optional) that the nozzle has contacted the surface (without it being necessary to determine how far the nozzle part has slid relative to the robot). This can obviate the need for detection while still enabling accurate zeroing of the nozzle relative to the surface.

In another method of zeroing, the substrate surface is covered with a layer of fluid of known thickness, and the nozzle is lowered; once the tip of the nozzle touches the layer of fluid it forms a solid-liquid bridge between the two and this can be easily detected (e.g., by eye). The nozzle is stopped and the distance of the nozzle to the surface can be calibrated to the known thickness of the layer of fluid. This allows simple zeroing of the nozzle height relative to the surface and subsequent accurate positioning of the nozzle at a desired distance above the surface. A further alternative is to extrude a drop from the tip of the nozzle, and then lower the nozzle and still-attached drop down towards the surface of the liquid; now a liquid-liquid bridge forms (which is again easily detected by eye), and the distance from the surface can be determined as before. Of course any other method, for example involving a proximity sensor, electrical contact/sensor could also be used for calibrating the height of a nozzle above a surface.

(viii) When some fluids (e.g., serum-rich growth medium) are delivered from a nozzle (e.g., a stainless-steel needle) to a surface (e.g., a polystyrene culture dish), some fluid can run up the outside of the needle instead of on to or towards the surface—resulting in the deposition of incorrect amounts of fluid on to that surface. This can be minimized using a PTFE tube as a (hydrophobic) sleeve around the needle to leave only a small portion of the stainless-steel tip exposed to the medium. Alternatively, the PTFE sleeve can be brought down so it just protrudes over the tip of the needle. This printing arrangement allows conduits with two different widths to be drawn depending on whether the needle or the PTFE sleeve is at the tip when printing the network.

(ix) The printer described above can add (and/or remove) fluid to a pre-existing drop or circuit (which might be overlaid with oil or fluorocarbon). When adding fluid, the nozzle is again brought close to the surface of the pre-existing drop (or by extension, a circuit) preferably without touching it. The pump might now start, or it could have been running continuously. Then, a drop grows at the nozzle to eventually coalesce with a pre-existing drop on the surface (much as before). This differs from the conventional approach where a pipette tip is usually inserted below the surface of a pre-existing drop (or fluid in a test-tube or well in a microtiter plate), before fluid is pumped into that drop. In our case, mixing is more efficient as two effects contribute—the continuous flow provides an equivalent pumping-induced mixing which is augmented by the chaotic flows induced by the coalescence of the two drops. Here, continuous flow also minimizes carry-over of fluid from one drop in an array to the next, and so cross-contamination between drops containing different reagents. As before, interfacial tensions, flow rate, vertical distance between nozzle and surface, nozzle dimensions, and rates of lateral and vertical movement of the nozzle, are all chosen to ensure the fluid bridge is made/broken appropriately to give the desired pattern of fluid on the surface. To remove fluid from a pre-existing drop or circuit, conventional methods may be used (e.g., with the pump stopped, the nozzle is inserted like a conventional pipette tip into the drop or circuit, and then the pump started in reverse).

(x) The printer described above can permit fluid flow without using an active pump; here, gravity combined with interfacial tension is used to initiate and control fluid flow through the nozzle. This kind of approach is attractive for high-throughput applications where it may become prohibitively expense to use many syringe pumps. It may also be faster as a large volume of fluid in a reservoir can feed the printing tips rather than a small volume that can be contained within a syringe. The nozzle, a blunt needle for example, is connected by a filled tube to a reservoir of fluid filled to the same level; consequently no fluid flows through the system. If the nozzle tip is lowered slightly, fluid flows out of the nozzle to form a drop that grows until it forms a hemisphere (with a diameter defined by the internal diameter of the nozzle). The Laplace pressure across the drop interface on the tip of the nozzle stops flow if the hydrostatic head of pressure is insufficient. If the liquid at the nozzle tip is then brought into contact with the surface, a liquid bridge between nozzle and surface forms. This reduces the curvature of the liquid at the nozzle tip, and so the Laplace pressure. Consequently, fluid flows from the tip, and any circuit may be drawn with the flow rate now being proportional to the hydrostatic head of pressure. When the tip is retracted from the surface, flow again ceases due to the increased Laplace pressure at the nozzle tip.

(xi) Thus far the examples describe depositing drops/circuits on an un-patterned surface. In a variant, drops/circuits are deposited on a patterned surface (e.g., one with microwells, or with local patches which might differ in hydrophobicity or hydrophilicity). Then, the nozzle might be replaced by a tip that cuts a pattern into the surface, or delivers a reagent that changes the hydrophobicity or hydrophilicity of the surface. The resulting pattern might then become a "pinning" site for drops and/or conduits, so allowing the contact angle to be increased (or decreased) so the said drops/conduits can hold more (or less) fluid than when printed directly on to a flat un-patterned surface.

(xii) A number of the examples above describe depositing water drops from a nozzle that is close to the surface. In some examples it may be desired to add more water to an existing drop or circuit containing water and which is overlaid with FC40. This can be achieved by allowing a water drop (which might itself be surrounded by FC40 to make it heavier) to fall from the nozzle when that nozzle is placed high enough above the target drop or circuit so that the water drop can fall with sufficient speed to travel through the overlying FC40 and fuse with the target drop or circuit. Perhaps remarkably, fusion of the two water drops can occur without the creation of additional smaller droplets, and without alteration in position of the centre-point of the footprint of the recipient water drop. Thus gravitational energy is employed to cause fusion with a target drop though air and an additional fluid film.

(xiii) Provisions may be included to minimise build-up of static electricity during printing. For example, an ionized air stream may be provided (similar to an ionised air gun) or a deionizer may be provided at suitable locations.

(xiv) 3D structures can be created by varying the z-axis and printing a fluid that soon solidifies (including hydrogels like jelly or agarose) or which has the same density as the surrounding fluid (which might be FC40 or a silicone oil), or printing under conditions of shear thinning/thickening using fluids whose viscosity changes when under shear stress. In an example a relatively dense material such as a liquid metal (or another material) is deposited within a film of FC40 at different heights from the surface. In another example a shear thinning (thixotropic) or shear thickening (rheopectic) fluid (whose viscosity changes when put under a shear stress) is deposited at different heights from a surface. During the printing the flow shear causes the fluid to behave with low viscosity and flow freely. After deposition the flow (and shear) ceases and the fluid behaves with high viscosity.

A suitable fluid could even permit freestanding structures, or those within a suitably matched density fluid.

As will be recognised by a skilled person, the invention can be used to create a complex microfluidic arrangement of interconnected drops, and to transfer fluid and/or solutes through it in a controlled way. Advantageously, the invention may be used in applications that require the controlled transfer of fluids or solutes into (and out of) drops with volumes of a few nanolitres to microlitres.

Aspects of the disclosure may additionally be described by the following numbered clauses:

1. A microfluidic arrangement comprising an array of drops, comprising: a substrate; a first fluid; and a second fluid, which is immiscible with the first fluid; wherein the first fluid is arranged to be covered at least partially by the second fluid; and wherein the first fluid is arranged in a given array of drops on an unpatterned surface of the substrate, with each drop cross section area having a (height:width) aspect ratio of (1:2) or less.

2. A microfluidic arrangement according to Clause 1, wherein the surface of the substrate is unpatterned by chemical surface patterning, physical functionalisation and/or surface topography.

3. A microfluidic arrangement according to Clause 1 or 2, wherein the aspect ratio is (1:4) or less, preferably (1:20) or less, more preferably (1:50) or less, more preferably (1:100) or less.

4. A microfluidic arrangement according to Clause 1 or 2, wherein the aspect ratio is between (1:50) and (1:500).

5. A microfluidic arrangement according to any preceding clause, wherein the first fluid is retained in the drop by a fluid interface between the first and second fluids.

6. A microfluidic arrangement according to any preceding clause, wherein a contact angle between the drop and the surface is smaller than an advancing contact angle for the first fluid on the substrate and covered with the second fluid.

7. A microfluidic arrangement according to Clause 6, wherein the contact angle is less than 50% of the advancing contact angle, and is preferably less than 25% of the advancing contact angle, and is more preferably less than 10% of the advancing contact angle.

8. A microfluidic arrangement according to Clause 6, wherein the contact angle is between 1% and 50% of the advancing contact angle.

9. A microfluidic arrangement according to any preceding clause, wherein addition of further fluid that is miscible with the first fluid does not alter the drop footprint.

10. A microfluidic arrangement according to Clause 9, wherein the volume of a drop is increased by a factor of 100 or less, and optionally 1000 or less.

11. A microfluidic arrangement according to any preceding clause, wherein removal of fluid from a drop does not alter the drop footprint.

12. A microfluidic arrangement according to Clause 11, wherein the volume of a drop is decreased by a factor of 100 or less, and optionally 1000 or less.

13. A microfluidic arrangement according to any preceding clause, wherein the second fluid is denser than the first fluid.

14. A microfluidic arrangement according to any preceding clause, wherein the substrate is hydrophilic, the first fluid is polar and the second fluid is non-polar.

15. A microfluidic arrangement according to any preceding clause, wherein the first fluid is an aqueous fluid and the second fluid is one of: a gas; an oil; and a fluorocarbon.

16. A microfluidic arrangement according to any preceding clause, wherein the second fluid includes perfluorotri-n-butylamine and/or perfluoro-n-dibutylmethylamine.

17. A microfluidic arrangement according to any preceding clause, wherein the drops are arranged on the surface in a regularly spaced arrangement, preferably with 96, 384 or 1536 drops in the array.

18. A microfluidic arrangement according to any preceding clause, wherein the drops are arranged on the surface in a plurality of rows, optionally the rows being offset from one another.

19. A microfluidic arrangement according to any preceding clause, wherein one or more of the drops have a non-circular footprint, preferably a square-shaped footprint or a hexagonal footprint.

Aspects of the disclosure may additionally be described by the following numbered clauses:

1. A method of fabricating a microfluidic arrangement for manipulating fluids, comprising: arranging a first fluid on an unpatterned surface of a substrate in a desired shape; arranging a second fluid, which is immiscible with the first fluid, to cover the first fluid at least partially, wherein the first fluid is retained in said shape by a fluid interface between the first and second fluids; and drying the first fluid to form a residue in said shape on the substrate.

2. A method according to Clause 1, wherein the surface of the substrate is unpatterned by chemical surface patterning, physical functionalisation and/or surface topography.

3. A method according to Clause 1 or 2, wherein the microfluidic arrangement comprises an array of drops and/or a microfluidic circuit.

4. A method according to any preceding clause, wherein the first fluid is arranged to be covered by the second fluid such that the surface area of the first fluid that is in contact with the second fluid is greater than the surface area of the first fluid that is in contact with the surface.

5. A method according to any preceding clause, wherein the substrate is hydrophilic, the first fluid is polar and the second fluid is non-polar.

6. A method according to any preceding clause, wherein the first fluid is an aqueous fluid and the second fluid is one of: a gas; an oil; and a fluorocarbon.

7. A method according to any preceding clause, wherein the first fluid is a solution that includes one or more of: trehalose; cell culture media; serum; phosphate buffered saline; and a sugar.

8. A method according to Clause 7, wherein the solution is a low concentration solution of 5% by weight of solute or less, preferably 1% or less, and more preferably 0.5% or less.

9. A microfluidic arrangement fabricated by a method according to Clauses 1 to 8.

10. A microfluidic arrangement for manipulating fluids, comprising a substrate with a surface and a residue on the surface, wherein the residue is from a dried out fluid arranged in a desired shape.

11. A microfluidic arrangement according to Clause 10, wherein introduction of a first fluid to the residue rehydrates the microfluidic arrangement such that the first fluid is arranged in said shape.

12. A method of rehydrating a microfluidic arrangement according to any of Clauses 9 to 11, comprising depositing a portion of a first fluid in a region of the residue.

13. A method according to Clause 12, wherein the first fluid spontaneously flows into other regions of the residue.

14. A method according to Clause 12 or 13, wherein the first fluid is spontaneously wicked into other regions of the residue.

15. A method according to any of Clauses 12 to 14, wherein the depositing comprises exposing to a gas comprising the first liquid.

16. A method according to Clause 15, wherein the first fluid spontaneously condenses on the residue.

17. A method according to Clause 15 or 16, wherein the gas comprises the first liquid in gas form at 50-95% saturation, and preferably at 90-95% saturation.

Aspects of the disclosure may additionally be described by the following numbered clauses:

1. A method of fabricating a microfluidic arrangement for manipulating fluids, comprising: arranging a first fluid on an unpatterned surface of a substrate in a desired shape; and arranging a second fluid, which is immiscible with the first fluid, to cover the first fluid at least partially, wherein the first fluid is retained in said shape by a fluid interface between the first and second fluids.

2. A method according to Clause 1, wherein arranging the first fluid in the desired shape comprises arranging the first fluid in an arbitrary shape on the surface, and repositioning the first fluid into the desired shape.

3. A method according to Clause 2, wherein repositioning the first fluid comprises drawing an object across the surface to displace a portion of the first fluid.

4. A method according to Clause 3, wherein the object is a tip, a needle, or a tube.

5. A method according to Clause 3 or 4, wherein the first fluid is aqueous and the object is hydrophobic.

6. A method according to any of Clauses 3 to 5, wherein the second fluid is a fluorocarbon and the object is fluorophilic.

7. A method according to any of Clauses 3 to 6, wherein the object comprises polytetrafluoroethylene.

8. A method according to any of Clauses 3 to 7, wherein the drawing comprises drawing a number of approximately parallel lines to form one or more conduits of the first fluid.

9. A method according to any of Clauses 3 to 7, wherein the drawing comprises drawing a number of approximately parallel lines in a first direction, and drawing a number of approximately parallel lines in a second direction (preferably approximately orthogonal to the first direction) to form one or more (preferably rectangular or square) chamber.

10. A method according to any of Clauses 3 to 7, wherein the drawing comprises: drawing a number of approximately parallel lines in a first direction to form one or more strips of the first fluid; then adding one or more portions of fluid to the one or more strips; and then drawing a number of approximately parallel lines in a second direction to form one or more chambers.

11. A method according to any of Clauses 3 to 9, wherein the drawing comprises forming two fluid portions that both have the same footprint perimeter length.

12. A method according to Clause 11, wherein the drawing comprises halving a fluid portion along a symmetry line of that fluid portion's footprint.

13. A method according to Clause 2, wherein repositioning the first fluid comprises stamping the surface with an object to displace a portion of the first fluid.

14. A method according to Clause 13, wherein the object comprises a face that is formed in a pattern corresponding to the desired shape.

15. A method according to any of Clauses 2 to 14, wherein the contact angle between the first fluid and the object is greater than 90°.

16. A method according to any of Clauses 2 to 15, wherein the contact angle between the second fluid and the object is smaller than 80°.

17. A method according to any of Clauses 2 to 16, wherein the first fluid is aqueous and the object is hydrophobic, and/or wherein the second fluid is a fluorocarbon and the object is fluorophilic, and preferably wherein the object comprises polytetrafluoroethylene.

18. A method according to any of Clauses 2 to 17, wherein the method comprises: first arranging the first fluid in an arbitrary shape on the surface; then arranging the second fluid to cover the first fluid at least partially; and then repositioning the first fluid into the desired shape.

19. A method according to Clause 1, wherein arranging the first fluid in the desired shape comprises depositing the first fluid in the desired shape on the surface.

20. A method according to any preceding clause, wherein the microfluidic arrangement comprises an array of drops and/or a microfluidic circuit.

21. A method according to any preceding clause, wherein the first fluid is arranged in said shape such that a cross section area of a feature of the microfluidic arrangement has a (height:width) aspect ratio of (1:2) or less, and preferably the aspect ratio is (1:4) or less, more preferably (1:20) or less, and yet more preferably (1:50) or less, and yet more preferably (1:100) or less, and yet more preferably between (1:50) and (1:500).

22. A method according to any preceding clause, wherein the first fluid is arranged in said shape such that a contact angle is smaller than an advancing contact angle for the first fluid on the substrate and covered with the second fluid, and preferably the contact angle is less than 50% of the advancing contact angle, and more preferably less than 25% of the advancing contact angle, and yet more preferably less than 10% of the advancing contact angle, and yet more preferably between 1% and 50% of the advancing contact angle.

23. A method according to any preceding clause, wherein the first fluid is arranged to be covered by the second fluid such that the surface area of the first fluid that is in contact with the second fluid is greater than the surface area of the first fluid that is in contact with the surface.

24. A method according to any preceding clause, wherein the first fluid is an aqueous fluid and the second fluid is one of: a gas; an oil; and a fluorocarbon.

25. A method according to any preceding clause, wherein a footprint of said shape remains unchanged upon addition or removal of fluid to or from the first fluid in said shape.

26. A method according to any preceding clause, wherein the volume of a feature of the microfluidic arrangement is increasable and/or decreasable by a factor of 100 or less, and optionally 1000 or less, without altering the footprint of the feature.

27. A method according to any preceding clause, further comprising heating a portion of fluid and/or illuminating a portion of fluid to solidify the fluid.

28. A method according to any preceding clause, further comprising depositing a portion of the first fluid over where previously a first portion of the first fluid was deposited.

29. A method according to Clause 28, further comprising depositing a second layer of the first fluid over where previously a first layer of the first fluid was deposited.

30. A device for fabricating a microfluidic arrangement for manipulating fluids, comprising: a liquid reservoir in communication with an outlet; a positioning arrangement adapted to move and position the outlet relative to a substrate; a pumping arrangement adapted to cause flow of liquid from the outlet; and a control arrangement adapted to convert information regarding a desired fluidic shape into motion commands for the positioning arrangement and activate the pumping arrangement so as to cause deposition of a first fluid on the substrate in the desired shape, with the first fluid being retained in said shape by a fluid interface.

31. A device according to Clause 30, wherein the microfluidic arrangement comprises an array of drops and/or a microfluidic circuit.

32. A device according to Clause 30 or 31, wherein the control arrangement is adapted to cause continuous flow of fluid out of the outlet.

33. A device according to any of Clauses 30 to 32, wherein the control arrangement is adapted to cause formation of a liquid bridge between the outlet and the substrate.

34. A device according to any of Clauses 30 to 33, wherein the fluid is at ambient temperature during deposition.

35. A device according to any of Clauses 30 to 34, wherein the control arrangement is adapted to calibrate a distance between a substrate and the outlet.

36. A device according to Clause 35, wherein the control arrangement is adapted to cause the outlet to approach the surface until a signal is received indicating contact between the outlet and the surface.

37. A device according to any of Clauses 30 to 36, wherein the control arrangement is adapted to cause the outlet to be positioned at least 10 microns and/or approximately one outlet diameter or less from the surface for deposition of the first fluid on the substrate.

38. A device according to any of Clauses 30 to 37, wherein the pumping arrangement is adapted to provide a hydrostatic pressure at the outlet to cause flow of liquid from the outlet.

39. A device according to Clause 38, wherein the pumping arrangement is adapted to provide a hydrostatic pressure at the outlet that is less than or equal to the Laplace pressure in a drop (optionally a semi-spherical drop) formed at the outlet, preferably when a liquid bridge is not formed between the outlet and the substrate.

40. A device according to any of Clauses 30 to 39, wherein the control arrangement is adapted to cause a drop formed at the outlet to contact the surface in order to activate flow.

41. A device according to any of Clauses 30 to 40, wherein the control arrangement is adapted to cause withdrawal of the outlet far enough from the surface to interrupt a liquid bridge between the outlet and the surface in order to interrupt flow.

42. A device according to any of Clauses 30 to 41, wherein the control arrangement is adapted to cause the outlet to be positioned between 3 and 10 times the outlet diameter from the surface for release of a drop or stream of fluid under gravitational acceleration toward the surface.

43. A device according to any of Clauses 30 to 42, wherein the fluid is a shear thinning fluid.

44. A device according to any of Clauses 30 to 43, further comprising one or more further liquid reservoirs in communication with respective one or more further outlets; and optionally one or more further positioning arrangements to move and position the one or more further outlets relative to the substrate and/or one or more further pumping arrangements to cause flow of liquid from the one or more further outlets.

45. A device according to Clause 44, wherein the control arrangement is adapted to convert information regarding a desired deposition of further fluid(s) into motion commands for the (further) positioning arrangement(s) and activate the (further) pumping arrangement(s) so as to cause deposition of further fluid(s).

46. A device according to any of Clauses 30 to 45, further comprising a heater arranged to heat a portion of fluid and/or a light source arranged to illuminate a portion of fluid.

47. A device according to any of Clauses 30 to 46, further adapted to deposit a portion of the first fluid over where previously a first portion of the first fluid was deposited.

48. A device according to Clause 47, further adapted to deposit a second layer of the first fluid over where previously a first layer of the first fluid was deposited.

Aspects of the disclosure may additionally be described by the following numbered clauses:

1. A printer for producing a microfluidic arrangement, comprising: a liquid reservoir in communication with an outlet; a positioning arrangement adapted to move and position the outlet relative to a substrate; a pumping arrangement adapted to cause flow of liquid from the outlet; and a control arrangement adapted to convert information regarding a desired fluidic shape into motion commands for the positioning arrangement and activate the pumping arrangement so as to cause formation of a microfluidic arrangement.

2. A printer according to Clause 1, wherein the microfluidic arrangement comprises a fluid arranged in a given shape on a surface of a substrate.

3. A printer according to Clause 1 or 2, wherein the microfluidic arrangement comprises an array of drops and/or a microfluidic circuit.

4. A printer according to any preceding clause, wherein the control arrangement is adapted to cause continuous flow of fluid out of the outlet.

5. A printer according to any preceding clause, wherein the control arrangement is adapted to cause formation of a liquid bridge between the outlet and the substrate.

6. A printer according to any preceding clause, wherein the control arrangement is adapted to calibrate a distance between a substrate and the outlet.

7. A printer according to Clause 6, wherein the control arrangement is adapted to cause the outlet to approach the surface until a signal is received indicating contact between the outlet and the surface.

8. A printer according to any preceding clause, wherein the control arrangement is adapted to cause the outlet to be positioned at least 10 microns from the surface for formation of a microfluidic arrangement on the surface.

9. A printer according to any preceding clause, wherein the control arrangement is adapted to cause the outlet to be positioned approximately half the outlet diameter or less from the surface for formation of a microfluidic arrangement on the surface.

10. A printer according to any preceding clause, wherein the pumping arrangement is adapted to provide a hydrostatic pressure at the outlet to cause flow of liquid from the outlet.

11. A printer according to Clause 10, wherein the pumping arrangement is adapted to provide a hydrostatic pressure at the outlet that is less than or equal to the Laplace pressure in a drop (optionally a semi-spherical drop) formed at the outlet, preferably when a liquid bridge is not formed between the outlet and the substrate.

12. A printer according to any preceding clause, wherein the control arrangement is adapted to cause a drop formed at the outlet to contact the surface in order to activate flow.

13. A printer according to any preceding clause, wherein the control arrangement is adapted to cause withdrawal of the outlet far enough from the surface to interrupt a liquid bridge between the outlet and the surface in order to interrupt flow.

14. A printer according to any preceding clause, wherein the control arrangement is adapted to cause the outlet to be positioned between 3 and 10 times the outlet diameter from the surface for release of a drop or stream of fluid under gravitational acceleration toward the surface.

15. A printer according to any preceding clause, wherein the fluid is a shear thinning fluid.

16. A printer according to any preceding clause, further comprising one or more further liquid reservoirs in communication with respective one or more further outlets; and optionally one or more further positioning arrangement to move and position the one or more further outlets relative to the substrate and/or one or more further pumping arrangements to cause flow of liquid from the one or more further outlets.

17. A printer according to Clause 16, wherein the control arrangement is adapted to convert information regarding a desired deposition of further fluid(s) into motion commands for the (further) positioning arrangement(s) and activate the (further) pumping arrangement(s) so as to cause deposition of further fluid(s).

18. A method of producing a microfluidic arrangement, comprising converting information regarding a desired fluidic shape into motion commands for positioning a fluidic outlet and activating a pumping arrangement so as to cause flow of a fluid from the outlet onto a substrate.

19. A method according to Clause 18, wherein the microfluidic arrangement comprises a fluid arranged in a given shape on a surface of a substrate.

20. A method according to Clause 18 or 19, wherein the microfluidic arrangement comprises an array of drops and/or a microfluidic circuit.

21. A method according to any of Clauses 18 to 20, wherein the flow of fluid out of the outlet is continuous.

22. A method according to Clause 21, wherein the flow of fluid out of the outlet is continuous during the formation of a plurality of features of the microfluidic arrangement.

23. A method according to any of Clauses 18 to 22, wherein a liquid bridge is formed between the outlet and the substrate.

24. A method according to any of Clauses 18 to 23, further comprising calibrating a distance between the substrate and the outlet.

25. A method according to Clause 24, wherein calibrating comprises approaching the outlet to the surface until contact between the outlet and the surface occurs.

26. A method according to any of Clauses 18 to 25, further comprising positioning the outlet at least 10 microns and/or approximately half the outlet diameter or less from the surface for formation of a microfluidic arrangement on the surface.

27. A method according to any of Clauses 18 to 26, further comprising arranging the outlet, the substrate and a hydrostatic pressure of the fluid such that the hydrostatic pressure at the outlet is less than or equal to the Laplace pressure in a drop (optionally a semi-spherical drop) formed at the outlet, preferably when a liquid bridge is not formed between the outlet and the substrate.

28. A method according to any of Clauses 18 to 27, further comprising bringing a drop formed at the outlet into contact with the surface for activation of flow and/or withdrawing the outlet far enough from the surface to interrupt a liquid bridge between the outlet and the surface for interruption of flow.

29. A method according to any of Clauses 18 to 28, wherein formation of the microfluidic arrangement may occur in a gas environment or in the environment of an immiscible further liquid.

30. A method according to any of Clauses 18 to 29, further comprising positioning the outlet between 3 and 10 times the outlet diameter from the surface for release of a drop of fluid under gravitational acceleration toward the surface.

31. A microfluidic arrangement, comprising: a substrate; a first fluid; and a second fluid, which is immiscible with the first fluid; wherein the first fluid is arranged to be covered by the second fluid; and wherein the first fluid is arranged in a given shape on a surface of the substrate, such shape being defined at least in part by the interfacial tension between the first and second fluids.

32. A microfluidic arrangement according to Clause 31, wherein the surface of the substrate is unpatterned.

33. A microfluidic arrangement according to Clause 31 or 32, wherein the surface of the substrate is unpatterned by chemical surface patterning, physical functionalisation and/or surface topography.

34. A microfluidic arrangement according to any of Clauses 31 to 33, wherein the first fluid is retained in the given shape by a fluid interface between the first and second fluids.

35. A microfluidic arrangement according to any of Clauses 31 to 34, wherein the first fluid is arranged as a fluid drop on the surface, whereby to provide a fluid chamber.

36. A microfluidic arrangement according to Clause 35, wherein at least two fluid drops are provided on the surface, preferably in a spaced arrangement.

37. A microfluidic arrangement according to Clause 36, wherein the at least two fluid drops have different volumes.

38. A microfluidic arrangement according to any of Clauses 35 to 37, wherein each fluid drop has a volume of less than 1 millilitre.

39. A microfluidic arrangement according to any of Clauses 35 to 38, wherein the first fluid is further arranged on the surface to provide at least one fluid conduit in fluid communication with the at least one fluid drop.

40. A microfluidic arrangement according to any of Clauses 31 to 39, wherein the first fluid is arranged on the surface to provide at least one fluid conduit, preferably wherein the first fluid is arranged on the surface in a line.

41. A microfluidic arrangement according to Clause 39 or 40, wherein the at least one fluid conduit has a width of less than 5 cm, preferably less than 1 cm, preferably less than 1 mm, and preferably between about 10 and 700 microns.

42. A microfluidic arrangement according to any of Clauses 39 to 41, wherein the at least one fluid conduit has a height of less than 1 mm, and preferably between about 10 and 100 microns.

43. A microfluidic arrangement according to any of Clauses 39 to 42, further comprising at least two fluid conduits arranged on the surface.

44. A microfluidic arrangement according to Clause 43, wherein the at least two fluid conduits fluidly connect at least two fluid drops.

45. A microfluidic arrangement according to Clause 43 or 44, wherein the at least two fluid conduits are, at least in part, substantially parallel.

46. A microfluidic arrangement according to any of Clauses 43 to 45, wherein the first fluid is arranged to provide at least three fluid drops on the surface, and wherein the at least two fluid conduits fluidly connect the at least three fluid drops in series.

47. A microfluidic arrangement according to any of Clauses 43 to 46, wherein the first fluid is arranged to provide at least three fluid drops on the surface, and wherein the at least two fluid conduits are arranged to fluidly connect a first and second fluid drop with a third fluid drop.

48. A microfluidic arrangement according to Clause 47, wherein the at least two fluid conduits are arranged to fluidly connect the first and second fluid drop with the third fluid drop via at least one other fluid drop.

49. A microfluidic arrangement according to any of Clauses 43 to 48, wherein the at least two fluid conduits have different lengths.

50. A microfluidic arrangement according to any of Clauses 43 to 49, wherein the at least two fluid conduits have different widths.

51. A microfluidic arrangement according to any of Clauses 31 to 50, wherein the surface is arranged such that the interfacial tension between the surface and the first fluid substantially maintains the arrangement of the first fluid on the surface.

52. A microfluidic arrangement according to any of Clauses 31 to 51, wherein the substrate, first fluid and the second fluid are selected for a large equilibrium contact angle between the first fluid and the substrate.

53. A microfluidic arrangement according to any of Clauses 31 to 52, wherein the substrate is hydrophilic, the first fluid is polar and the second fluid is non-polar.

54. A microfluidic arrangement according to any of Clauses 31 to 53, wherein the first fluid is an aqueous fluid and the second fluid is one of: a gas; an oil; and a fluorocarbon.

55. A microfluidic arrangement according to any of Clauses 31 to 54, wherein the second fluid includes perfluorotri-n-butylamine and/or perfluoro-n-dibutylmethylamine.

56. A microfluidic arrangement according to any of Clauses 31 to 55, wherein the first fluid is arranged in the given shape such that a cross section area of a feature of the microfluidic arrangement has a (height:width) aspect ratio of (1:2) or less, and preferably the aspect ratio is (1:4) or less, and preferably the aspect ratio is (1:20) or less, more preferably (1:50) or less, and yet more preferably (1:100) or less, and yet more preferably between (1:50) and (1:500).

57. A microfluidic arrangement according to any of Clauses 31 to 56, wherein the first fluid is arranged in the given shape such that a contact angle is smaller than an advancing contact angle for the first fluid on the substrate and covered with the second fluid, and preferably the contact angle is less than 50% of the advancing contact angle, and more preferably less than 25% of the advancing contact angle, and yet more preferably less than 10% of the advancing contact angle, and yet more preferably between 1% and 50% of the advancing contact angle.

58. A microfluidic arrangement according to any of Clauses 31 to 57, wherein at least a region of the surface is substantially flat, and wherein the first fluid is arranged in said region.

59. A microfluidic arrangement according to any of Clauses 31 to 58, wherein the surface is peripherally enclosed.

60. A microfluidic arrangement according to any of Clauses 31 to 59, wherein the first fluid is arranged to be covered by the second fluid such that the surface area of the first fluid that is in contact with the second fluid is greater than the surface area of the first fluid that is in contact with the surface.

61. A microfluidic arrangement according to any of Clauses 31 to 60, wherein the microfluidic arrangement is suitable for addition of further fluid that is miscible with the first fluid to any portion of the first fluid in the given shape.

62. A microfluidic arrangement according to any of Clauses 31 to 61, wherein the microfluidic arrangement is suitable for removal of fluid from any portion of the first fluid in the given shape.

63. A microfluidic arrangement according to any of Clauses 31 to 62, wherein a footprint of the given shape remains unchanged upon addition or removal of fluid to or from the first fluid in the given shape.

64. A microfluidic arrangement according to any of Clauses 31 to 63, wherein the volume of a feature of the microfluidic arrangement is increasable by a factor of 100 or less, and optionally 1000 or less, without altering the footprint of the feature.

65. A microfluidic arrangement according to any of Clauses 31 to 64, wherein the volume of a feature of the microfluidic arrangement is decreasable by a factor of 100 or less, and optionally 1000 or less, without altering the footprint of the feature.

66. A microfluidic arrangement according to any of Clauses 31 to 65, wherein the density of the first fluid is greater than the density of the second fluid.

67. A microfluidic arrangement according to any of Clauses 31 to 66, wherein the density of the second fluid is greater than the density of the first fluid.

68. A microfluidic arrangement according to any of Clauses 31 to 67, further comprising a reagent in the first fluid.

69. A microfluidic arrangement according to Clause 68, wherein the reagent is, at least initially, contained within the at least one fluid drop.

70. A microfluidic arrangement according to any of Clauses 31 to 69, comprising a plurality of fluid drops arranged in an array on the surface.

71. A microfluidic arrangement according to Clause 70, wherein the plurality of fluid drops contain different concentrations of reagent.

72. A microfluidic arrangement according to any of Clauses 31 to 71 comprising a fluid drop with a non-circular footprint, preferably a square-shaped footprint or a hexagonal footprint.

73. A microfluidic arrangement according to any of Clauses 31 to 72, comprising a conduit with a height variation of 10-20% or more along the length of the conduit.

74. A microfluidic arrangement according to any of Clauses 31 to 73, comprising a conduit with a height variation of 10 microns or more along the length of the conduit.

75. A microfluidic arrangement according to any of Clauses 31 to 74, comprising a conduit with a height variation at different times of 10-20% or more, and/or of 1 micron or more.

76. A microfluidic arrangement according to any of Clauses 31 to 75, comprising a first fluid drop having a first volume of fluid and a second fluid drop having a second volume of fluid, where the first fluid drop and the second fluid drop have the same footprint.

77. A microfluidic arrangement according to any of Clauses 31 to 76, comprising a first fluid drop and a second drop both having a first volume of fluid, where the first fluid drop and the second fluid drop have different footprints.

78. A microfluidic arrangement according to Clause 77, wherein the different footprints have different areas and/or different shapes.

79. A microfluidic arrangement according to any of Clauses 31 to 78, wherein the second fluid is covered by a third fluid, which is immiscible with the second fluid.

80. A microfluidic arrangement according to any of Clauses 31 to 79, wherein a further part of the first fluid is arranged in a further given shape that is freestanding from the surface of the substrate.

81. A microfluidic arrangement according to any of Clauses 31 to 80, further comprising a solid structure for retaining a portion of fluid and comprising an aperture for enabling connection of the fluid within the structure with the first fluid.

82. A microfluidic arrangement according to any of Clauses 31 to 81, wherein the first fluid is at least one of: suitable for formation of a deposit on the surface after evaporation of the liquid; suitable for chemical alteration of the surface; a shear thinning fluid; a shear thickening fluid; a gel precursor; and a gel.

83. A microfluidic arrangement according to any of Clauses 31 to 82, wherein the surface is a glass surface or a polystyrene surface.

84. A microfluidic arrangement comprising an array of drops, comprising: a substrate; a first fluid; and a second fluid, which is immiscible with the first fluid; wherein the first fluid is arranged to be covered by the second fluid; and wherein the first fluid is arranged in a given array of drops on a surface of the substrate, such drops being defined at least in part by the interfacial tension between the first and second fluids, optionally wherein the volume of a drop is increasable by a factor of up to hundred-fold or reducible by a factor down to one-hundredth without altering the footprint of the drop.

85. A substrate for a microfluidic arrangement according to any of Clauses 31 to 84, the substrate having a surface on which a dried out pattern of a microfluidic arrangement is arranged, whereby the microfluidic arrangement may be rehydrated by the introduction of a first fluid to the pattern on the surface.

86. A substrate according to Clause 85 with a second fluid according to any of Clauses 31 to 84 arranged to cover the dried out pattern.

87. A method of rehydrating a dried out pattern on a substrate according to Clause 85 or 86.

88. A method according to Clause 87 wherein the rehydrating includes a step of depositing a portion of the first fluid according to any of Clauses 31 to 84 in a region of the dried out pattern.

89. A method according to Clause 87 wherein the rehydrating includes a step of exposing the dried out pattern to a gas comprising the first fluid according to any of Clauses 31 to 84.

90. A method according to Clause 89 wherein the gas comprises the first fluid in gas form at near saturation.

91. A substrate for a microfluidic arrangement according to any of Clauses 31 to 84, the substrate having a surface on which a frozen pattern of a microfluidic arrangement is arranged, whereby the microfluidic arrangement may be reformed by thawing.

92. A method of creating a microfluidic arrangement, comprising: providing a substrate; providing a first fluid; and providing a second fluid, which is immiscible with the first fluid; arranging the first fluid such that it is covered by the second fluid; and arranging the first fluid in a given shape on a surface of the substrate, such shape being defined at least in part by the interfacial tension between the first and second fluids.

93. A method according to Clause 92, wherein the first fluid is confined in the given shape by a fluid interface between the first and second fluids.

94. A method according to Clause 92 or 93, wherein the surface of the substrate is unpatterned.

95. A method according to any of Clauses 92 to 94, further comprising arranging the first fluid directly onto the surface, such that interfacial tension between the surface and the first fluid maintains the arrangement of the first fluid on the surface.

96. A method according to any of Clauses 92 to 95, wherein arranging the first fluid comprises depositing at least one drop of fluid onto the surface.

97. A method according to Clause 96, wherein arranging the first fluid further comprises depositing at least one continuous trail of first fluid onto the surface, whereby to provide a fluid conduit to the at least one fluid drop.

98. A method according to any of Clauses 92 to 97, wherein arranging the first fluid comprises depositing at least one continuous trail of first fluid onto the surface, whereby to provide a fluid conduit.

99. A method according to any of Clauses 92 to 98, wherein the first fluid is first arranged onto the surface, and then the second fluid is arranged to cover the first fluid.

100. A method according to any of Clauses 92 to 99, wherein the second fluid only partially covers the first fluid.

101. A method according to any of Clauses 92 to 100, wherein the second fluid is first arranged onto the surface, and then the first fluid is arranged beneath the second fluid.

102. A method according to any of Clauses 92 to 101, wherein depositing the first fluid comprises drawing an object, preferably wetted by the first fluid, across the surface to provide at least one continuous trail of first fluid on the surface, whereby to provide a fluid conduit.

103. A method according to any of Clauses 92 to 102, further comprising providing a fluid conduit between at least two fluid drops arranged on the surface.

104. A method according to any of Clauses 92 to 103, wherein depositing the first fluid comprises adding a portion of the first fluid to an arbitrary location in the given shape.

105. A method according to any of Clauses 92 to 103, wherein arranging the first fluid comprises removing a portion of the first fluid from an arbitrary location in the given shape.

106. A method according to any of Clauses 92 to 105, wherein arranging the first fluid to provide a given shape on the surface comprises causing displacement of a portion of the first fluid to interrupt or form a connection between different portions of the first fluid.

107. A method according to Clause 106, wherein displacement comprises drawing an object across a portion of the first fluid.

108. A method according to Clause 107, wherein the object is a tip or a needle.

109. A method according to Clause 108, wherein the object has low wettability with the first fluid.

110. A method according to any of Clauses 92 to 109, wherein arranging the first fluid to provide a given shape on the surface further comprises: providing a tube into which a fluid can be drawn; filling the tube with the second fluid, whereby the second fluid wets the inner wall of the tube; drawing at least one drop of the first fluid into the tube, wherein the at least one drop is engulfed in the second fluid; and emptying the tube onto the surface to provide at least one fluid drop of first fluid in direct contact with the surface, wherein the first fluid is covered by the second fluid.

111. A method according to Clause 110, further comprising drawing multiple drops of the first fluid into the tube to create a succession of drops that are engulfed within and separated by the second fluid.

112. A method according to Clause 110 or 111, comprising emptying the tube to provide a plurality of fluid drops on the surface.

113. A method according to any of Clauses 110 to 112, further comprising introducing a reagent into the first fluid.

114. A method according to Clause 113, wherein the reagent is introduced into at least one fluid drop.

115. A method according to any of Clauses 112 to 114, further comprising introducing reagent into a plurality of fluid drops, preferably wherein the concentration of reagent is different in at least two fluid drops.

116. A method according to any of Clauses 110 to 115, further comprising covering the second fluid with a third fluid, which is immiscible with the second fluid.

117. A method of creating a microfluidic arrangement according to any of Clauses 92 to 116, the method further comprising allowing the given shape arranged on the surface to dry out to leave a patterned surface, whereby the microfluidic arrangement may be rehydrated later on by adding a volume of the first fluid to the pattern on the surface.

118. A method of creating a microfluidic arrangement according to any of Clauses 92 to 116, the method further comprising freezing the first fluid in the given shape on the surface, and optionally subsequently thawing the frozen first fluid to reform the microfluidic arrangement.

119. A method of transporting fluid through a microfluidic arrangement according to any preceding clause, the method comprising: arranging a first fluid drop to have a greater volume than a fluidly connected second fluid drop, whereby differences in Laplace pressures between the two drops acts to cause fluid to flow between the two fluid drops.

120. A method according to Clause 119, further comprising adding or removing a first volume of fluid to the first fluid drop and adding a second volume of fluid to the second drop, where the first fluid drop and the second fluid drop have the same footprint.

121. A method according to Clause 120, further comprising adding a first volume of fluid to both the first fluid drop and the second drop, where the first fluid drop and the second fluid drop have different footprints.

122. A method according to Clause 119 to 121, further comprising controlling the rate of fluid flow by adjusting the elevation difference between the first and second fluid drops.

123. A method of transporting fluid through a microfluidic arrangement according to any preceding clause, comprising: elevating a first fluid drop above a fluidly connected second fluid drop to utilise gravity to cause fluid to flow from the elevated drop to the lower drop, wherein the second fluid is air or gas.

124. A method of transporting fluid through a microfluidic arrangement according to any preceding clause, comprising: elevating a first fluid drop above a fluidly connected second fluid drop such that the height of the second fluid above the second fluid drop is substantially greater than the height of the second fluid above the first fluid drop, whereby to cause fluid to flow from the second fluid drop to the first fluid drop, wherein the second fluid is a liquid.

125. A method of controlling flow in a microfluidic arrangement according to any preceding clause, comprising using an object, preferably wetted by the first fluid, to control fluid flow through the fluid conduit, whereby flow can be interrupted by drawing the object across the surface to interrupt the continuity of first fluid providing the fluid conduit, and whereby flow can be resumed by drawing the wetted object across the surface to re-establish continuity of first fluid in an interrupted fluid conduit.

126. A method of determining a change in interfacial tension between a first fluid and a second fluid, comprising exposing a microfluidic arrangement according to any preceding clause to a chemical and evaluating the resulting change in shape of a feature of the microfluidic arrangement to determine an indication of change in interfacial tension.

127. A method according to Clause 126, wherein the evaluation comprises determining an inflection point on a flank of a bell shape of the feature, or any shape where the radius of curvature is limited to one plane.

128. A method according to Clause 127, wherein the evaluation comprises determining a radius of curvature at the inflection point.

129. A method according to Clause 128, wherein the evaluation comprises determining a vertical distance between a top of the drop and the inflection point.

130. A method according to Clause 129, wherein the evaluation comprises calculating a hydrostatic pressure difference based on a vertical distance.

131. A method of detaching a portion of fluid from a microfluidic arrangement, comprising exposing the microfluidic arrangement to a chemical to cause a change in interfacial tension between a first fluid and a second fluid.

132. A method according to any one of Clauses 126 to 131, wherein the fluid is immersed in a denser fluid.

133. A method of zeroing a printer for producing a microfluidic arrangement, the method comprising: moving a holder part toward a substrate, the holder part holding an outlet part and the outlet part having a tip facing the substrate, such that first the tip is brought into contact with the substrate, and then the outlet part moves relative to the holder part as the holder part continues to move toward the substrate; stopping the holder part; and moving the holder part a desired distance from the substrate, without the outlet part moving relative to the holder part.

134. A method according to Clause 133, wherein the outlet part slides relative to the holder part.

135. A method according to Clause 133 or 134, wherein the holder part is stopped after it has moved a predetermined distance toward the substrate.

136. A method according to Clause 133 or 134, wherein the holder part is stopped after contact between the tip and the substrate is detected.

137. A method according to Clause 136, wherein contact between the tip and the substrate is detected by optical detection, user input, and/or electrical detection.

138. A method according to any of Clauses 133 to 137, further comprising a step of fixing the outlet part relative to the holder part before moving the holder part a desired distance from the substrate.

139. An outlet assembly for a printer for producing a microfluidic arrangement, the outlet assembly comprising a holder part holding an outlet part having a tip, such that when a force is applied to the tip the outlet part moves relative to the holder part, and such that when no force is applied to the tip the outlet part remains in a given configuration relative to the holder part.

140. An outlet assembly according to Clause 139, wherein the holder part comprises a low friction surface for bearing the outlet part.

141. An outlet assembly according to Clause 139 or 140, wherein the static frictional coefficient between the holder part and the outlet part is between 0.01 and 0.5, preferably between 0.01 and 0.1, and more preferably between 0.04 and 0.08.

142. An outlet assembly according to any of Clauses 139 to 141, wherein the holder part comprises a polytetrafluoroethylene sleeve.

143. An outlet assembly according to any of Clauses 139 to 142, wherein the outlet part comprises a metallic tube, preferably a steel tube.

144. An outlet assembly according to any of Clauses 139 to 143, wherein the holder part comprises a rubber sleeve, preferably a silicone rubber.

145. An outlet assembly according to any of Clauses 139 to 144, comprising a rubber sleeve as holder part for attachment to a printer, a metallic tube as outlet part arranged within the rubber sleeve, and a polytetrafluoroethylene sleeve arranged between the rubber sleeve and the metallic tube.

146. A method of fabricating a microfluidic arrangement for manipulating fluids, comprising: arranging a first solid on an unpatterned surface of a substrate in a desired shape to form a residue in said shape on the substrate.

147. A method of fabricating a microfluidic arrangement for manipulating fluids, comprising: arranging a first fluid on an unpatterned surface of a substrate in a desired shape; arranging a second fluid, which is immiscible with the first fluid, to cover the first fluid at least partially, wherein the first fluid is retained in said shape by a fluid interface between the first and second fluids; and freezing the first fluid to form a solid in said shape on the substrate.

148. A method according to Clause 147, further comprising thawing the solid on the substrate to reform the microfluidic arrangement.

It will be understood that the present invention has been described above purely by way of example, and modifications of detail can be made within the scope of the invention.

The work leading to this invention has received funding from the People Programme (Marie Curie Actions) of the European Union's Seventh Framework Programme (FP7/2007-2013) under REA grant agreement no 333848.

The invention claimed is:

1. A microfluidic arrangement for manipulating liquids, the microfluidic arrangement comprising:
a substrate;
a first liquid; and
a second liquid, which is immiscible with the first liquid;
wherein the first liquid is covered by the second liquid; and
wherein the first liquid is arranged in a desired shape on a surface of the substrate, the first liquid being retained in said shape by a liquid interface, via interfacial tension, between the first and second liquids;
wherein said shape comprises a liquid conduit having a length and a width, and a liquid reservoir in liquid communication with the liquid conduit;
wherein the liquid conduit and the liquid reservoir respectively contact the substrate in a liquid conduit footprint and a liquid reservoir footprint that are pinned in shape by interfacial tension;
wherein the liquid conduit is configured to allow liquid to flow along the length of the liquid conduit away from or towards the liquid reservoir without any change in the liquid conduit footprint or the liquid reservoir footprint,
wherein a length of the liquid conduit footprint is greater than a width of the liquid reservoir footprint and a width of the liquid conduit footprint is smaller than the width of the liquid reservoir footprint; and
wherein the first liquid is in contact exclusively with the substrate and the second liquid, and all of the surface of the substrate that is in contact with the first liquid is substantially flat and in contact with the first liquid exclusively from below.

2. A microfluidic arrangement according to claim 1, wherein the density of the second liquid is greater than the density of the first liquid.

3. A microfluidic arrangement according to claim 1, configured such that the liquid conduit is capable of comprising a variation in height of 10-20% or more along the length of the liquid conduit in use.

4. A microfluidic arrangement according to claim 1, configured such that the liquid conduit is capable of comprising a variation in height of 10 microns or more along the length of the liquid conduit in use.

5. The microfluidic arrangement according to claim 1, wherein the width of the liquid conduit is constant along the length of the liquid conduit.

6. The microfluidic arrangement according to claim 1, wherein the substrate comprises an aperture for enabling connection of the first liquid through the substrate.

7. The microfluidic arrangement according to claim 6, wherein:
the first liquid is arranged in a first desired shape on a first side of the substrate and in a second desired shape on a second side of the substrate;
the first liquid is retained in said first and second desired shapes by liquid interfaces between the first and second liquids; and
the first liquid of the first desired shape is connected to the first liquid of the second desired shape via the aperture in the substrate.

8. The microfluidic arrangement according to claim 1, wherein the first liquid is an aqueous liquid and the second liquid is a fluorocarbon.

9. The microfluidic arrangement according to claim 8, wherein the second liquid includes perfluorotri-n-butylamine and/or perfluoro-n-dibutylmethylamine.

10. The microfluidic arrangement according to claim 1, wherein the second liquid is covered by a third liquid, which is immiscible with the second liquid.

* * * * *